US010692096B2

(12) United States Patent
Christiansen et al.

(10) Patent No.: US 10,692,096 B2
(45) Date of Patent: Jun. 23, 2020

(54) CUSTOMIZABLE DATA MANAGEMENT SYSTEM

(71) Applicant: Thermodynamic Design, LLC, Potomac, MD (US)

(72) Inventors: Bradley Christiansen, Centerville, VA (US); Thomas Hampton, Clifton, VA (US); Michael Vock, Loveland, OH (US); Jacob N. Wohlstadter, Potomac, MD (US)

(73) Assignee: Thermodynamic Design, LLC, Potomac, MD (US)

( * ) Notice: Subject to any disclaimer, the term of this patent is extended or adjusted under 35 U.S.C. 154(b) by 87 days.

(21) Appl. No.: 14/208,825

(22) Filed: Mar. 13, 2014

(65) Prior Publication Data

US 2014/0278758 A1    Sep. 18, 2014

Related U.S. Application Data

(60) Provisional application No. 61/788,116, filed on Mar. 15, 2013.

(51) Int. Cl.
*G06Q 30/02* (2012.01)
(52) U.S. Cl.
CPC ..... *G06Q 30/0201* (2013.01); *G06Q 30/0251* (2013.01); *G06Q 30/0269* (2013.01)
(58) Field of Classification Search
None
See application file for complete search history.

(56) References Cited

U.S. PATENT DOCUMENTS

| 8,712,845 | B2 | 4/2014 | Christiansen et al. |
| 8,787,707 | B1 | 7/2014 | Steves et al. |
| 2003/0131021 | A1 | 7/2003 | Wight et al. |
| 2004/0210602 | A1 | 10/2004 | Hillis et al. |
| 2005/0203809 | A1* | 9/2005 | Stone ................... G06Q 10/087 705/7.19 |
| 2007/0005450 | A1 | 1/2007 | Krishnamoorthy et al. |
| 2007/0288514 | A1* | 12/2007 | Reitter ............. G06F 17/30864 |
| 2008/0114807 | A1 | 5/2008 | Sembower |
| 2008/0294502 | A1 | 11/2008 | Broome |
| 2009/0055285 | A1 | 2/2009 | Law et al. |
| 2009/0276453 | A1 | 11/2009 | Trout et al. |
| 2009/0276729 | A1 | 11/2009 | Cantu-Paz |

(Continued)

FOREIGN PATENT DOCUMENTS

| CN | 101395626 A | 3/2009 |
| CN | 102317967 A | 1/2012 |

(Continued)

OTHER PUBLICATIONS

Hull et al., "Enabling Context Aware and Privacy Conscious User DAta Sharing" Proceedings of the 2004 IEEE International Conference on Mobile Data Management, p. 1-12. (Year: 2004).*

(Continued)

*Primary Examiner* — Stephanie Z Delich
(74) *Attorney, Agent, or Firm* — Wolf, Greenfield & Sacks, P.C.

(57) ABSTRACT

The invention relates to methods, systems, and computer-readable media related to a system having a plurality of users, designed to display a user-customized subset of item and/or provider information to the user.

69 Claims, 39 Drawing Sheets

(56) References Cited

U.S. PATENT DOCUMENTS

| | | |
|---|---|---|
| 2010/0004980 A1 | 1/2010 | Bowen |
| 2010/0076844 A1 | 3/2010 | Christiansen et al. |
| 2010/0268606 A1 | 10/2010 | Wu |
| 2010/0332313 A1* | 12/2010 | Miller .............. G06F 17/30867 705/14.44 |
| 2011/0055289 A1* | 3/2011 | Ennis .................... G06Q 10/06 707/805 |
| 2011/0125576 A1 | 5/2011 | Song et al. |
| 2011/0145064 A1 | 6/2011 | Anderson et al. |
| 2011/0191417 A1* | 8/2011 | Rathod .................. G06Q 30/02 709/204 |
| 2011/0307340 A1 | 12/2011 | Benmbarek |
| 2012/0054115 A1 | 3/2012 | Baird-Smith et al. |
| 2012/0158501 A1 | 6/2012 | Zhang et al. |
| 2012/0278127 A1 | 11/2012 | Kirakosyan et al. |
| 2013/0080900 A1 | 3/2013 | Wilde et al. |
| 2013/0086448 A1 | 4/2013 | Baptist et al. |
| 2013/0096981 A1 | 4/2013 | Evans et al. |
| 2013/0246397 A1 | 9/2013 | Farver et al. |
| 2014/0052485 A1 | 2/2014 | Shidfar |
| 2014/0129962 A1 | 5/2014 | Lineberger et al. |
| 2014/0149503 A1 | 5/2014 | Bosworth et al. |
| 2014/0153821 A1 | 6/2014 | Masuko et al. |
| 2014/0164089 A1* | 6/2014 | Joa ..................... G06Q 30/0226 705/14.27 |
| 2014/0278862 A1 | 9/2014 | Muppala |
| 2014/0279068 A1 | 9/2014 | Systrom et al. |
| 2014/0282153 A1 | 9/2014 | Christiansen et al. |
| 2015/0262219 A1 | 9/2015 | Vock et al. |
| 2016/0070449 A1 | 3/2016 | Christiansen et al. |

FOREIGN PATENT DOCUMENTS

| | | |
|---|---|---|
| CN | 102411753 A | 4/2012 |
| EP | 2973317 A1 | 1/2016 |
| EP | 3178023 | 6/2017 |
| JP | 2014-502747 A | 2/2014 |
| RU | 2372656 C2 | 4/2008 |
| WO | WO 2009/025855 A1 | 2/2009 |
| WO | WO 2010/001406 A1 | 1/2010 |
| WO | 2011163060 A2 | 12/2011 |
| WO | 2012/161435 A2 | 11/2012 |
| WO | 2013/021888 A1 | 2/2013 |
| WO | WO 2014/152173 A1 | 9/2014 |
| WO | WO 2016/040274 A1 | 3/2016 |

OTHER PUBLICATIONS

Malone et al., "Intelligent Information Sharing System" Communications of the ACM, vol. 30, No. 5, pp. 390-402 May 1987. (Year: 1987).*

Ahern et al. "Over-Exposed? Privacy Pattersn and Consideration in Online and Mobile Photo Sharing" CHI 2007, pp. 1-10. (Year: 2007).*

International Search Report and Written Opinion dated Aug. 14, 2014 from related Application No. PCT/US2014/027034.

Extended Supplementary European Search Report dated Jul. 20, 2016 in European Patent Application No. 14 76 7468.

Japanese Notice of Reasons for Rejection dated Jan. 30, 2018 in Japanese Patent Application No. 2016-502314, together with an English-language translation.

European Communication dated Mar. 23, 2018 in European Patent Application No. 14 767 468.3.

Australian Examination Report dated Feb. 26, 2019 in Australian Application No. 2014240079.

Chinese Office Action dated Feb. 3, 2019 in Chinese Application No. 201480028510.8, together with an English-language translation.

European Summons to Attend Oral Proceedings dated May 31, 2019 in European Application No. 14 767 468.3.

Indian Examination Report dated Sep. 18, 2019 received in Indian Application No. 6142/CHENP/2015, together with an English-language translation.

Chinese Office Action dated Sep. 4, 2019 received in Chinese Application No. 201480028510.8, together with an English-language translation.

International Preliminary Report on Patentability Chapter II for International Application No. PCT/US2014/027034 dated Feb. 3, 2015.

U.S. Appl. No. 14/645,545, filed Mar. 12, 2015, Vock et al.

U.S. Appl. No. 14/210,509, filed Mar. 14, 2014, Christiansen et al.

U.S. Appl. No. 16/660,896, filed Oct. 23, 2019, Christiansen et al.

PCT/US2014/027034, dated Feb. 3, 2020, International Preliminary Report on Patentability Chapter II.

International Search Report and Written Opinion dated Dec. 24, 2015 in International Application No. PCT/US2015/048860.

European Communication dated Nov. 30, 2018 received in European Application No. 15 84 0719.7.

Extended Supplementary European Search Report dated Jan. 25, 2018 received in European Patent Application No. 15840719.7.

Japanese Notice of Reasons for Rejection dated Jul. 23, 2019 received in Japanese Patent Application 2017-511841, together with an English-language translation.

European Summons to Attend Oral Proceedings dated Mar. 9, 2020 in connection with European Application No. 15840719.7.

[No Author Listed], Association list—Wikipedia. [retrieved from internet on Feb. 21, 2020]. Https://en.wikipedia.org/w/index.php?title=Association_list&oldid=492108771.

De Meo et al., Improving Recommendation Quality by Merging Collaborative Filtering and Social Relationships. Cornell University Library. Sep. 30, 2011; 6 pages.

Liu et al., Incorporating social networks and user opinions for collaborative recommendation: Local Trust Network based Method. Context-Aware Movie Recommendation. Sep. 30, 2010; pp. 53-56.

EP 15840719.7, dated Mar. 9, 2020, European Summons to Attend Oral Proceedings.

Extended European Search Report dated Mar. 6, 2020 in connection with European Application No. 19207537.2.

14767468.3, dated Apr. 16, 2020, Decision to Refuse.

Canadian Examination report dated Apr. 6, 2020 in connection with Canadian Application No. 2,906,683.

Decision to Refuse a European Patent Application dated Apr. 16, 2020 in connection with European Application No. 14767468.3.

* cited by examiner

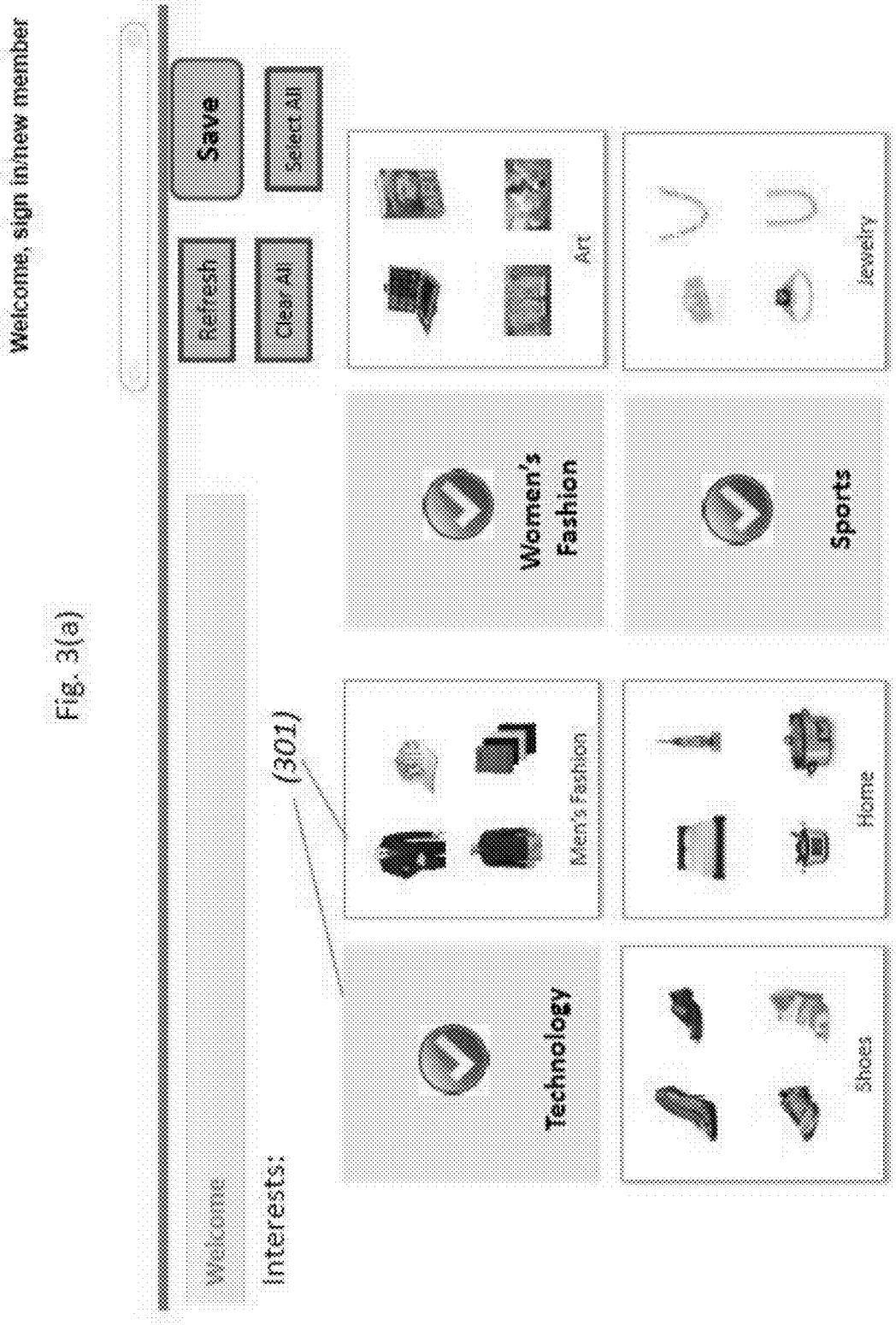

Fig. 5(a)

Fill out the sections below to define your brand

Identify Your Brand

Brand Name

Brand Website

Product Lists

Upload Your Brand Logos

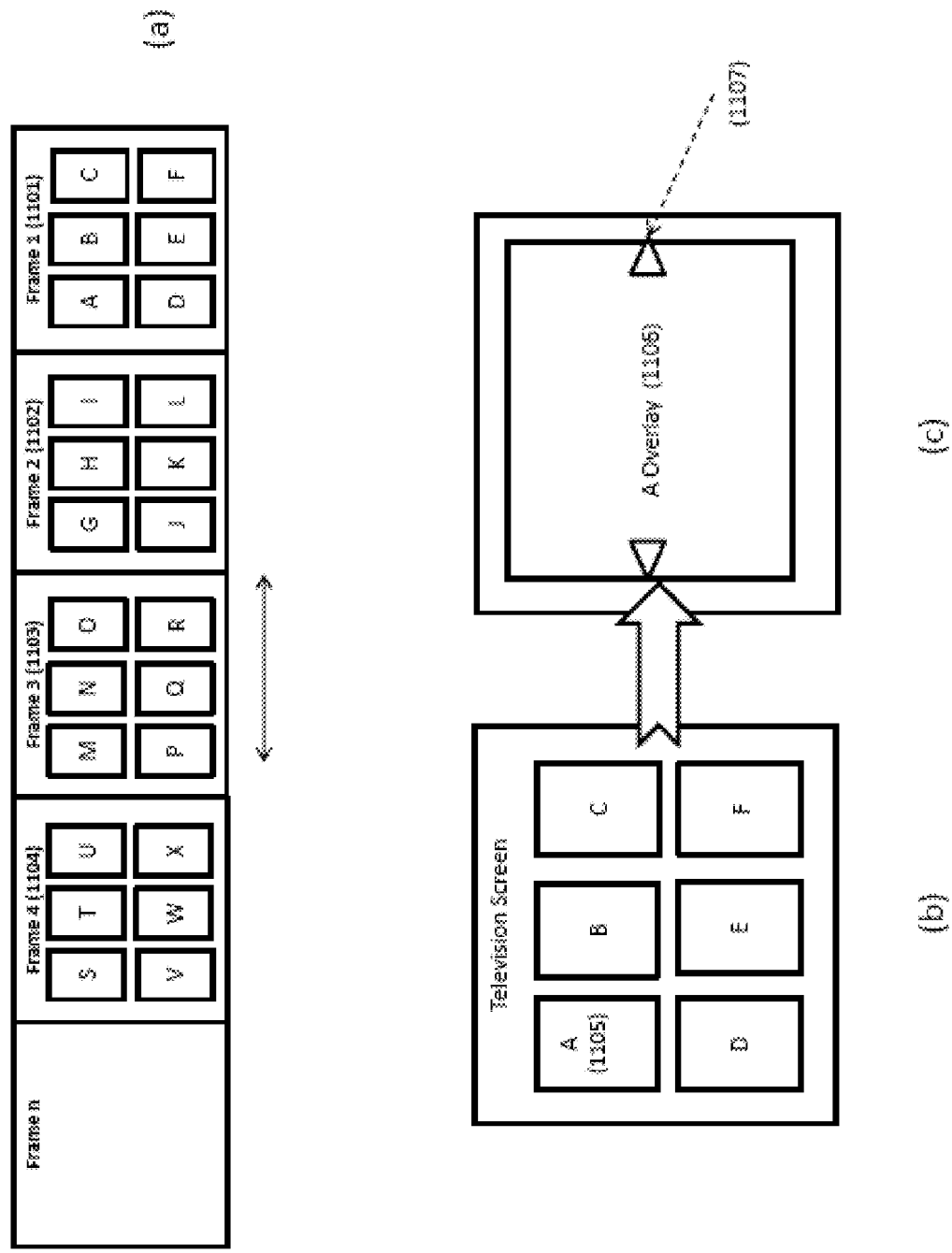

CUSTOMIZABLE DATA MANAGEMENT SYSTEM

CROSS REFERENCE TO RELATED APPLICATIONS

Reference is made to U.S. Provisional Application Ser. No. 61/788,116, filed Mar. 15, 2013, the disclosure of which is incorporated herein by reference in its entirety.

FIELD OF THE INVENTION

The invention relates to a customizable data management system that enables users to personalize their online experience and content providers to collect user information to create a targeted online experience for users.

BACKGROUND OF THE INVENTION

Despite the various sophisticated methods developed by online content providers to enhance the user's online experience, a simple and expedient system that provides users a personalized interface based on the user's individual preferences remains elusive. In particular, there is a substantial need for a system that efficiently selects, manages, and displays data relevant to a user's preferences. Moreover, it is desirable to further enrich the user's online experience by synthesizing a data set that includes information related to an individual user's personal preferences as well as information related to preferences shared by the user and one or more members of that user's online social networking community.

SUMMARY OF THE INVENTION

The present invention contemplates the following specific embodiments. Various modifications, additions and alterations may be made to embodiments described herein by one skilled in the art without departing from the spirit and scope of the invention. Such modifications, additions, and alterations are intended to fall within the scope of the claims.

Embodiments of the present invention are directed to solve technical problems arising in the context of managing vast quantities of data about items available from item providers, such that a user seeking to locate particular items or particular item providers has a simplified experience at his user interface. According to one aspect of the invention, a data structure is established which allows for more efficient data processing of data objects in the data structure to allow selected and tailored visual representations to be made available at the graphical user interfaces of one or more user.

Another aspect of the invention provides a facility in a system with multiple item providers and multiple users for tracking both item providers and users so that a rich array of tailored visual representations can be provided to one of the users, based on activity by the other users and/or providers.

Therefore, the invention provides embodiment (a): a computer implemented method of selecting data objects for interaction with a user at a graphical user interface, the method comprising: receiving a data stream from an item provider, the data stream identifying items available from the item provider; storing a data object in a global database with a provider identifier uniquely identifying the item provider; storing for each item in the data stream a data object with an item identifier uniquely identifying the item; detecting a user interaction at a graphical user interface of a user device, the interaction with an item or item provider data object representation, and creating a user data object with a user identifier uniquely identifying the user; creating in a tracking database an association between the user data object and the item and/or item provider data object; and using the tracking database to select a customized data set of data objects based on the associations in the tracking database, the customized data set being for presentation at the graphical user interface. In one example, each data object of embodiment (a) is stored with an object identifier uniquely identifying that object, and the association between the user data object and the item and/or item provider data object is an association between the object identifiers of those objects. Moreover, the association of embodiment (a) conforms to an association data structure, the association data structure comprising respective fields for those object identifiers. The association can be further between those object identifiers and the user identifier, and optionally, the association data structure comprises a further field for the user identifier. In a further example of embodiment (a), each data object can conform to an object data structure, the object data structure comprising respective fields for at least some of: an object identifier of that object; a user or provider identifier of a creator of that data object; a user, item, or provider identifier of a user, item or provider to which that data object relates; and additional information for said presentation at the graphical user interface. The method of embodiment (a) can further include, subsequent to the item provider creating a new data object associated with the item and/or item provider data object, updating the customized data set to include the new data object. The global database of embodiment (a) can contain a category data object associated with the item and/or item provider data object; and wherein at least one of the selected data objects is also associated with the category data object in the tracking database, that data object being selected for inclusion in the customized set on that basis; and optionally, the method further comprises, subsequent to the item provider creating a new data object associated with the category data object, updating the customized set to include the new data object.

Moreover, the invention provides embodiment (b): a computer system comprising: a plurality of user devices each having a display interface available to a user; a plurality of item providers; a global database of data objects, each data object comprising a unique data object identifier of that object and a user, item, or provider identifier of a user, item or provider to which that data object relates; computer storage storing: (i) for each item provider, a respective provider data table comprising a unique provider identifier of that provider and one or more item identifiers of items provided by that provider; (ii) for each user, a respective user data table comprising a unique user identifier of that user and one or more item identifiers, provider identifiers, and/or category identifiers for items, providers and/or categories in which that user has expressed a preference; and (iii) a customized set of data tables selected for at least a first user, the customized set selected from the user data tables and provider data tables based on the item and/or the provider identifiers contained in the first users data table; a global tracking database configured responsive to the first user expressing an additional preference for a provider or item by instigating an association instruction at their user device to associate that first user's user identifier with an object identifier of a data object comprising the provider or item identifier of that provider or item; and an information exchange computer configured, responsive to the first user expressing the additional interest in the item or provider, to select one or more additional provider data tables and/or user data tables for inclusion in the first user's customized set to update that set, and to select at least one data object based on the first user's updated set for display to the first user via the display interface of their user device. The global database of embodiment (b) can contain a category data object and the category data object is associated with the data object comprising the provider or item identifier of the provider or item in which the user has expressed a subsequent interest, and wherein the selected data object is also associated with the category data object in the tracking database.

Also provided is embodiment (c): a computer system comprising: a plurality of user devices each having a display interface available to a user; a plurality of item providers; a global database of data objects, each data object comprising a unique object identifier of that object and a user, item, or provider identifier of a user, item or provider to which that object relates, the data objects including a user association data object comprising a target user identifier of a target user and a follower user identifier of a user following the target user, wherein the global database is configured responsive to the target user expressing a tracking interest in a data object representation by instigating a tracking instruction at their user device to create a new derivative data object based on that data object; a global tracking database configured responsive to the target user expressing the tracking interest in the data object to store an association between the user identifier of the target user, the object identifier of that data object, and the object identifier of the created derivative data object; and an information exchange computer configured, responsive to the target user expressing the interest in the data object to access the global database and the global tracking database and to display the derivative data object representation to the follower user via the display interface of their user device.

Embodiments (a)-(c) are used to implement various methods described herein, as well as systems and computer readable media designed to practice those methods. For example, the following embodiment ((1)-(13)) relate to how embodiment (a)-(c) can be used:

Embodiment (1): a method of exchanging brand information on a system, wherein the system has (i) a plurality of consumer-users including a first consumer-user and one or more additional consumer-users, and (ii) a plurality of brands including a first brand, the method comprising acts of: (a) receiving first brand information; (b) receiving first brand preference information indicating that the first consumer-user has expressed a preference for the first brand information; (c) filtering the first brand information to create a subset of first brand information that is provided to the first consumer-user; (d) displaying to the first consumer-user one or more data object representations relating to the subset of the first brand information; (e) receiving one or more first consumer-user interactions with the one or more data object representations relating to the subset of first brand information; (f) displaying to the first brand: interaction data relating to the first brand and specific to one or more consumer-users; interaction data related to the first brand aggregated for a plurality of consumer-users on the system; comparative interaction data from a plurality of customer-users related to the first brand relative to a one or more other brands on the system; or combinations thereof.

Embodiment (1) can further include: receiving additional brand information from a plurality of brands; receiving additional brand preference information indicating that the first consumer-user has expressed a preference for an additional subset of the additional brand information; filtering the first brand information and the additional brand information to create one or more supplemental subsets of additional brand information that is provided to the first consumer-user; displaying to the first consumer-user one or more data object representations relating to the one or more supplemental subsets of additional brand information; receiving one or more first consumer-user interactions with the one or more data object representations relating to the one or more supplemental subsets of additional brand information; and displaying to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof.

Moreover, embodiment (1) can further comprise displaying to the first consumer-user first brand information not previously displayed to the first consumer-user on the system. The displaying step (d) can also include displaying to one or more additional consumer-users one or more data object representations relating to the subset of the first brand information, wherein the one or more additional consumer-users have a relationship with the first consumer-user.

The interaction data in embodiment (1) comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

The one or more first consumer-user interactions with the subset of data object representations in embodiment (1) includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first brand-hosted information, participating in a survey regarding one or more data object representations of the subset, requesting further information from the first brand regarding one or more data object representations of the subset, buying a commercial item displayed in one or more data object representations of the subset from a third-party retailer/reseller, buying a commercial item displayed in one or more data object representations of the subset directly from the first brand, buying a commercial item displayed in one or more data object representations of the subset from an individual, participating in an auction regarding one or more data object representations of the subset, offering a commercial item displayed in one or more data object representations in the subset for free, loan, sale, lease, and/or rental, requesting to purchase a commercial item displayed in one or more data object representations in the subset, requesting that a discontinued commercial item displayed in one or more data object representations in the subset is re-introduced by the first brand and/or an authorized retailer/reseller thereof, suggesting to the first brand product ideas, improvements, and/or corrections regarding one or more data objects in the subset, or combinations thereof.

The interaction data of embodiment (1) includes first brand data object-consumer clicks, first brand data object consumer impressions, first brand derivative data object consumer clicks, first brand derivative data object-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

The demographic information of embodiment (1) comprises gender, ethnicity, age, income, education, home ownership, location, employment status, shopping history, personal interests and/or hobbies, or combinations thereof.

The comparative interaction data of embodiment (1) comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

The comparative interaction data of embodiment (1) can further comprise first brand data object representation-consumer clicks, first brand data object representation-consumer impressions, first brand derivative data object representation consumer clicks, first brand derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof.

The comparative interaction data of embodiment (1) is optionally collected over a defined time interval. For example, the defined time interval is a time period in which the first brand and/or a first brand competitor has participated in the system.

The comparative interaction data of embodiment (1) further comprises brand ranking data for the first brand in relation to the plurality of brands; and/or brand ranking data for the first brand in relation to one or more competitor brands of the plurality of brands.

The first brand information of embodiment (1) comprises general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof. For example, brand media includes a brand-specific video file, a brand-specific audio file, or print media, and/or brand-specific supporting documents and information comprises one or more literature references, reviews, blog link, press release, forum link, or combinations thereof. In addition, the first brand information of embodiment (1) comprises first brand commercial item information including information related to one or more commercial item trademarks, commercial item description information, commercial item media, commercial item purchasing information, commercial item retail information, commercial item promotional information, related first brand products, or combinations thereof.

The commercial item description information of embodiment (1) comprises an item image, one or more item-specific supporting documents and information, one or more commercial item reviews, a commercial item rating, or combinations thereof. For example, commercial item media includes a commercial item-specific video file, a commercial item-specific audio file, or print media; commercial item-specific supporting documents and information comprises one or more literature references, reviews, blog link, press release, forum link, or combinations thereof.

The first brand preference information of embodiment (1) includes system tracking preference for the first brand information and the method further comprises filtering the first brand information to create a first supplemental subset of first brand information that is provided to the first consumer-user expressing a system tracking preference for the first brand information; and displaying to the first consumer user one or more derivative data object representations relating to the first supplemental subset of the first brand information, wherein the one or more derivative data objects are associated in the system with the one or more data objects.

The method of embodiment (1) can further include receiving first consumer-user preference information indicating that an additional consumer-user has a system tracking preference for the first consumer-user; filtering the first brand information to create a second supplemental subset of first brand information that is provided to the additional consumer-user expressing a system tracking preference for the first consumer-user; and displaying to the additional consumer-user one or more data object representations and/or derivative data object representations relating to the second supplemental subset of the first brand information. The method of embodiment (1) can also include receiving first consumer-user preference information indicating that a first brand-user has a system tracking preference for the first consumer-user; filtering the first brand information to create a third supplemental subset of first brand information that is provided to the first brand-user expressing a system tracking preference for the first consumer-user; and displaying to the first brand-user one or more data object representations and/or derivative data object representations relating to the third supplemental subset of the first brand information.

The system tracking preference of embodiment (1) is expressed by following and/or listing a data object representation and/or a derivative data object representation.

The method of embodiment (1) can further include receiving additional brand preference information indicating that an additional brand of the plurality of brands has a preference for the first consumer-user; and displaying to the additional brand one or more data object representations relating to the subset of the first brand information. In one example of embodiment (1), a preference is expressed as a following, listing, friending, and/or liking a data object representation and/or a derivative data object representation. A system tracking preference can be selected from following and/or listing a data object representation and/or a derivative data object representation. For example, the expression of a system tracking preference for a data object representation by the first consumer-user generates a derivative data object based on the data object, wherein the derivative data object is associated in the system with the data object and the first consumer-user. The expression of a system tracking preference for a data object representation by a first brand-user can generate a derivative data object based on the data object, wherein the derivative data object is associated in the system with the data object and the first brand-user. In a specific example, a modification to a data object generates a modification to all derivative data objects of the data object. The modification can include an edit to one or more data object elements, an addition to the data object, deletion of one or more data object elements, the addition of a comment regarding a data object, or combinations thereof.

The system in embodiment (1) can include a first brand-user and the method further comprises displaying to the first brand-user interaction data related to the plurality of consumer-users expressing a preference for the first brand information; displaying to the first brand-user the subset of data object representations displayed to the first consumer-user; receiving subset preference information indicating that the first brand-user has expressed a preference for one or more data object representations of the subset; and displaying to the first brand user interactions with the subset of data object representations displayed to the first consumer-user and the first brand-user.

The method of embodiment (1) can further include receiving additional first brand information responsive to the first brand interaction data and/or the first brand comparative interaction data. The additional first brand information can include brand media, brand purchasing information, retail information, brand promotional information, one or more brand-specific supporting documents and information, one or more brand reviews, a brand rating, commercial item media, commercial item purchasing information, commercial item retail information, commercial item promotional information, one or more item-specific supporting documents and information, one or more commercial item reviews, a commercial item rating, or combinations thereof.

Embodiment (1)(a) relates to the subset of first brand information created by the method of embodiment (1), and embodiment (1)(b) relates to the subset of data object representations displayed to the first consumer-user by the method of embodiment (1).

Embodiment (2): a system, comprising: at least one processor, programmed to: receive first brand information; receive first brand preference information indicating that the first consumer-user has expressed a preference for the first brand information; filter the first brand information to create a subset of first brand information that is provided to the first consumer-user; display to the first consumer-user one or more data object representations relating to the subset of the first brand information; receive one or more first consumer-user interactions with the subset of data object representations displayed to the first consumer-user; display to the first brand: interaction data relating to the first brand and specific to one or more consumer-users; interaction data related to the first brand aggregated for a plurality of consumer-users on the system; comparative interaction data from a plurality of customer-users related to the first brand relative to a one or more other brands on the system; or combinations thereof.

The processor of embodiment (2) can be further programmed to receive additional brand information from a plurality of brands; receive additional brand preference information indicating that the first consumer-user has expressed a preference for an additional subset of the additional brand information; filter the first brand information and the additional brand information to create one or more supplemental subsets of additional brand information that is provided to the first consumer-user; display to the first consumer-user one or more data object representations relating to the one or more supplemental subsets of additional brand information; receive one or more first consumer-user interactions with the one or more data object representations relating to the one or more supplemental subsets of additional brand information; and display to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof. The processor can be further programmed to display to the first consumer-user first brand information not previously displayed to the first consumer-user on the system. The processor is further programmed to display, to one or more additional consumer-users, the one or more data object representations relating to the subset of the first brand information, wherein the one or more additional consumer-users have a relationship with the first consumer-user.

The interaction data of embodiment (2) can comprise the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

In embodiment (2), the one or more first consumer-user interactions with the subset of data object representations includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object representations of the subset to view first brand-hosted information, participating in a survey regarding one or more data object representations of the subset, requesting further information from the first brand regarding one or more data object representations of the subset, buying a commercial item displayed in one or more data object representations of the subset from a third-party retailer/reseller, buying a commercial item displayed in one or more data object representations of the subset directly from the first brand, buying a commercial item displayed in one or more data object representations of the subset from an individual, participating in an auction regarding one or more data object representations of the subset, offering a commercial item displayed in one or more data object representations in the subset for free, loan, sale, lease, and/or rental, requesting to purchase a commercial item displayed in one or more data object representations in the subset, requesting that a discontinued commercial item displayed in one or more data object representations in the subset is re-introduced by the first brand and/or an authorized retailer/reseller thereof, suggesting to the first brand product ideas, improvements, and/or corrections regarding one or more data object representations in the subset, or combinations thereof.

Interaction data, as used in embodiment (2), includes first brand data object representation-consumer clicks, first brand data object representation consumer impressions, first brand derivative data object representation consumer clicks, first brand derivative data object representation-system consumer impressions, total system-consumer clicks, system-consumer clicks per interest category, total system-consumer impressions, system-consumer impressions per interest category, average interest category click through rate, interest category seasonal trend data, average conversion rate, or combinations thereof. Likewise, demographic information, as used in embodiment (2), comprises gender, ethnicity, age, income, education, home ownership, location, employment status, shopping history, personal interests and/or hobbies, or combinations thereof.

The comparative interaction data of embodiment (2) for the first brand relative to the plurality of brands on the system and/or a subset of the plurality of brands on the system comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof. In addition, comparative interaction data comprises first brand data object representation-consumer clicks, first brand data object representation-consumer impressions, first brand derivative data object representation consumer clicks, first brand derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof. As used in this specific example, demographic information comprises gender, ethnicity, age, income, education, home ownership, location, employment status, shopping history, personal interests and/or hobbies, or combinations thereof.

Comparative interaction data in embodiment (2) can be collected over a defined time interval, e.g., a time period in which the first brand and/or a first brand competitor has participated in the system.

Moreover, comparative interaction data in embodiment (2) can further include brand ranking data for the first brand in relation to the plurality of brands, e.g., comparative interaction data further comprises brand ranking data for the first brand in relation to one or more competitor brands of the plurality of brands.

The first brand information of embodiment (2) can include general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof. In this specific embodiment, brand description information comprises a brand image, one or more brand-specific supporting documents and information, one or more brand reviews, a brand rating, or combinations thereof. Brand media includes a brand-specific video file, a brand-specific audio file, or print media; and brand-specific supporting documents and information comprises one or more literature references, reviews, blog link, press release, forum link, or combinations thereof.

The first brand information of embodiment (2) can include first brand commercial item information including information related to one or more commercial item trademarks, commercial item description information, commercial item media, commercial item purchasing information, commercial item retail information, commercial item promotional information, related first brand products, or combinations thereof. In this example, commercial item description information comprises an item image, one or more item-specific supporting documents and information, one or more commercial item reviews, a commercial item rating, or combinations thereof; commercial item media includes a commercial item-specific video file, a commercial item-specific audio file, or print media; and/or commercial item-specific supporting documents and information comprises one or more literature references, reviews, blog link, press release, forum link, or combinations thereof.

The first brand preference information of embodiment (2) includes system tracking preference for the first brand information and the processor is further programmed to filter the first brand information to create a first supplemental subset of first brand information that is provided to the first consumer-user expressing a system tracking preference for the first brand information; and display to the first consumer user one or more derivative data object representations relating to the first supplemental subset of the first brand information, wherein the one or more derivative data objects are associated in the system with the one or more data objects.

The processor of embodiment (2) can be further programmed to receive first consumer-user preference information indicating that an additional consumer-user has a system tracking preference for the first consumer-user; filter the first brand information to create a second supplemental subset of first brand information that is provided to the additional consumer-user expressing a system tracking preference for the first consumer-user; and display to the additional consumer-user one or more data object representations and/or derivative data object representations relating to the second supplemental subset of the first brand information. The processor of this embodiment (2) can be further programmed to receive first consumer-user preference information indicating that a first brand-user has a system tracking preference for the first consumer-user; filter the first brand information to create a third supplemental subset of first brand information that is provided to the first brand-user expressing a system tracking preference for the first consumer-user; and display to the first brand-user one or more data object representations and/or derivative data object representations relating to the third supplemental subset of the first brand information.

As used in embodiment (2), a system tracking preference is expressed by following and/or listing a data object representation and/or a derivative data object representation.

The processor of embodiment (2) can be further programmed to receive additional brand preference information indicating that an additional brand of the plurality of brands has a preference for the first consumer-user; and display to the additional brand one or more data object representations relating to the subset of the first brand information. For example, preference is expressed as a following, listing friending, and/or liking a data object representation and/or a derivative data object representation. The preference can be a system tracking preference selected from following and/or listing a data object representation and/or a derivative data object representation.

The processor of embodiment (2) can be further programmed to generate a derivative data object in response to the expression of a system tracking preference for a data object representation by the first consumer-user, and associate the derivative data object in the system with the data object and the first consumer-user. The processor of this embodiment can also be further programmed to generate a derivative data object in response to the expression of a system tracking preference for a data object representation by a first brand-user, and associate the derivative data object in the system with the data object and the first brand-user.

The system of embodiment (2) can also include a first brand-user and the processor is further programmed to display to the first brand-user interaction data related to the plurality of consumer-users expressing a preference for the first brand information; display to the first brand-user the subset of data object representations displayed to the first consumer-user; receive subset preference information indicating that the first brand-user has expressed a preference for one or more data object representations of the subset; and display to the first brand user interactions with the subset of data object representations displayed to the first consumer-user and the first brand-user.

Still further, the processor of embodiment (2) can be further programmed to receive additional first brand information responsive to the first brand interaction data and/or the first brand comparative interaction data, e.g., the additional first brand information comprises brand media, brand purchasing information, retail information, brand promotional information, one or more brand-specific supporting documents and information, one or more brand reviews, a brand rating, commercial item media, commercial item purchasing information, commercial item retail information, commercial item promotional information, one or more item-specific supporting documents and information, one or more commercial item reviews, a commercial item rating, or combinations thereof.

Embodiment (2)(a) is a subset of first brand information created by the system of embodiment (2). Embodiment (2)(b) is a subset of data object representations displayed to the first consumer-user by the system of embodiment (2).

Embodiment (3): at least one computer-readable storage medium having instructions recorded thereon which, when executed by at least one computer, perform a method of exchanging brand information on a system, wherein the system has (i) a plurality of consumer-users including a first consumer-user, and (ii) a plurality of brands including a first brand, the method comprising acts of: receiving first brand information; receiving first brand preference information indicating that the first consumer-user has expressed a preference for the first brand information; filtering the first brand information to create a subset of first brand information that is provided to the first consumer-user; displaying to the first consumer-user one or more data object representations relating to the subset of the first brand information; receiving one or more first consumer-user interactions with the one or more data object representations relating to the subset of first brand information; displaying to the first brand: interaction data relating to the first brand and specific to one or more consumer-users; interaction data related to the first brand aggregated for a plurality of consumer-users on the system; comparative interaction data from a plurality of customer-users related to the first brand relative to a one or more other brands on the system; or combinations thereof.

The method of the at least one computer-readable storage medium of Embodiment (3) can further comprise: receiving additional brand information from a plurality of brands; receiving additional brand preference information indicating that the first consumer-user has expressed a preference for an additional subset of the additional brand information; filtering the first brand information and the additional brand information to create one or more supplemental subsets of additional brand information that is provided to the first consumer-user; displaying to the first consumer-user one or more data object representations relating to the one or more supplemental subsets of additional brand information; receiving one or more first consumer-user interactions with the one or more data object representations relating to the one or more supplemental subsets of additional brand information; and displaying to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof. Moreover, the method can also include displaying to the first consumer-user first brand information not previously displayed to the first consumer-user on the system.

The displaying step of the at least one computer readable storage medium of embodiment (3) can also include displaying to one or more additional consumer-users one or more data object representations relating to the subset of the first brand information, wherein the one or more additional consumer-users have a relationship with the first consumer-user.

The interaction data of embodiment (3) can comprise the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

The first consumer-user interactions with the subset of data object representations of embodiment (3) includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first brand-hosted information, participating in a survey regarding one or more data object representations of the subset, requesting further information from the first brand regarding one or more data object representations of the subset, buying a commercial item displayed in one or more data object representations of the subset from a third-party retailer/reseller, buying a commercial item displayed in one or more data object representations of the subset directly from the first brand, buying a commercial item displayed in one or more data object representations of the subset from an individual, participating in an auction regarding one or more data object representations of the subset, offering a commercial item displayed in one or more data object representations in the subset for free, loan, sale, lease, and/or rental, requesting to purchase a commercial item displayed in one or more data object representations in the subset, requesting that a discontinued commercial item displayed in one or more data object representations in the subset is re-introduced by the first brand and/or an authorized retailer/reseller thereof, suggesting to the first brand product ideas, improvements, and/or corrections regarding one or more data object representations in the subset, or combinations thereof.

The interaction data of embodiment (3) can also include first brand data object representation-consumer clicks, first brand data object representation consumer impressions, first brand derivative data object representation consumer clicks, first brand derivative data object representation-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

Demographic information, as used in relation to embodiment (3), comprises gender, ethnicity, age, income, education, home ownership, location, employment status, shopping history, personal interests and/or hobbies, or combinations thereof.

Moreover, as used in embodiment (3), comparative interaction data for the first brand relative to the plurality of brands on the system and/or a subset of the plurality of brands on the system comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof. Still further, the comparative interaction data can comprise first brand data object representation-consumer clicks, first brand data object representation-consumer impressions, first brand derivative data object representation consumer clicks, first brand derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof. In one example of embodiment (3), the comparative interaction data is collected over a defined time interval, e.g., wherein the defined time interval is a time period in which the first brand and/or a first brand competitor has participated in the system.

The comparative interaction data of embodiment (3) further comprises brand ranking data for the first brand in relation to the plurality of brands, e.g., the comparative interaction data further comprises brand ranking data for the first brand in relation to one or more competitor brands of the plurality of brands.

The first brand information of embodiment (3) comprises general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof.

The brand description information of embodiment (3) comprises a brand image, one or more brand-specific supporting documents and information, one or more brand reviews, a brand rating, or combinations thereof. For example, brand media includes a brand-specific video file, a brand-specific audio file, or print media; and brand-specific supporting documents and information comprises one or more literature references, reviews, blog link, press release, forum link, or combinations thereof.

The first brand information of embodiment (3) comprises first brand commercial item information including information related to one or more commercial item trademarks, commercial item description information, commercial item media, commercial item purchasing information, commercial item retail information, commercial item promotional information, related first brand products, or combinations thereof. For example, commercial item description information comprises an item image, one or more item-specific supporting documents and information, one or more commercial item reviews, a commercial item rating, or combinations thereof. Still further, commercial item media includes a commercial item-specific video file, a commercial item-specific audio file, or print media; and commercial item-specific supporting documents and information comprises one or more literature references, reviews, blog link, press release, forum link, or combinations thereof.

The first brand preference information of embodiment (3) includes system tracking preference for the first brand information and the method further comprises filtering the first brand information to create a first supplemental subset of first brand information that is provided to the first consumer-user expressing a system tracking preference for the first brand information; and displaying to the first consumer user one or more derivative data object representations relating to the first supplemental subset of the first brand information, wherein the one or more derivative data objects are associated in the system with the one or more data objects.

The at least one computer-readable storage medium of embodiment (3) further comprises receiving first consumer-user preference information indicating that an additional consumer-user has a system tracking preference for the first consumer-user; filtering the first brand information to create a second supplemental subset of first brand information that is provided to the additional consumer-user expressing a system tracking preference for the first consumer-user; and displaying to the additional consumer-user one or more data object representations and/or derivative data object representations relating to the second supplemental subset of the first brand information.

Moreover, the at least one computer-readable storage medium of embodiment (3) further comprises receiving first consumer-user preference information indicating that a first brand-user has a system tracking preference for the first consumer-user; filtering the first brand information to create a third supplemental subset of first brand information that is provided to the first brand-user expressing a system tracking preference for the first consumer-user; and displaying to the first brand-user one or more data object representations and/or derivative data object representations relating to the third supplemental subset of the first brand information. The system tracking preference of embodiment (3) can be expressed by following and/or listing a data object and/or a derivative data object. The at least one computer-readable storage medium of embodiment (3) may further include receiving additional brand preference information indicating that an additional brand of the plurality of brands has a preference for the first consumer-user; and displaying to the additional brand one or more data object representations relating to the subset of the first brand information. In this example, the preference is expressed as a following, listing, friending, and/or liking a data object and/or a derivative data object. In one specific example, the preference is a system tracking preference selected from following and/or listing a data object and/or a derivative data object. Moreover, in another example, the expression of a system tracking preference for a data object representation by the first consumer-user generates a derivative data object based on the data object, wherein the derivative data object is associated in the system with the data object, the first consumer-user, and the one or more additional consumer-users having a relationship with the first consumer-user. In addition or alternative, the expression of a system tracking preference for a data object representation by a first brand-user generates a derivative data object based on the data object, wherein the derivative data object is associated in the system with the data object, a first brand-user, and one or more additional consumer-users and/or brand-users having a relationship with the first brand-user. For example, a modification to a data object generates a modification to all derivative data objects of the data object, e.g., the modification includes an edit to one or more data object elements, an addition to the data object, deletion of one or more data object elements, the addition of a comment regarding a data object, or combinations thereof.

The system of the at least one computer-readable storage medium of embodiment (3) includes a first brand-user and the method further comprises displaying to the first brand-user interaction data related to the plurality of consumer-users expressing a preference for the first brand information; displaying to the first brand-user the subset of data object representations displayed to the first consumer-user; receiving subset preference information indicating that the first brand-user has expressed a preference for one or more data object representations of the subset; and displaying to the first brand user interactions with the subset of data object representations displayed to the first consumer-user and the first brand-user.

The at least one computer-readable storage medium of embodiment (3) can also include receiving additional first brand information relating to (a) the general first brand information and/or the first brand commercial item; and (b) responsive to the first brand interaction data and/or the first brand comparative interaction data. For example, the additional first brand information comprises brand media, brand purchasing information, retail information, brand promotional information, one or more brand-specific supporting documents and information, one or more brand reviews, a brand rating, commercial item media, commercial item purchasing information, commercial item retail information, commercial item promotional information, one or more item-specific supporting documents and information, one or more commercial item review s, a commercial item rating, or combinations thereof.

Embodiment (3)(a): the subset of first brand information created by the at least one computer readable storage medium of embodiment (3).

Embodiment (3)(b): the subset of data object representations displayed to the first consumer-user by the at least one computer readable storage medium of embodiment (3).

Embodiment (4): a method of exchanging information on a system having a plurality of consumer-users including a first consumer-user, the method comprising acts of: receiving information indicating that a first consumer-user has a preference for a commercial item and/or brand; receiving item and/or brand information, provided by at least some of the plurality of consumer-users and/or the brand relating to the commercial item and/or brand; filtering the item and/or brand information to create a subset of the item and/or brand information that is provided to the first consumer-user; and displaying to the first consumer user one or more data object representations relating to the subset of the item and/or brand information.

The method of embodiment (4) may further include: receiving additional brand information from a plurality of brands; receiving additional brand preference information indicating that the first consumer-user has expressed a preference for an additional subset of the additional brand information; filtering the first brand information and the additional brand information to create one or more supplemental subsets of additional brand information that is provided to the first consumer-user; displaying to the first consumer-user one or more data object representations relating to the one or more supplemental subsets of additional brand information; receiving one or more first consumer-user interactions with the one or more data object representations relating to the one or more supplemental subsets of additional brand information; and displaying to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof.

Moreover, the method of embodiment (4) can further include displaying to the first consumer-user first brand information not previously displayed to the first consumer-user on the system. The displaying step (d) in this embodiment can also include displaying to one or more additional consumer-users one or more data object representations relating to the subset of the first brand information, wherein the one or more additional consumer-users have a relationship with the first consumer-user.

Embodiment (4) can also include receiving additional information relating to the commercial item and/or brand; filtering the additional item and/or brand information to create an additional subset of the additional item and/or brand information that is provided to consumer-users included in the group of consumer-users having an interest in the commercial item and/or brand; and displaying to the first consumer-user one or more derivative data object representations relating to the additional subset of additional item and/or brand information.

In embodiment (4), the one or more data object representations can be displayed in an order based at least in part on an order in which item and/or brand information is received from consumer-users in the group of consumer-users having a relationship with the first consumer-user. Alternatively or additionally, the one or more data object representations can be displayed in an order based at least in part on an order in which information indicating that the first consumer-user has an interest in a corresponding one or more commercial items and/or brands is received. Still further, a separate data object for each commercial item and/or brand selected by the first consumer-user is displayed in embodiment (4).

Embodiment (4)(a): the subset of first brand information created by the method of embodiment (4).

Embodiment (4)(b): the subset of data object representations displayed to the first consumer-user by the method of embodiment (4).

Embodiment (5): a system, comprising at least one processor, programmed to: receive information indicating that the first consumer-user has an interest in a commercial item and/or brand; receive item and/or brand information, provided by at least some of the plurality of consumer-users, relating to the commercial item and/or brand; filter the item and/or brand information to create a subset of the item and/or brand information that is provided by the first consumer-user; and display to the first consumer-user one or more data object representations relating to the subset of the item and/or brand information.

The system of embodiment (5) wherein the processor can be further programmed to receive additional brand information from a plurality of brands; receive additional brand preference information indicating that the first consumer-user has expressed a preference for an additional subset of the additional brand information; filter the first brand information and the additional brand information to create one or more supplemental subsets of additional brand information that is provided to the first consumer-user; display to the first consumer-user one or more data object representations relating to the one or more supplemental subsets of additional brand information; receive one or more first consumer-user interactions with the one or more data object representations relating to the one or more supplemental subsets of additional brand information; and display to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof. The processor can also be programmed to display to the first consumer-user first brand information not previously displayed to the first consumer-user on the system.

The system of embodiment (5) wherein the processor can be further programmed to display, to one or more additional consumer-users, one or more data object representations relating to the subset of the first brand information, wherein the one or more additional consumer-users have a relationship with the first consumer-user.

The processor of embodiment (5) can be further programmed to receive additional information relating to the commercial item and/or brand provided by at least some of the plurality of consumer-users relating to the commercial item and/or brand; filter the additional item and/or brand information to create an additional subset of the additional item and/or brand information that is provided to consumer-users included in the group of consumer-users having a relationship with the consumer-user; and display to the first consumer-user one or more derivative data object representations relating to the additional subset of additional item and/or brand information.

The one or more derivative data objects of embodiment (5) can be associated in the system with the one or more data objects.

The processor of embodiment (5) can be programmed to display the one or more data object representations in an order which is based at least in part on an order in which item information is received from consumer-users in the group of consumer-users having a relationship with the first consumer-user. Additionally or alternatively, the processor can be programmed to display the one or more data object representations in an order which is based at least in part on an order in which information indicating that the first consumer-user has an interest in a corresponding one or more commercial items is received. In a specific example of embodiment (5), the processor is programmed to display a separate data object for each commercial item selected by the first consumer-user.

Embodiment (5)(a): a subset of first brand information created by the system of embodiment (5).

Embodiment (5)(b): a subset of data object representations displayed to the first consumer-user by the system of embodiment (5).

Embodiment (6): at least one computer-readable storage medium having instructions recorded thereon which, when executed by at least one computer, perform a method for use in a system having a plurality of consumer-users including a first consumer-user, the method comprising acts of: receiving information indicating that a first consumer-user has a preference for a commercial item and/or brand; receiving item and/or brand information, provided by at least some of the plurality of consumer-users and/or the brand relating to the commercial item and/or brand; filtering the item and/or brand information to create a subset of the item and/or brand information that is provided to the first consumer-user; and displaying to the first consumer user one or more data object representations relating to the subset of the item and/or brand information.

The method carried out by the at least one computer-readable storage medium of embodiment (6) may further include: receiving additional brand information from a plurality of brands; receiving additional brand preference information indicating that the first consumer-user has expressed a preference for an additional subset of the additional brand information; filtering the first brand information and the additional brand information to create one or more supplemental subsets of additional brand information that is provided to the first consumer-user; displaying to the first consumer-user one or more data object representations relating to the one or more supplemental subsets of additional brand information; receiving one or more first consumer-user interactions with the one or more data object representations relating to the one or more supplemental subsets of additional brand information; and displaying to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof. Optionally, the method further comprises displaying to the first consumer-user first brand information not previously displayed to the first consumer-user on the system.

The displaying step of embodiment (6) can also include displaying to one or more additional consumer-users one or more data object representations relating to the subset of the first brand information, wherein the one or more additional consumer-users have a relationship with the first consumer-user. Moreover, embodiment (6) can further comprise receiving additional information relating to the commercial item and/or brand provided by at least some of the plurality of consumer-users relating to the commercial item and/or brand; filtering the additional item and/or brand information to create an additional subset of the additional item and/or brand information that is provided to consumer-users included in the group of consumer-users having a relationship with the first consumer-user; and displaying to the first consumer-user one or more derivative data object representations relating to the subset of additional item and/or brand information.

The at least one computer-readable storage medium of embodiment (6) can further include displaying the one or more data object representations in an order based at least in part on an order in which item information is received from consumer-users in the group of users having a relationship with the first consumer-users; displaying the one or more data object representations in an order based at least in part on an order in which information indicating that the first consumer-user has an interest in a corresponding one or more commercial items is received; or displaying a separate data object for each commercial item selected by the first consumer-user.

Embodiment (6)(a): a subset of first brand information created by the at least one computer-readable storage medium of embodiment (6).

Embodiment (6)(b): a subset of data object representations displayed to the first consumer-user by the at least one computer-readable storage medium of embodiment (6).

Embodiment (7): a method of exchanging information on a system between a first brand and a first consumer-user, the system comprising (a) a plurality of consumer-users including the first consumer-user, and (b) a plurality of brands including the first brand, wherein the system is configured to receive, filter, and/or display information related to the first consumer-user, the first brand, the plurality of consumer-users, the plurality of brands, a commercial item, interaction data, comparative interaction data and combinations thereof; the method comprising acts of: viewing, by the first brand, interaction data related to the plurality of consumer-users expressing a preference for first brand information; and providing additional first brand information responsive to the first brand interaction data.

The method of embodiment (7) can also include viewing, by the first brand, brand comparative interaction data for the first brand relative to the plurality of brands on the system and/or a subset of the plurality of brands on the system; and providing additional first brand information relating to (i) the general first brand information and/or the first brand commercial item; and (ii) responsive to the first brand interaction data and/or the first brand comparative interaction data. Optionally, prior to viewing step (a), the method can also include providing, by the first brand, first brand information relating to general first brand information and/or the first brand commercial item.

The interaction data of embodiment (7) can include the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

In embodiment (7), the one or more first consumer-user interactions with the subset of data object representations can include: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first brand-hosted information, participating in a survey regarding one or more data object representations of the subset, requesting further information from the first brand regarding one or more data object representations of the subset, buying a commercial item displayed in one or more data object representations of the subset from a third-party retailer/reseller, buying a commercial item displayed in one or more data object representations of the subset directly from the first brand, buying a commercial item displayed in one or more data object representations of the subset from an individual, participating in an auction regarding one or more data object representations of the subset, offering a commercial item displayed in one or more data object representations in the subset for free, loan, sale, lease, and/or rental, requesting to purchase a commercial item displayed in one or more data object representations in the subset, requesting that a discontinued commercial item displayed in one or more data object representations in the subset is re-introduced by the first brand and/or an authorized retailer/reseller thereof, suggesting to the first brand product ideas, improvements, and/or corrections regarding one or more data objects in the subset, or combinations thereof.

The interaction data of embodiment (7) can comprise first brand data object-consumer clicks, first brand data object consumer impressions, first brand derivative data object consumer clicks, first brand derivative data object-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

As used in embodiment (7), demographic information comprises gender, ethnicity, age, income, education, home ownership, location, employment status, shopping history, personal interests and/or hobbies, or combinations thereof; comparative interaction data for the first brand relative to the plurality of brands on the system and/or a subset of the plurality of brands on the system comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof; comparative interaction data comprises first brand data object representation-consumer clicks, first brand data object representation-consumer impressions, first brand derivative data object representation consumer clicks, first brand derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof. Comparative interaction data can be collected over a defined time interval, e.g., wherein the defined time interval is a time period in which the first brand and/or a first brand competitor has participated in the system.

The comparative interaction data of embodiment (7) can also include brand ranking data for the first brand in relation to the plurality of brands, e.g., the comparative interaction data further comprises brand ranking data for the first brand in relation to one or more competitor brands of the plurality of brands.

The first brand information of embodiment (7) can include general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof. In a specific example, brand description information comprises a brand image, one or more brand-specific supporting documents and information, one or more brand reviews, a brand rating, or combinations thereof; brand media includes a brand-specific video file, a brand-specific audio file, or print media; and/or brand-specific supporting documents and information comprises one or more literature references, reviews, blog link, press release, forum link, or combinations thereof.

The first brand information of embodiment (7) can include first brand commercial item information including information related to one or more commercial item trademarks, commercial item description information, commercial item media, commercial item purchasing information, commercial item retail information, commercial item promotional information, related first brand products, or combinations thereof. The commercial item description information comprises an item image, one or more item-specific supporting documents and information, one or more commercial item reviews, a commercial item rating, or combinations thereof; commercial item media includes a commercial item-specific video file, a commercial item-specific audio file, or print media; commercial item-specific supporting documents and information comprises one or more literature references, reviews, blog link, press release, forum link, or combinations thereof.

The preference of embodiment (7) can be expressed as a following, friending, and/or liking a data object representation and/or a derivative data object representation. For example, the preference is a system tracking preference selected from following and/or listing a data object representation and/or a derivative data object representation. The expression of a system tracking preference for a data object representation by the first consumer-user generates a derivative data object based on the data object, wherein the derivative data object is associated in the system with the data object, the first consumer-user, and the one or more additional consumer-users having a relationship with the first consumer-user. Alternatively or additionally, the expression of a system tracking preference for a data object representation by a first brand-user generates a derivative data object based on the data object, wherein the derivative data object is associated in the system with the data object, a first brand-user, and one or more additional consumer-users and/or brand-users having a relationship with the first brand-user.

The method of embodiment (7) can include a modification to a data object generates a modification to all derivative data objects of the data object. For example, the modification includes an edit to one or more data object elements, an addition to the data object, deletion of one or more data object elements, the addition of a comment regarding a data object, or combinations thereof.

The additional first brand information of embodiment (7) can include brand media, brand purchasing information, retail information, brand promotional information, one or more brand-specific supporting documents and information, one or more brand reviews, a brand rating, commercial item media, commercial item purchasing information, commercial item retail information, commercial item promotional information, one or more item-specific supporting documents and information, one or more commercial item reviews, a commercial item rating, or combinations thereof.

Embodiment (8): a method of exchanging information on a system between a first brand and a first consumer-user, the system comprising (a) a plurality of consumer-users including the first consumer-user, and (b) a plurality of brands including the first brand, wherein the system is configured to receive, filter, and/or display information related to the first consumer-user, the first brand, the plurality of consumer-users, the plurality of brands, a commercial item, interaction data, comparative interaction data and combinations thereof; the method comprising acts of: viewing, by the first consumer-user, first brand information; expressing a preference for the first brand information; and viewing, by the first consumer-user, a subset of first brand information that is provided by the system to the first consumer-user.

The first brand information of embodiment (8) can include general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof. For example, brand description information comprises a brand image, one or more brand-specific supporting documents and information, one or more brand reviews, a brand rating, or combinations thereof; brand media includes a brand-specific video file, a brand-specific audio file, or print media; and brand-specific supporting documents and information comprises one or more literature references, reviews, blog link, press release, forum link, or combinations thereof.

In a specific example of embodiment (8), the first brand information comprises first brand commercial item information including information related to one or more commercial item trademarks, commercial item description information, commercial item media, commercial item purchasing information, commercial item retail information, commercial item promotional information, related first brand products, or combinations thereof. For example, the commercial item description information comprises an item image, one or more item-specific supporting documents and information, one or more commercial item reviews, a commercial item rating, or combinations thereof; the commercial item media includes a commercial item-specific video file, a commercial item-specific audio file, or print media; and/or the commercial item-specific supporting documents and information comprises one or more literature references, reviews, blog link, press release, forum link, or combinations thereof. In a specific example, a preference is expressed as a following, friending, and/or liking a data object and/or a derivative data object, e.g., a system tracking preference selected from following and/or listing a data object and/or a derivative data object.

Example (9): a method of exchanging information on a system between a first consumer-user and one or more additional consumer-users, the system comprising (a) a plurality of consumer-users including the first consumer-user and the one or more additional consumer-users, wherein the first and one or more additional consumer-users are connected in the system, and (b) a plurality of brands including the first brand, wherein the system is configured to receive, filter, and/or display information related to the first consumer-user, the first brand, the plurality of consumer-users, the plurality of brands, a commercial item, interaction data, comparative interaction data and combinations thereof; the method comprising acts of: viewing, by the first consumer-user, a subset of first brand information that is provided by the system to the first consumer-user and the one or more additional consumer-users; and viewing, by the first consumer-user, an interaction with the subset of first brand information comprising: (i) a preference expressed by the first consumer-user and/or the one or more additional consumer-users, wherein the preference is for one or more members of the subset of first brand information; (ii) a comment provided by the first consumer-user and/or the one or more additional consumer-users, wherein the comment relates to one or more members of the subset of first brand information, wherein the comment is provided by the first consumer-user and/or the one or more additional consumer-users; or (iii) combinations thereof.

In embodiment (9), the interaction with the subset can include: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first brand-hosted information, participating in a survey regarding one or more data object representations of the subset, requesting further information from the first brand regarding one or more data object representations of the subset, buying a commercial item displayed in one or more data object representations of the subset from a third-party retailer/reseller, buying a commercial item displayed in one or more data object representations of the subset directly from the first brand, buying a commercial item displayed in one or more data object representations of the subset from an individual, participating in an auction regarding one or more data object representations of the subset, offering a commercial item displayed in one or more data object representations in the subset for free, loan, sale, lease, and/or rental, requesting to purchase a commercial item displayed in one or more data object representations in the subset, requesting that a discontinued commercial item displayed in one or more data object representations in the subset is re-introduced by the first brand and/or an authorized retailer/reseller thereof, suggesting to the first brand product ideas, improvements, and/or corrections regarding one or more data objects in the subset, or combinations thereof.

The first brand information of embodiment (9) can include general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof; brand description information comprises a brand image, one or more brand-specific supporting documents and information, one or more brand reviews, a brand rating, or combinations thereof; brand media includes a brand-specific video file, a brand-specific audio file, or print media; and/or brand-specific supporting documents and information comprises one or more literature references, reviews, blog link, press release, forum link, or combinations thereof.

The first brand information of embodiment (9) can also include first brand commercial item information including information related to one or more commercial item trademarks, commercial item description information, commercial item media, commercial item purchasing information, commercial item retail information, commercial item promotional information, related first brand products, or combinations thereof; commercial item description information comprises an item image, one or more item-specific supporting documents and information, one or more commercial item reviews, a commercial item rating, or combinations thereof; commercial item media includes a commercial item-specific video file, a commercial item-specific audio file, or print media; and/or the commercial item-specific supporting documents and information comprises one or more literature references, reviews, blog link, press release, forum link, or combinations thereof.

Embodiment (10): a method of exchanging brand information on a system, wherein the system has (i) a plurality of consumer-users including a first consumer-user and one or more additional consumer-users, and (ii) a plurality of brands including a first brand, the method comprising acts of: receiving first brand information; receiving first brand preference information indicating that the first consumer-user has expressed a preference for the first brand information; filtering the first brand information to create a subset of first brand information that is provided to the first consumer-user, wherein the subset comprises first brand information not previously displayed to the first consumer-user on the system; displaying to the first consumer-user one or more data object representations relating to the subset of the first brand information; receiving one or more first consumer-user interactions with the one or more data object representations relating to the subset of first brand information; displaying to the first brand: interaction data relating to the first brand and specific to one or more consumer-users; interaction data related to the first brand aggregated for a plurality of consumer-users on the system; comparative interaction data from a plurality of customer-users related to the first brand relative to a one or more other brands on the system; or combinations thereof.

The method of embodiment (10) can further include: receiving additional brand information from a plurality of brands; receiving additional brand preference information indicating that the first consumer-user has expressed a preference for an additional subset of the additional brand information; filtering the first brand information and the additional brand information to create one or more supplemental subsets of additional brand information that is provided to the first consumer-user; displaying to the first consumer-user one or more data object representations relating to the one or more supplemental subsets of additional brand information; receiving one or more first consumer-user interactions with the one or more data object representations relating to the one or more supplemental subsets of additional brand information; and displaying to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof.

The method of embodiment (10) can further include displaying to the first consumer-user first brand information not previously displayed to the first consumer-user on the system. In addition, the displaying step of embodiment (10) can also include displaying to one or more additional consumer-users one or more data object representations relating to the subset of the first brand information, wherein the one or more additional consumer-users have a relationship with the first consumer-user.

The interaction data of embodiment (10) can include the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

In embodiment (10), the one or more first consumer-user interactions with the subset of data object representations can include: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first brand-hosted information, participating in a survey regarding one or more data object representations of the subset, requesting further information from the first brand regarding one or more data object representations of the subset, buying a commercial item displayed in one or more data object representations of the subset from a third-party retailer/reseller, buying a commercial item displayed in one or more data object representations of the subset directly from the first brand, buying a commercial item displayed in one or more data object representations of the subset from an individual, participating in an auction regarding one or more data object representations of the subset, offering a commercial item displayed in one or more data object representations in the subset for free, loan, sale, lease, and/or rental, requesting to purchase a commercial item displayed in one or more data object representations in the subset, requesting that a discontinued commercial item displayed in one or more data object representations in the subset is re-introduced by the first brand and/or an authorized retailer/reseller thereof, suggesting to the first brand product ideas, improvements, and/or corrections regarding one or more data object representations in the subset, or combinations thereof. In one specific example, the interaction data includes first brand data object-consumer clicks, first brand data object consumer impressions, first brand derivative data object consumer clicks, first brand derivative data object-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

As used in embodiment (10), demographic information comprises gender, ethnicity, age, income, education, home ownership, location, employment status, shopping history, personal interests and/or hobbies, or combinations thereof.

The comparative interaction data of embodiment (10) can include the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof. For example, the comparative interaction data comprises first brand data object representation-consumer clicks, first brand data object representation-consumer impressions, first brand derivative data object representation consumer clicks, first brand derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof. In one example, the comparative interaction data is collected over a defined time interval, e.g., the defined time interval is a time period in which the first brand and/or a first brand competitor has participated in the system. In an additional example, the comparative interaction data further comprises brand ranking data for the first brand in relation to the plurality of brands, e.g., comparative interaction data further comprises brand ranking data for the first brand in relation to one or more competitor brands of the plurality of brands.

The first brand information of embodiment (10) can comprise general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof. The brand description information can include a brand image, one or more brand-specific supporting documents and information, one or more brand reviews, a brand rating, or combinations thereof; the brand media includes a brand-specific video file, a brand-specific audio file, or print media; and/or the brand-specific supporting documents and information comprises one or more literature references, reviews, blog link, press release, forum link, or combinations thereof. Moreover, the first brand information can include first brand commercial item information including information related to one or more commercial item trademarks, commercial item description information, commercial item media, commercial item purchasing information, commercial item retail information, commercial item promotional information, related first brand products, or combinations thereof. For example, the commercial item description information comprises an item image, one or more item-specific supporting documents and information, one or more commercial item reviews, a commercial item rating, or combinations thereof; the commercial item media includes a commercial item-specific video file, a commercial item-specific audio file, or print media; the commercial item-specific supporting documents and information comprises one or more literature references, reviews, blog link, press release, forum link, or combinations thereof.

The first brand preference information of embodiment (10) can include system tracking preference for the first brand information and the method further comprises filtering the first brand information to create a first supplemental subset of first brand information that is provided to the first consumer-user expressing a system tracking preference for the first brand information; and displaying to the first consumer user one or more derivative data object representations relating to the first supplemental subset of the first brand information, wherein the one or more derivative data object representations are associated in the system with the one or more data object representations.

The method of embodiment (10) can further comprise receiving first consumer-user preference information indicating that an additional consumer-user has a system tracking preference for the first consumer-user; filtering the first brand information to create a second supplemental subset of first brand information that is provided to the additional consumer-user expressing a system tracking preference for the first consumer-user; and displaying to the additional consumer-user one or more data object representations and/or derivative data object representations relating to the second supplemental subset of the first brand information. The method of embodiment (10) can also include receiving first consumer-user preference information indicating that a first brand-user has a system tracking preference for the first consumer-user; filtering the first brand information to create a third supplemental subset of first brand information that is provided to the first brand-user expressing a system tracking preference for the first consumer-user; and displaying to the first brand-user one or more data object representations and/or derivative data object representations relating to the third supplemental subset of the first brand information. The system tracking preference of embodiment (10) can be expressed by following and/or listing a data object and/or a derivative data object.

The method of embodiment (10) can include receiving additional brand preference information indicating that an additional brand of the plurality of brands has a preference for the first consumer-user; and displaying to the additional brand one or more data object representations relating to the subset of the first brand information.

A preference in embodiment (10) can be expressed as a following, listing, friending, and/or liking a data object representation and/or a derivative data object representation. For example, the preference can be a system tracking preference selected from following and/or listing a data object representation and/or a derivative data object representation. The expression of a system tracking preference for a data object representation by the first consumer-user can generate a derivative data object based on the data object, wherein the derivative data object is associated in the system with the data object and the first consumer-user. Additionally or alternatively, the expression of a system tracking preference for a data object representation by a first brand-user can generate a derivative data object based on the data object, wherein the derivative data object is associated in the system with the data object and the first brand-user.

The method of embodiment (10) can include a modification to a data object that generates a modification to all derivative data objects of the data object. For example, the modification includes an edit to one or more data object elements, an addition to the data object, deletion of one or more data object elements, the addition of a comment regarding a data object, or combinations thereof.

The system in embodiment (10) can include a first brand-user and the method further comprises displaying to the first brand-user interaction data related to the plurality of consumer-users expressing a preference for the first brand information; displaying to the first brand-user the subset of data object representations displayed to the first consumer-user; receiving subset preference information indicating that the first brand-user has expressed a preference for one or more data object representations of the subset; and displaying to the first brand user interactions with the subset of data object representations displayed to the first consumer-user and the first brand-user.

The method of embodiment (10) can also include receiving additional first brand information responsive to the first brand interaction data and/or the first brand comparative interaction data. For example, the additional first brand information comprises brand media, brand purchasing information, retail information, brand promotional information, one or more brand-specific supporting documents and information, one or more brand reviews, a brand rating, commercial item media, commercial item purchasing information, commercial item retail information, commercial item promotional information, one or more item-specific supporting documents and information, one or more commercial item reviews, a commercial item rating, or combinations thereof.

Embodiment (10)(a): a subset of first brand information created by the method of embodiment (10).

Embodiment (10)(b): a subset of data object representations displayed to the first consumer-user by the method of embodiment (10).

Embodiment (10)(c): a system comprising a processor programmed to practice the method of embodiment (10).

Embodiment (10)(d): at least one computer-readable storage medium having instructions recorded thereon which, when executed by at least one computer, perform a method of any one of embodiment (10).

Embodiment (11): a method of or employed by a system and/or computer readable medium of any one of the previous embodiments embodiment in which the subset identifies the first brand information not previously displayed to the first consumer-user.

Embodiment (12): a system of any one of the previous embodiments, wherein said subset identifies the first brand information not previously displayed to the first consumer-user.

Embodiment (13): at least one computer readable medium of any one of the previous embodiments wherein said subset identifies the first brand information not previously displayed to the first consumer-user.

BRIEF DESCRIPTION OF DRAWINGS

The accompanying drawings are provided to illustrate rather than limit the scope of the invention.

FIG. 3(a) is one example of a consumer-user profile creation screen that can be used on the system.

FIGS. 5(a)-(c) illustrate one embodiment of how a brand can create a profile on the system.

FIGS. 11(a)-(c) and 12(a)-(d) illustrate the display of a set of data object representations on a television screen.

DETAILED DESCRIPTION OF THE INVENTION

Figure 1A:
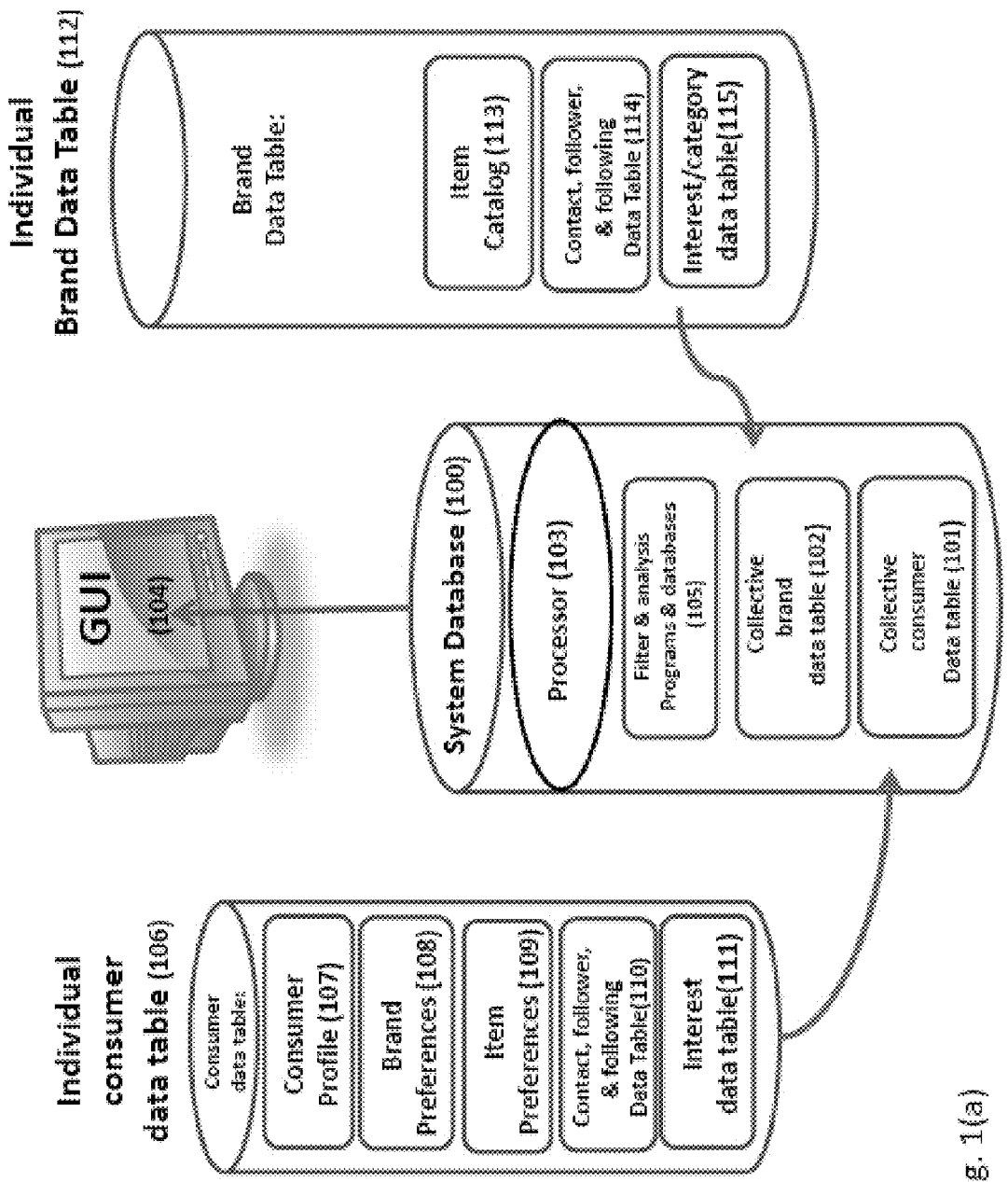
FIG. 1(a) is a schematic representation of the system, including a processor, filter and analysis programs, collective brand data table, and a collective consumer data table, wherein the collective brand data table draws information from an individual brand data table, and likewise, the collective consumer data table draws information from an individual consumer data table.

Descriptions of certain embodiments for practicing aspects of the invention will be discussed below. The examples should not be considered limiting, but are intended to illustrate certain inventive aspects. It will be useful to appreciate, in reading the detailed description, that certain words or terms have defined meanings unless another meaning is apparent.

The invention provides an online community that offers the user a way to stay abreast of items and innovations, especially new items and developments, from their favorite providers without having to independently research the providers and items in which they have interest. The system allows users to form a personal relationship with the providers they are interested in and share the experience with followers, e.g., via an online social networking system, as well as other users of the system. The system focuses on provider loyalty to offer a unique online experience for users and a novel tool for providers that gathers information about users interested in their products and/or services. The system uses a "push modality" to present to users provider and item information in which they have expressed interest while also providing valuable opportunities for providers to interact with users interested in their products and/or services.

The system aggregates items submitted by numerous providers and presents them to users in a customizable user graphical user interface ("GUI"). Users of the system do not have to search for items (although the system includes, e.g., key-word and/or Boolean search functionality). Rather, new or existing items are periodically pushed to users based on their item and/or provider preferences without prompting from the user. In addition to enabling the user to follow providers they like, the system also allows users to discover new providers and items in which they might have an interest.

In addition, users can set up a network of contacts (or import or link their user page on the system to any of a number of social networking sites, including but not limited to, Facebook, Twitter, MySpace, Friendster, YouTube, Linkedin, etc.) with whom they can share their favorite providers, interests, items, promotions, etc., and/or with whom they interact regarding an item, provider, contemplated purchase, etc. Users can be notified of their contacts' activities on the system via the user interface or via one or more social networking sites, such as when they express an interest in a provider or item, e.g., by following an item or provider, liking an item or provider, etc. In one embodiment, a user can create lists of data objects representing items or providers wherein the items or providers listed are related to a user-defined theme, activity, etc.

Still further, the system provides a mechanism for providers to communicate with existing and potential users. Providers can share any information that is pertinent to a user that has shown interest in a given provider by, e.g., following the provider or an item offered by that provider. The ability to push item pre-release announcements, special promotions, incentives to participate in provider/item surveys and focus groups, etc. to such a targeted group of users is extremely valuable to the provider.

DEFINITIONS

"Computer" or "computer system" as used herein shall mean one or more computing devices, regardless of the number and location of processing elements. For example and without limitation, the term computer or computer system includes personal computers, desktop computers, tablet computers, computer networks, personal digital assistants (PDAs), mobile phones (whether smart phones, PDA phones or digital cell phones), web TV, portable e-mail devices, game consoles, media players, home theater computer systems, global positioning systems (GPS), and so forth. In addition, a computer system can provide access to two or more consumer-users at different computers in the same or different locations, in direct or indirect contact with a server(s) and/or each other via a network (for example, the global internet and its World Wide Web).

A "user" as used herein is an individual who has a preference for an item, provider, brand, event, or service listed in the system described herein. In a specific embodiment, a user has a preference for a commercial item, provider, brand, event, or service listed in the system, and in this context, a user can be referred to as a "consumer" or "consumer-user." The terms "consumer" and "consumer-user" are used alternatively herein. A "provider" is an individual, organization, or entity that provides an item, event, and/or service on the system. In a specific embodiment, a provider is a brand, e.g., a provider of one or more products or categories of products. A "consumer-user" is distinguishable from a "brand-user," e.g., an individual or group of individuals authorized by a provider to access and/or modify provider information in a provider data table. A consumer-user can be a private individual, whereas a brand-user can be a volunteer, employee, or contractor working on behalf of a provider, e.g., a company, merchant, retailer, reseller, event-planner, service provider, etc.

"Database" as used herein refers to any organized data structure or structures used for storing, retrieving, and manipulating information having a predefined meaning. Without limitation, a database can be a flat file structure, a relational structure, or any other form of information storage. A database may include one or more data tables, wherein the one or more data tables include data relevant to providers, brands, users and other general system data. Data tables can be subdivided to uniquely identify a particular provider, brand, consumer-user, etc.

"Data object" as used herein refers to a database including data related to an item, provider, list, individual, category, interest, etc., wherein the data is displayed by the system in a selectable common visual representation of that item, provider, list, individual, category, interest, etc. A data object can be created by a consumer-user and/or provider and displayed by the system in the consumer-user GUI and/or the provider GUI. In one embodiment, the data associated with each data object on the system, regardless of origin, is displayed by the system in a common visual representation, referred to herein as a data object representation, that comprises one or more of the following elements: standardized or customized layout, color scheme, typeface, and organization of elements of the data object representation, e.g., title, description, image/media, and optional commentary fields. For example, the data object representation can include a tile, board, icon, etc., and in a specific embodiment, the data object representation includes a standardized layout, including a title, item image and/or provider logo or trademark, optionally price, and commentary fields, such that in this specific embodiment, each data object representation on the system comprises the same standardized layout. Each data object representation is selectable in that a data object representation can be selected by a user of the system to view a more detailed visual representation of the item, provider, brand, list, individual, category, interest, etc. including additional fields/information related to that item, provider, brand, list, individual, category, interest, etc. In this regard, the data object representation is a portal for the user to access the data available in the data object (i.e., the database) related to the item, provider, brand, list, individual, category, interest, etc., represented by that data object representation. As used herein, a user views and/or interacts with a data object representation.

In a specific embodiment, each data object representation relating to an item or provider includes a commentary field that includes comments about that item or provider provided by a consumer-user, one or more followers of that consumer-user of the system, as well as providers affiliated with that item or provider. Therefore, each data object representation displayed in a consumer-user's GUI or a provider GUI is customized by the system for that consumer-user or brand-user based on their profile settings and preferences, and includes comments provided by that consumer-user, a brand-user, followers of that consumer-user and/or brand-user, and/or those followed by that consumer-user and/or brand-user. The system is configured to preferentially display those data object representations that relate to a consumer-user's preferences e.g., data object representations that relate to an item, provider, or individual that a consumer-user follows on the system are displayed in the consumer-user's GUI (other data object representations relating to items, provider, or individuals not followed by the consumer-user are nevertheless visible on the system to the consumer-user, but the consumer-user's GUI is configured to automatically display data object representations in which the consumer-user has expressed a preference). An unrelated consumer-user of the system can modify a data object in which the first consumer-user has a preference but because the first consumer-user does not follow the unrelated consumer that modified data object is not displayed in the first consumer-user's GUI.

A graphical user-interface ("GUI") is a type of user-interface that allows a user to interact with an electronic device using images and/or text commands. A GUI allows a user to manipulate graphical icons, data object representations, visual indicators and/or text-based interfaces. Actions are performed by direct manipulation of graphical or text elements in the GUI. While certain embodiments described herein or components thereof are described by reference to a desktop interface, such descriptions are for illustrative purposes only. It will be understood by those skilled in the art that various adjustments can be made to the system and its components without departing from the spirit or scope of the invention. For example, the GUI and components thereof can be adjusted for use in any format depending on the amount of data that can be displayed per screen, e.g., a GUI in a desktop environment can display more data per screen than a GUI in a smart phone. While the appearance of a GUI may be adjusted because of the size limitations of the format (e.g., desktop vs. smart phone), the system functionality remains unchanged and it is within the skill of the ordinary artisan to adjust the GUI as needed for any individual computer format. Likewise, the elements of the GUI can be organized or displayed in any manner without departing from the spirit or scope of the invention. For example, the layout of individual elements or fields in the GUI can be adjusted, e.g., the relative position of search fields, data tables, data object representations, item or provider information, elements of a consumer and/or provider profile, etc. without altering the system functionality. And while the system is illustrated and described herein by reference to one or more GUI layouts, those embodiments are for illustrative purposes only and should not be construed as limitations on the scope of the invention.

An "item" as used herein, is a product, service, event, etc. The item can be a commercial item, e.g., supplies and services of a type customarily used by the general public, including but not limited to components and any combination of items or services, as well as management and professional support services providing assistance, advice or training.

A provider or user can provide "provider information" regarding an item or provider. In a specific embodiment, if the provider is a brand, a brand or user can provide "brand information" regarding an item or brand. Provider information includes general information about the provider, as well as commercial item information. In a specific embodiment, brand information includes general brand information and commercial item information. General provider information includes information about the provider that is not specifically related to a distinct item, including but not limited to information related to one or more provider trademarks, one or more provider logos, one or more commercial item logos, provider description, interest categories associated with provider, provider media, provider purchasing information, retail information, provider promotional information, information related providers within the provider portfolio, related provider description, related provider products, or combinations thereof. In the specific embodiment in which a provider is a brand, general brand information includes information about the brand that is not specifically related to a distinct item, including but not limited to information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof. Commercial item information pertains to a specific item, including but not limited to, information related to one or more commercial item trademarks, commercial item description information, commercial item media, commercial item purchasing information, commercial item retail information, commercial item promotional information, related first brand products, or combinations thereof.

A user can have a "preference" for an item, provider and/or another user (e.g., consumer-user and/or brand-user) represented by a data object on the system. A "preference" on the system expressed by one user for another user, an item, or provider, is expressed by, e.g., "following" a data object representation signifying that user, item, or provider, which enables one user to track the system activities of another user, item, or provider; "friending" e.g., one user requests to join another's group of contacts and the other user accepts or rejects that request, and by accepting the invitation, the first user is able to track the system activities of the other user; "liking" a data object representing an item, user, or provider, enables the user to indicate a predilection for that item or provider in a way that does not allow the user to track activities related to that item or provider; or "listing" a data object representing an item or provider, which allows the user to include that item, provider, or individual in one or more lists created by that user.

In a preferred embodiment, a consumer-user of the system expresses a preference for an item, provider, or individual by following, listing, or liking a data object representation signifying that item, provider or individual. If a first user follows or lists a data object representation signifying an item, individual, or brand, the identity and one or more of the system activities of that first user with respect to that followed or listed data object are visible to other users of the system that follow that first user and/or those other users the first user follows. In particular, the followed or listed data object representation will be displayed in the first user's GUI and it may also be displayed in the GUI of followers of the first user and/or those followed by the first user. In addition, other users of the system that do not have a relationship with the first user can also view his/her followed or listed data object representations under his/her user profile on the system, but the followed or listed data object representations of the first user will only be displayed automatically on the GUI of those other users that follow the first user and/or those users that the first user follows. With respect to one consumer-user expressing a preference for another consumer-user on the system, e.g., by following a data object representation signifying that individual, such interactions on the system between one consumer-user and another can be likened to those individuals having a "relationship" and/or a connection on the system. The preferences described above can be expressed by a consumer-user and/or a brand-user on his/her own behalf or on behalf of a provider he/she is authorized to represent on the system.

One type of preference that can be expressed on the system is a "system tracking preference" i.e., an action taken by one consumer-user (or brand-user) with respect to a data object representing an item, provider, consumer-user, etc. that enables the actor (i.e., the consumer-user expressing the preference) to track the identity and system activities associated with that data object. In a preferred embodiment, a consumer-user of the system expresses a preference for an item, provider, or individual by following, listing, or liking a data object representation signifying that item, provider or individual. In a specific embodiment, if a first user or brand follows or lists a data object representation signifying an item, individual, or brand, the acts of following or listing constitutes an expression of a system tracking preference that enables that first consumer-user to view and track the system activities of the other consumer-user, provider, item, etc. in which he/she has expressed a system tracking preference.

As described above, a provider or consumer-user creates a data object related to an item or provider. If another user follows that data object or includes it in a list then the system creates a derivative data object specific for and visible to the follower (and his/her followers). The original data object representation can be liked, listed, or followed by additional users of the system, but only the acts of following or listing (i.e., expressions of a system tracking preference) create a derivative data object and that derivative data object representation is visible to the follower and his/her followers. Likewise, if a provider elects to follow or list a data object representation created by another provider or a consumer-user on the system, then the system creates a derivative data object specific for and visible to that provider and followers of that provider.

Expressing a preference for a data object representation signifying an item, provider, or another user, is one form of "interaction" a user can have with a data object representation (or a derivative data object representation). An "interaction" with a data object, as used herein, includes but is not limited to, viewing a data object representation, expressing a preference for a data object representation, commenting on a data object representation, participating in a dialog regarding a data object representation, offering an opinion regarding a data object representation, providing a rating for a data object representation, clicking through a data object representation to view additional details, clicking through a data object representation to view first provider-hosted information, participating in a survey regarding a data object representation, requesting further information from the provider regarding a data object representation, buying a commercial item displayed in a data object representation from a third-party retailer/reseller, buying a commercial item displayed in a data object representation directly from the first provider, buying a commercial item displayed in a data object representation from an individual, participating in an auction regarding a data object representation, offering a commercial item displayed in a data object representation for free, loan, sale, lease, and/or rental, requesting to purchase a commercial item displayed in a data object representation, requesting that a discontinued commercial item displayed in a data object representation is re-introduced by the first provider and/or an authorized retailer/reseller thereof, suggesting to the first provider product ideas, improvements, and/or corrections regarding a data object, removing a data object representation from one or more lists ("de-listing"), sharing a data object representation with an individual or group, e.g., emailing the data object representation (or a hyperlink to the data object), including a hyperlink for that data object representation on a social networking system, etc., "un-liking" a data object representation, e.g., removing that data object representation from the list of liked data object representations in a consumer-user's profile, "un-friending", e.g., removing that data object representation from the list of "friends" in a consumer-user's profile, or combinations thereof.

It will be understood by the skilled artisan that the system described herein is not limited to a method of managing and/or exchanging information about items or providers, but it can also be extended to a method of managing and/or exchanging any type of information, e.g., between a merchant and a customer, an event-planner and an attendee, a service provider and a customer, within a business entity between employees of that business, etc. In a specific embodiment, the system described herein relates to a method of exchanging information about commercially available items, providers, brands, services, events, etc. In a particular embodiment, the set of information exchanged and/or managed on the system uniformly relates to commercially available items, brands, services, events, etc. While other social networking sites, e.g., Facebook, Twitter, etc., can include item or provider-related posts and/or comments, that is ancillary to the purpose of the sites, i.e., to encourage social interaction between users for any purpose. In contrast, the present system encourages social interaction between users and providers about commercial items, brands, services, events, etc.

Customizable Data Management System

The invention provides a streamlined method of transferring data through the system to synthesize a dataset that is customized for a particular user of the system based on the user's preferences and relationships on the system. That customized dataset is displayed in the user's GUI. Likewise, the system synthesizes a customized dataset for each individual user and provider on the system and displays that unique customized dataset in the user's/provider's GUI. Because each user, provider, item, category, and data object on the system includes a unique identifier, each time a participant on the system (user or provider) expresses a preference for a data object (e.g., via a data object representation), that action is uniquely associated in the system with the user (or provider) and one or more data object representations, either the original data object and/or a derivative data object, depending on the type of preference expressed. If the user expresses a system tracking preference, a derivative data object is generated and uniquely associated with that user; the system then generates a subset of that user's followers and copies a reference to that data object into one or more sections, channels, or feeds of the follower's GUI so that the user's followers are apprised of the user's activity on the system. If, on the other hand, the user expresses a preference that does not constitute a system tracking preference, a derivative data object is not generated, but the user's preference for the original data object is recorded in the system and the system copies a reference to that original data object into one or more sections, channels, or feeds of the user's GUI.

In particular, each user, item, provider, category, brand, etc., is associated in the system with a data object and each data object, user, provider, category, and item on the system is associated in the system with a unique identifier (ID).

Each data object (and derivative data object) includes a reference to the user ID of the user that created it, as well as the provider ID associated with that data object, and all data objects (and derivative data objects) and the unique identifiers associated with them are stored in a collective data object database. If user A chooses to follow data object X (i.e., the user expresses a system tracking preference for data object X), the system creates a derivative data object having identifier X'. The system then creates an association between user A, data object X, and data object X' and that association is stored in a global tracking database. Therefore, in this specific example, the association that is created includes the following data: user A, data object X, and data object X'. The system then surveys the global tracking database for the dataset of followers of user A on the system, e.g., users B, C, and D. If user A has no followers, derivative data object X' (i.e., a derivative data object X' representation) is displayed in one or more user A customized channels or feeds, e.g., those channels or feeds related to user A's recent activities on the system. If user A has a follower, e.g., user B, the system displays derivative data object X' representation in a user B customized channel or feed designed to display data object representations new to user B on the system; and likewise, if user A has additional followers, e.g., users C and D, the system displays derivative data object X' representation in a user C customized channel or feed and a user D customized channel or feed, respectively.

As described above, the act of following a data object constitutes a system tracking preference that generates a derivative data object based on the followed data object representation, but liking a data object representation does not generate a system tracking preference. Therefore, if user A likes data object X representation, that preference is associated with data object X in the collective data object database and likewise, user A's preference for data object X is stored in user A's profile, but the system does not generate a derivative data object. An association between user A and data object X is created and stored to the global tracking database and/or an additional tracking database, which may be a component of the global tracking database or a separate database in the system. The system displays data object X representation in one or more of user A's GUI sections, channels, or feeds as well as one or more sections, channels, or feeds of user A's followers.

A further data transfer and management embodiment is provided in which the system generates a customizable section, channel or feed of data object representations not previously displayed to a user of the system in his/her customizable GUI, referred to as New Channel. In this embodiment, if a user chooses to view his/her New Channel, the system retrieves a dataset of data objects previously displayed in the New Channel, queries the collective data object database for objects not previously displayed in the user's New Channel, generates a dataset of new data objects, deletes those data objects previously displayed or viewed on the system, and displays the new data object representations of the dataset in the New Channel. If no new data objects are available in the collective data object database, the system displays a message to the user via the GUI that the New Channel is empty. In one embodiment, the system can determine whether a data object representation has been viewed by a user, e.g., by detecting via JavaScript in the browser that the data object representation was displayed in the GUI and a message is sent to the server to instruct the system to remove the data object from the New Channel data table. When the New Channel is refreshed, that data object representation will no longer be displayed. Alternatively, the system may not detect actual "views" by a user in his/her browser, but instead, simply maintain an inventory of data objects that have been presented in the New Channel and once presented, the reference to that data object is deleted from the New Channel data table. In yet another alternative, the system can delete a reference to a data object within a selected time from first display in the New Channel, e.g., within one week, one month, three months, etc.

The system uses this method to create a variety of synthesized datasets that are customized for each user or provider on the system, depending on the type of information they would like to view on the system. In one embodiment, the invention provides a computer implemented method of selecting data objects for interaction with a user at a graphical user interface, the method comprising: receiving a data stream from an item provider, the data stream identifying items available from the item provider; storing a data object in a global database with a provider identifier uniquely identifying the item provider; storing for each item in the data stream a data object with an item identifier uniquely identifying the item; detecting a user interaction at a graphical user interface of a user device, the interaction with an item or item provider data object, and creating a user data object with a user identifier uniquely identifying the user; creating in a tracking database an association between the user data object and the item and/or item provider data object; and using the tracking database to select a customized data set of data objects based on the associations in the tracking database, the customized data set being for presentation at the graphical user interface.

Moreover, the invention provides a computer system comprising: a plurality of user devices each having a display interface available to a user; a plurality of item providers; a global database of data objects, each data object comprising a unique data object identifier of that object and a user, item, or provider identifier of a user, item or provider to which that data object relates; computer storage storing: (i) for each item provider, a respective provider data table comprising a unique provider identifier of that provider and one or more item identifiers of items provided by that provider; (ii) for each user, a respective user data table comprising a unique user identifier of that user and one or more item identifiers, provider identifiers, and/or category identifiers for items, providers and/or categories in which that user has expressed a preference; and (iii) a customized set of data tables selected for at least a first user, the customized set selected from the user data tables and provider data tables based on the item and/or the provider identifiers contained in the first users data table; a global tracking database configured responsive to the first user expressing an additional preference for a provider or item by instigating an association instruction at their user device to associate that first user's user identifier with an object identifier of a data object comprising the provider or item identifier of that provider or item; and an information exchange computer configured, responsive to the first user expressing the additional interest in the item or provider, to select one or more additional provider data tables and/or user data tables for inclusion in the first user's customized set to update that set, and to select at least one data object based on the first user's updated set for display to the first user via the display interface of their user device.

Also provided is a computer system comprising: a plurality of user devices each having a display interface available to a user; a plurality of item providers; a global database of data objects, each data object comprising a unique object identifier of that object and a user, item, or provider identifier of a user, item or provider to which that object relates, the data objects including a user association data object comprising a target user identifier of a target user and a follower user identifier of a user following the target user, wherein the global database is configured responsive to the target user expressing a tracking interest in a data object by instigating a tracking instruction at their user device to create a new derivative data object based on that data object; a global tracking database configured responsive to the target user expressing the tracking interest in the data object to store an association between the user identifier of the target user, the object identifier of that data object, and the object identifier of the created derivative data object; and an information exchange computer configured, responsive to the target user expressing the interest in the data object to access the global database and the global tracking database and to display the derivative data object to the follower user via the display interface of their user device.

In a specific embodiment, the invention provides a method of exchanging provider information on a system, wherein the system has (i) a plurality of consumer-users including a first consumer-user and one or more additional consumer-users, wherein optionally, the first and one or more additional consumer-users have a relationship on the system, and (ii) a plurality of provider including a first provider, the method comprising acts of:

Receiving first provider information;
Receiving first provider preference information indicating that the first consumer-user has expressed a preference for the first provider information;
Filtering the first provider information to create a subset of first provider information that is provided to the first consumer-user;
Displaying to the first consumer-user one or more data object representations relating to the subset of the first provider information;
Receiving one or more first consumer-user interactions with the one or more data object representations relating to the subset of first provider information;
Displaying to the first provider:
  Interaction data relating to the first provider and specific to one or more consumer-users;
  Interaction data related to the first provider aggregated for a plurality of consumer-users on the system;
  Comparative interaction data from a plurality of customer-users related to the first provider relative to a one or more other provider on the system; or
  Combinations thereof.

In a specific embodiment, the invention provides a method of exchanging brand information on a system, wherein the system has (i) a plurality of consumer-users including a first consumer-user and one or more additional consumer-users, wherein optionally, the first and one or more additional consumer-users have a relationship on the system, and (ii) a plurality of brands including a first brand, the method comprising acts of:

Receiving first brand information;
Receiving first brand preference information indicating that the first consumer-user has expressed a preference for the first brand information;
Filtering the first brand information to create a subset of first brand information that is provided to the first consumer-user;
Displaying to the first consumer-user one or more data object representations relating to the subset of the first brand information;

Receiving one or more first consumer-user interactions with the one or more data object representations relating to the subset of first brand information;

Displaying to the first brand:
Interaction data relating to the first brand and specific to one or more consumer-users;
Interaction data related to the first brand aggregated for a plurality of consumer-users on the system;
Comparative interaction data from a plurality of customer-users related to the first brand relative to a one or more other brands on the system; or
Combinations thereof.

For example, the plurality of users of the system includes a plurality of consumer-users of the system, as well as brands that offer commercial items on the system. The processor receives information indicating that a first consumer-user of the system has a preference for (i) a commercial item offered by a brand on the system, and/or (ii) a brand offering one or more commercial items on the system. The processor receives item and/or brand information relating to the commercial item and/or brand, and filters the item and/or brand information to create a subset of the item and/or brand information that is provided to consumer-users in which the first user has expressed a preference. The processor displays one or more data object representations relating to the subset to the first user in the GUI. The processor also receives information related to interactions the first consumer-user has with the subset of data object representations displayed to the first consumer-user, e.g., viewing the data object, purchasing an item depicted in a data object, comments to a data object, liking or following a data object, etc., and the system displays to the first brand, interaction data related to the plurality of consumer-users having a preference for the first brand. The system also displays to the first brand interaction data related to the first brand aggregated for a plurality of consumer-users on the system, as well as comparative interaction data from the plurality of users of the system related to the first brand relative to other brands on the system.

Whereas the system includes a plurality of brands, the method also includes the following steps: receiving additional brand information from a plurality of brands; receiving additional brand preference information indicating that the first consumer-user has expressed a preference for an additional subset of the additional brand information; filtering the first brand information and the additional brand information to create one or more supplemental subsets of additional brand information that is provided to the first consumer-user; displaying to the first consumer-user one or more data object representations relating to the one or more supplemental subsets of additional brand information; receiving one or more first consumer-user interactions with the one or more data object representations relating to the one or more supplemental subsets of additional brand information; and displaying to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof.

In a particular embodiment, the invention provides a method of exchanging provider information on a system as described above, wherein the system displays to the first consumer-user provider information not previously displayed to a consumer-user on the system. In a specific embodiment, the system preferentially displays brand information not previously displayed to the consumer-user relative to other brand information the system previously displayed to that consumer-user, thereby identifying those data object representations not previously displayed to the consumer-user. In another embodiment, the system displays to a consumer-user brand information not displayed to a consumer-user within a defined time frame, e.g., one year, 6 months, 3 months, 1 month, etc. In this regard, the system displays one or more data object representations related to new items, brands, etc. that the consumer-user has not seen on the system, i.e., that subset of brand information on the system in which the consumer-user has expressed a preference that is new to that consumer-user. Therefore, the consumer-user GUI displays a subset of information related to items and/or brands not previously displayed to the consumer-user by the system. For example, the new brand or item information may include but is not limited to, a new item offered by a brand, a new item or brand in an interest category preferred by the consumer-user and for a new brand, products offered by that new brand, new description information related to an item or brand, new purchasing information related to an item or brand, a promotion related to that item or brand, an image, video, or another graphic related to an item or brand not previously displayed to the consumer-user, a new review for that item or brand, new items or brands associated with an item or brand or that may be used with that item or brand (and vice versa), new comments about that item or brand made by followers of the user, etc.

In addition, if a consumer-user expresses a system tracking preference for provider information, the system filters that provider's information to create a first supplemental subset of provider information that is provided to that consumer-user and his/her followers and displays one or more derivative data object representations that relate to that first supplemental subset of provider information. Likewise, if an additional consumer-user of the system expresses a system tracking preference for a first consumer-user, the system filters the first provider information in which the first consumer-user has expressed a preference to create a second supplemental subset of first provider information and displays one or more data object representations and/or derivative data object representations relating to that second supplemental subset to the additional consumer-user. Moreover, if a brand-user of the system expresses a system tracking preference for a first consumer-user, the system filters the first provider information in which the first consumer-user has expressed a preference to create a third supplemental subset of first provider information and displays one or more data object representations and/or derivative data object representations relating to that third supplemental subset to the brand-user. In a specific example, if a consumer-user expresses a system tracking preference for brand information, the system filters that brand's information to create a first supplemental subset of brand information that is provided to that consumer-user and his/her followers and displays one or more derivative data object representations that relate to that first supplemental subset of brand information. Likewise, if an additional consumer-user of the system expresses a system tracking preference for a first consumer-user, the system filters the first brand information in which the first consumer-user has expressed a preference to create a second supplemental subset of first brand information and displays one or more data object representations and/or derivative data object representations relating to that second supplemental subset to the additional consumer-user. Moreover, if a brand-user of the system expresses a system tracking preference for a first consumer-user, the system filters the first brand information in which the first consumer-user has expressed a preference to create a third supplemental subset of first brand information and displays one or more data object representations and/or derivative data object representations relating to that third supplemental subset to the brand-user.

In another embodiment, the invention includes a method of exchanging information on a system having a plurality of consumer-users including a first consumer-user, the method comprising acts of (a) receiving information indicating that a first consumer-user has a preference for a commercial item and/or provider; (b) receiving item and/or provider information, provided by at least some of the plurality of consumer-users and/or the provider relating to the commercial item and/or provider; (c) filtering the item and/or provider information to create a subset of the item and/or provider information that is provided to the consumer-user; and (d) displaying to the first consumer user one or more data object representations relating to the subset of the item and/or provider information. For example, the invention includes a method of exchanging information on a system having a plurality of consumer-users including a first consumer-user, the method comprising acts of (a) receiving information indicating that a first consumer-user has a preference for a commercial item and/or brand; (b) receiving item and/or brand information, provided by at least some of the plurality of consumer-users and/or the brand relating to the commercial item and/or brand; (c) filtering the item and/or brand information to create a subset of the item and/or brand information that is provided to the consumer-user; and (d) displaying to the first consumer user one or more data object representations relating to the subset of the item and/or brand information.

The invention also includes a method of exchanging information on a system between a first provider and a first consumer-user, the system comprising (a) a plurality of consumer-users including the first consumer-user, and (b) a plurality of providers including the first provider, wherein the system is configured to receive, filter, and/or display information related to the first consumer-user, the first provider, the plurality of consumer-users, the plurality of providers, a commercial item, interaction data, comparative interaction data and combinations thereof; the method comprising acts of (a) viewing, by the first provider, interaction data related to the plurality of consumer-users expressing a preference for first provider information; and (b) providing additional first provider information responsive to the first provider interaction data. The method can also include viewing, by the first provider, provider comparative interaction data for the first provider relative to the plurality of provider on the system and/or a subset of the plurality of provider on the system; and providing additional first provider information responsive to the first provider interaction data and/or the first provider comparative interaction data. For example, the invention includes a method of exchanging information on a system between a first brand and a first consumer-user, the system comprising (a) a plurality of consumer-users including the first consumer-user, and (b) a plurality of brands including the first brand, wherein the system is configured to receive, filter, and/or display information related to the first consumer-user, the first brand, the plurality of consumer-users, the plurality of brands, a commercial item, interaction data, comparative interaction data and combinations thereof; the method comprising acts of (a) viewing, by the first brand, interaction data related to the plurality of consumer-users expressing a preference for first brand information; and (b) providing additional first brand information responsive to the first brand interaction data. The method can also include viewing, by the first brand, brand comparative interaction data for the first brand relative to the plurality of brands on the system and/or a subset of the plurality of brands on the system; and providing additional first brand information responsive to the first brand interaction data and/or the first brand comparative interaction data.

In addition, also provided is a method of exchanging information on a system between a first provider and a first consumer-user, the system comprising (a) a plurality of consumer-users including the first consumer-user, and (b) a plurality of providers including the first provider, wherein the system is configured to receive, filter, and/or display information related to the first consumer-user, the first provider, the plurality of consumer-users, the plurality of providers, a commercial item, interaction data, comparative interaction data and combinations thereof; the method comprising acts of: (a) viewing, by the first consumer-user, first provider information relating to (i) the general first provider information and/or the first provider commercial item; (ii) expressing a preference for (i) the general first provider information and/or the first provider commercial item; and (iii) viewing, by the first consumer-user, a subset of first provider information that is provided by the system to the first consumer-user. For example, also provided is a method of exchanging information on a system between a first brand and a first consumer-user, the system comprising (a) a plurality of consumer-users including the first consumer-user, and (b) a plurality of brands including the first brand, wherein the system is configured to receive, filter, and/or display information related to the first consumer-user, the first brand, the plurality of consumer-users, the plurality of brands, a commercial item, interaction data, comparative interaction data and combinations thereof; the method comprising acts of: (a) viewing, by the first consumer-user, first brand information relating to (i) the general first brand information and/or the first brand commercial item; (ii) expressing a preference for (i) the general first brand information and/or the first brand commercial item; and (iii) viewing, by the first consumer-user, a subset of first brand information that is provided by the system to the first consumer-user.

Moreover, also included is a method of exchanging information on a system between a first consumer-user and one or more additional consumer-users, the system comprising (a) a plurality of consumer-users including the first consumer-user and the one or more additional consumer-users, wherein the first and one or more additional consumer-users are connected in the system, and (b) a plurality of providers including the first provider, wherein the system is configured to receive, filter, and/or display information related to the first consumer-user, the first provider, the plurality of consumer-users, the plurality of providers, a commercial item, interaction data, comparative interaction data and combinations thereof; the method comprising acts of: (a) viewing, by the first consumer-user, a subset of first provider information that is provided by the system to the first consumer-user and optionally one or more additional consumer-users; and (b) viewing, by the first consumer-user, an interaction with the subset of first provider information comprising: (i) a preference for one or more members of the subset of first provider information, wherein the preference is expressed by the first consumer-user and/or the one or more additional consumer-users; (ii) a comment regarding one or more members of the subset of first provider information, wherein the comment is provided by the first consumer-user and/or the one or more additional consumer-users; or (iii) combinations thereof. Also contemplated in this method is (c) interacting, by the first consumer-user, with the subset of first provider information, e.g., expressing an additional preference for a data object within the subset, responding to a comment provided by another consumer-user, etc. For example, the invention contemplates a method of exchanging information on a system between a first consumer-user and one or more additional consumer-users, the system comprising (a) a plurality of consumer-users including the first consumer-user and the one or more additional consumer-users, wherein the first and one or more additional consumer-users are connected in the system, and (b) a plurality of brands including the first brand, wherein the system is configured to receive, filter, and/or display information related to the first consumer-user, the first brand, the plurality of consumer-users, the plurality of brands, a commercial item, interaction data, comparative interaction data and combinations thereof; the method comprising acts of: (a) viewing, by the first consumer-user, a subset of first brand information that is provided by the system to the first consumer-user and optionally one or more additional consumer-users; and (b) viewing, by the first consumer-user, an interaction with the subset of first brand information comprising: (i) a preference for one or more members of the subset of first brand information, wherein the preference is expressed by the first consumer-user and/or the one or more additional consumer-users; (ii) a comment regarding one or more members of the subset of first brand information, wherein the comment is provided by the first consumer-user and/or the one or more additional consumer-users; or (iii) combinations thereof. Also contemplated in this method is (c) interacting, by the first consumer-user, with the subset of first brand information, e.g., expressing an additional preference for a data object within the subset, responding to a comment provided by another consumer-user, etc.

The foregoing methods are illustrated in the figures and the accompanying description. While one or more of the figures illustrate one embodiment of the system in which the provider is a brand and the information exchanged on the system relates to commercial items and information associated therewith, it will be understood by those skilled in the art that the system described herein and illustrated in the figures can be used to manage datasets of any type and provided by any manner of provider. The system described herein provides an efficient mechanism to manage and display customizable datasets to a user, simplifying and enriching the user experience on the system, and creating efficiencies in the transfer and management of data between two or more databases on the system.

As shown in FIG. 1, the system includes a collective consumer data table (101), a collective brand data table (102), a processor (103), an interface (104), and a set of filtering and analysis programs and associated databases (105). The collective consumer data table stores all information about the plurality of consumer-users that participate on the system and likewise, the collective brand data table stores all information about the plurality of brands that participate on the system. The collective consumer data table comprises one or more sets of consumer data, one of which is depicted in FIG. 1 as individual consumer data (106). For each consumer-user with a profile on the system, there is a corresponding consumer data table or individual consumer data table stored within the collective consumer data table. Each individual consumer data comprises one or more additional data tables, including but not limited to a consumer profile (107) and purchasing preferences including brand preferences (108), item preferences (109), a contact, follower, and/or following data table (110), and an interest data table (111). The brand and/or item preferences can also include one or more brand and/or item lists created by the consumer-user (not shown), which may be used by the consumer-user to group brands and/or items in a consumer-user created ontology.

The collective brand data table comprises one or more brand data, one of which is depicted in FIG. 1(a) as individual brand data (112). For each brand that participates on the system, there is a corresponding brand data table or individual brand data table stored within the collective brand data table. Each individual brand data comprises one or more additional data tables, including but not limited to an item system including a list of all items of the brand offered on the system (113), a contact, follower, and/or following data table (114) including a list of all consumer-users on the system that have expressed a preference for that brand or an item offered by that brand on the system, and an interest data table (115), including those interest categories that are relevant to the items offered by the brand. In an optional embodiment, the collective brand data table includes a system ontology comprising item and brand categories, wherein brand information is organized within one or more brand data tables in accordance with the system ontology.

The processor (103) includes a filtering program configured to filter the collective brand data table based on the consumer's preferences, e.g., item, category and/or brand preferences. In other words, the processor filters the item, category, and/or brand information in the collective brand data table and the collective consumer data table to create a subset of the item and/or brand information that relates only to those items and/or brands in which a first user has expressed a preference. For example, if a first user identified an interest in item X, the system uses that information to filter the collective brand data table for information related to item X, generating a consumer-customized data table that includes information related to item X. The system also filters the collective consumer data table for one or more users from among the plurality of users on the system followed by the first user that have provided item and/or brand information about item X. Therefore, the GUI for that consumer-user displays a selected subset of information related to item X to that consumer, e.g., an item X data object that includes a description of item X, purchasing information, an image, video, or another graphic of item X, reviews for item X, sales or promotional information associated with item X, items related to item X, items used in connection with item X, and as described in more details below, comments about item X made by followers of the user (derivative data objects related to item X). Likewise, if a first user identified an interest in item category N, the system uses that information to filter the collective brand data table for information related to items that are associated with category N, generating a consumer-customized data table that includes information related to item n, m, and p. The system then displays data object representations of items n, m, and p.

In one embodiment, the filtering program provides a method of organizing the collective brand data table based on the consumer's preferences, e.g., item, category, and/or brand preferences. In other words, the processor filters the item and/or brand information in the collective brand data table and the collective consumer data table to create a subset of the item and/or brand information that relates only to those items and/or brands in which a first user has expressed a preference and the system displays that subset to the consumer-user in a section or portion of the GUI dedicated to one or more of the consumer-user's preferences. For example, if a first user identified an interest in item X, the system uses that information to filter the collective brand data table for information related to item X, generating a consumer-customized data table that includes information related to item X. The system also filters the collective consumer data table for one or more users from among the plurality of users on the system followed by the first user that have provided item and/or brand information about item X. Therefore, the GUI for that consumer-user displays a selected subset of information related to item X to that consumer, e.g., an item X data object representation that includes a description of item X, purchasing information, an image, video, or another graphic of item X, reviews for item X, sales or promotional information associated with item X, items related to item X, items used in connection with item X, and as described in more details below, comments about item X made by followers of the user (derivative data object representations related to item X).

The GUI for that consumer-user can display the selected subset of information in any suitable format. In one embodiment, the GUI displays the selected subset of information in a channel or feed which is organized according to a consumer-user's preferences and the consumer-user can navigate between channels in the GUI. The system can include a set of defined channels or feeds and/or the consumer-user can customize one or more channels or feeds based on his/her preferences. The set of predefined channels or feeds can include, but is not limited to, popular data object representations (e.g., data objects that have received or been the subject of high system activity in a given time period), promotional data object representations (e.g., promotions or deals are offered by a brand in relation to the data objects in the channel or feed; "Deals Channel"), new data object representations (e.g., data objects that have not been viewed by the consumer-user on the system, as described herein), all data object representations, and/or all brand data object representations. Moreover, the set of predefined channels or feeds can further include a set of channels or feeds that are consumer-user specific, e.g., new data object representations to that consumer-user, brand data object representations for which that consumer-user has expressed a preference (e.g., "My Brands Channel"), one or more collections of lists of data object representations of that consumer-user (e.g., "My Lists Channel"), one or more collections of friends, followers, etc. associated with that consumer-user on the system (e.g., "My People Channel"), liked data object representations (e.g., "My Likes"), individuals or brands that follow that consumer-user (e.g., "Following Me Channel" and subchannels within can include "People Following Me" and/or "Brands Following Me"), data object representations the consumer-user has acted upon in the system (e.g., "My Activity Channel"), and/or data object representations the consumer-user has followed, liked, or otherwise expressed a preference for in the system (e.g., "My Following Activity," "My Liked Activity," etc.). Still further, the consumer-user can also define one or more customized channels or feeds based on criteria selected by that consumer-user. For example, the consumer-user can define a channel for data object representations related to his/her interests, e.g., golf, running, cooking, etc., such that the channel would organize data object representations for which the consumer-user has defined a preference that are related to that interest (e.g.,
"My Golf Channel"). Therefore, the GUI displays a plurality of channels or feeds in the consumer-user's GUI, including predefined and/or customized channels or feeds, wherein the content of each channel or feed is based on each individual consumer-user's preferences on the system. Each channel or feed is individually selectable.

Still further, the system includes an interface (104) which enables a consumer-user to interact with the system and his/her profile and preferences. The consumer-GUI allows the consumer to search, browse, and view item and brand listings on the system, and as described in more detail below, individual item data object representations, brand data object representations, etc., unfiltered and/or filtered by the system based on a consumer-user's preferences. Moreover, the consumer-GUI enables the consumer to modify or edit his/her profile and preferences on the system. Likewise, the interface also includes a brand GUI configured to enable interaction of a brand representative ("brand-user") with brand information and/or interaction data generated by the system for the brand. The consumer- and brand-interfaces are described in more detail below.

Figure 1B:
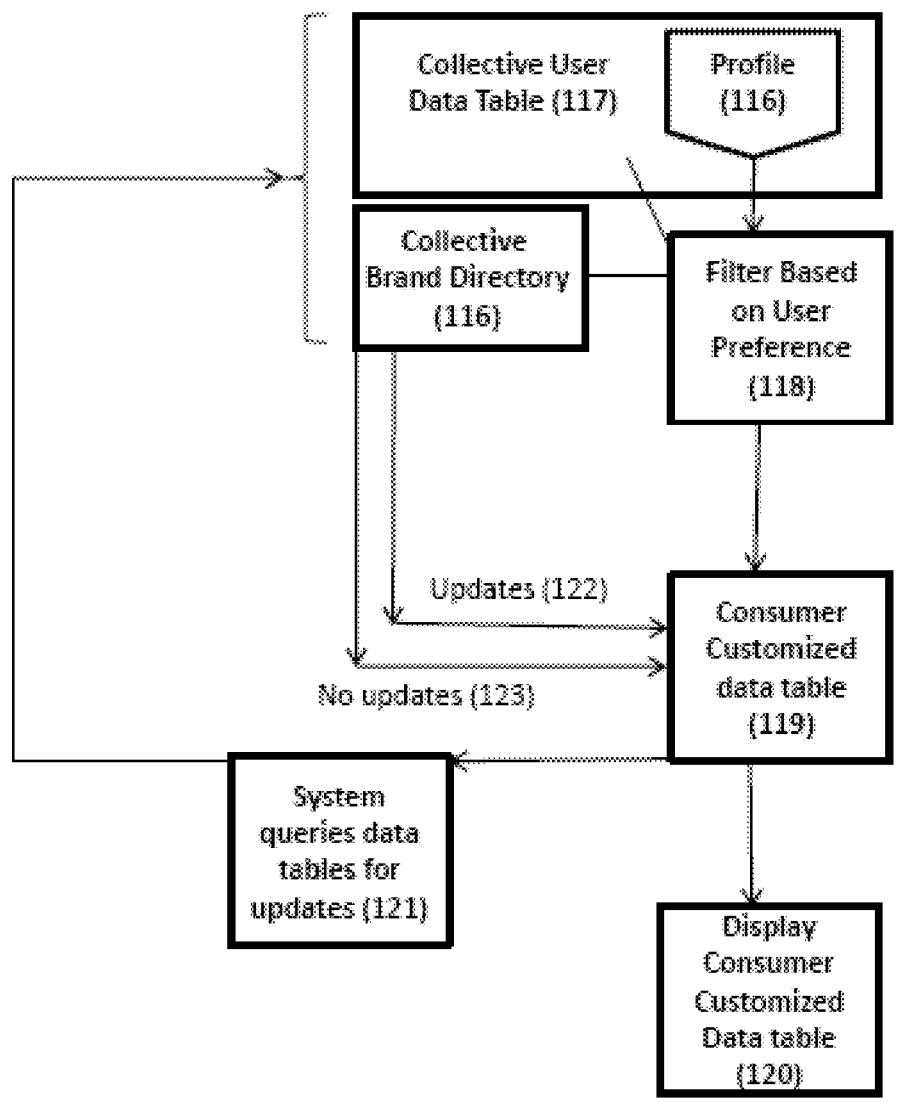
FIGS. 1(b)-(f) are schematic illustrations of the flow of data in the system from one or more system components to another.

Use of the system is illustrated schematically in FIG. 1(b). A consumer-user creates a profile on the system (116) (the profile set-up process is described in more detail below). The profile is a component of the individual user data (not shown in FIG. 1(b)), which is a component of the collective user data table (117). The system filters the collective user data table and the collective brand data table (118) based on the preferences and interests identified in the profile. A consumer customized data table is created by this filtering process (119) and the results are displayed in the consumer GUI (120). The system periodically queries the collective user data table, collective brand data table, and the consumer profile for updates (121), e.g., each time a consumer-user logs into the system, and once on the system, the processor is programmed to refresh the data displayed in the consumer GUI in real time or on a periodic basis, e.g., every minute, 5 minutes, 10 minutes, 30 minutes, 1 hour, etc. If there are one or more updates since the last query, the consumer customized data table is updated (122) and if there are no updates, the consumer customized data table is not updated (123).

Figure 1C:
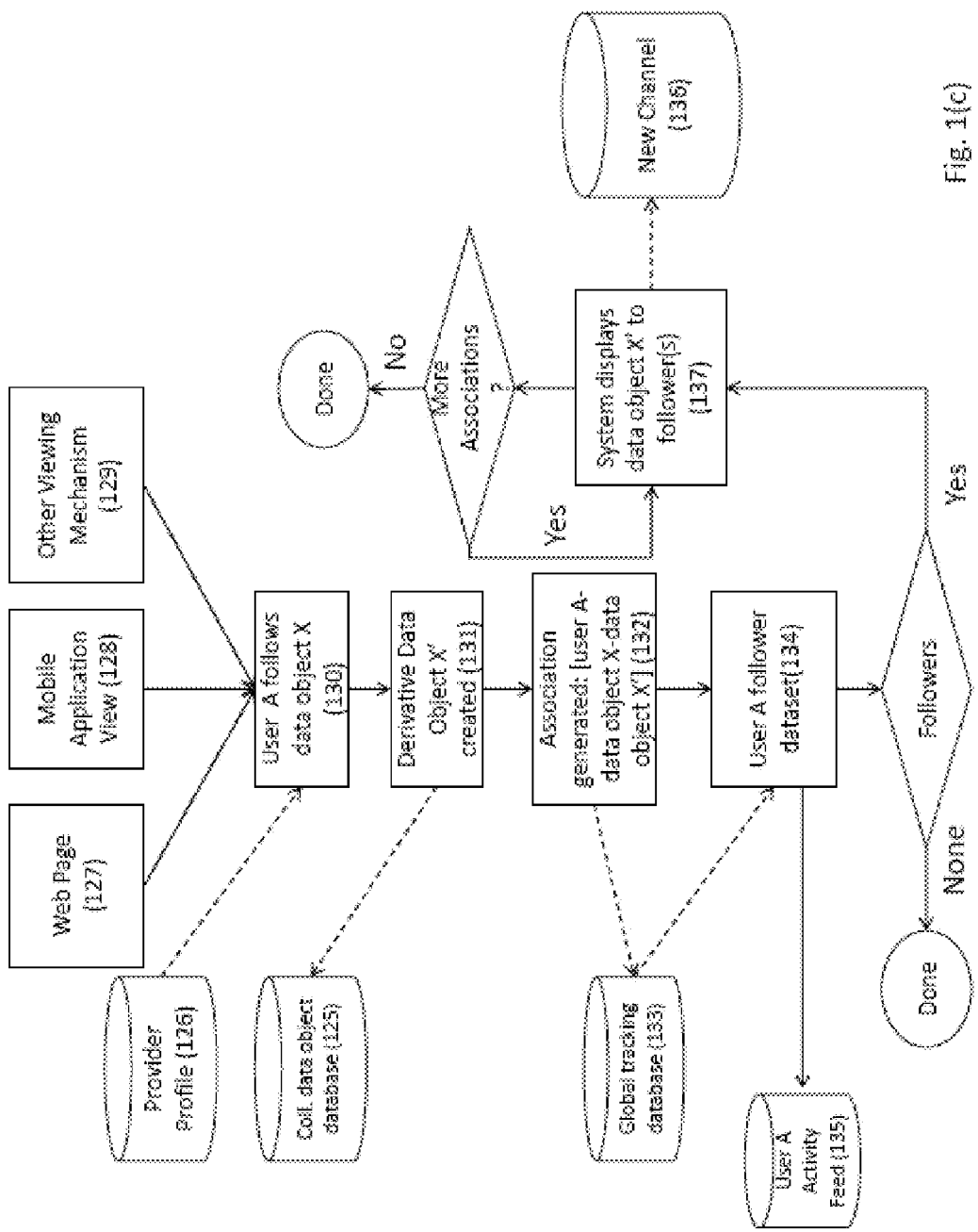
Figure 1D:
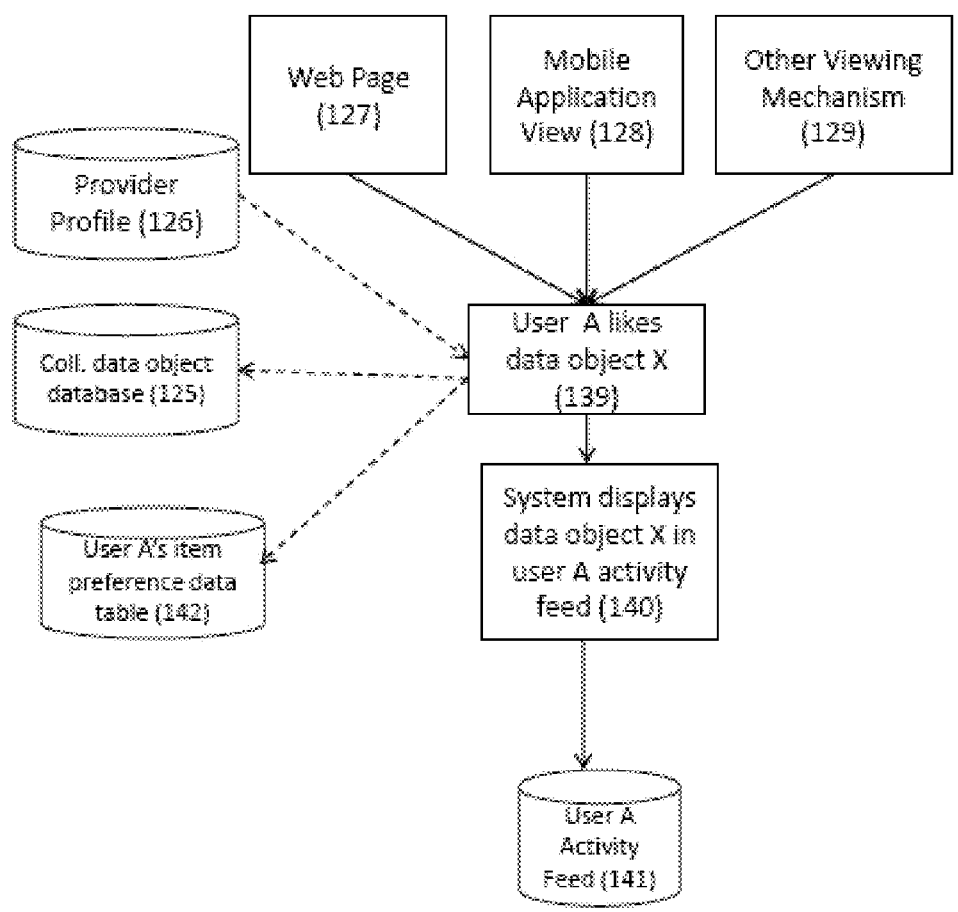
Figure 1E:
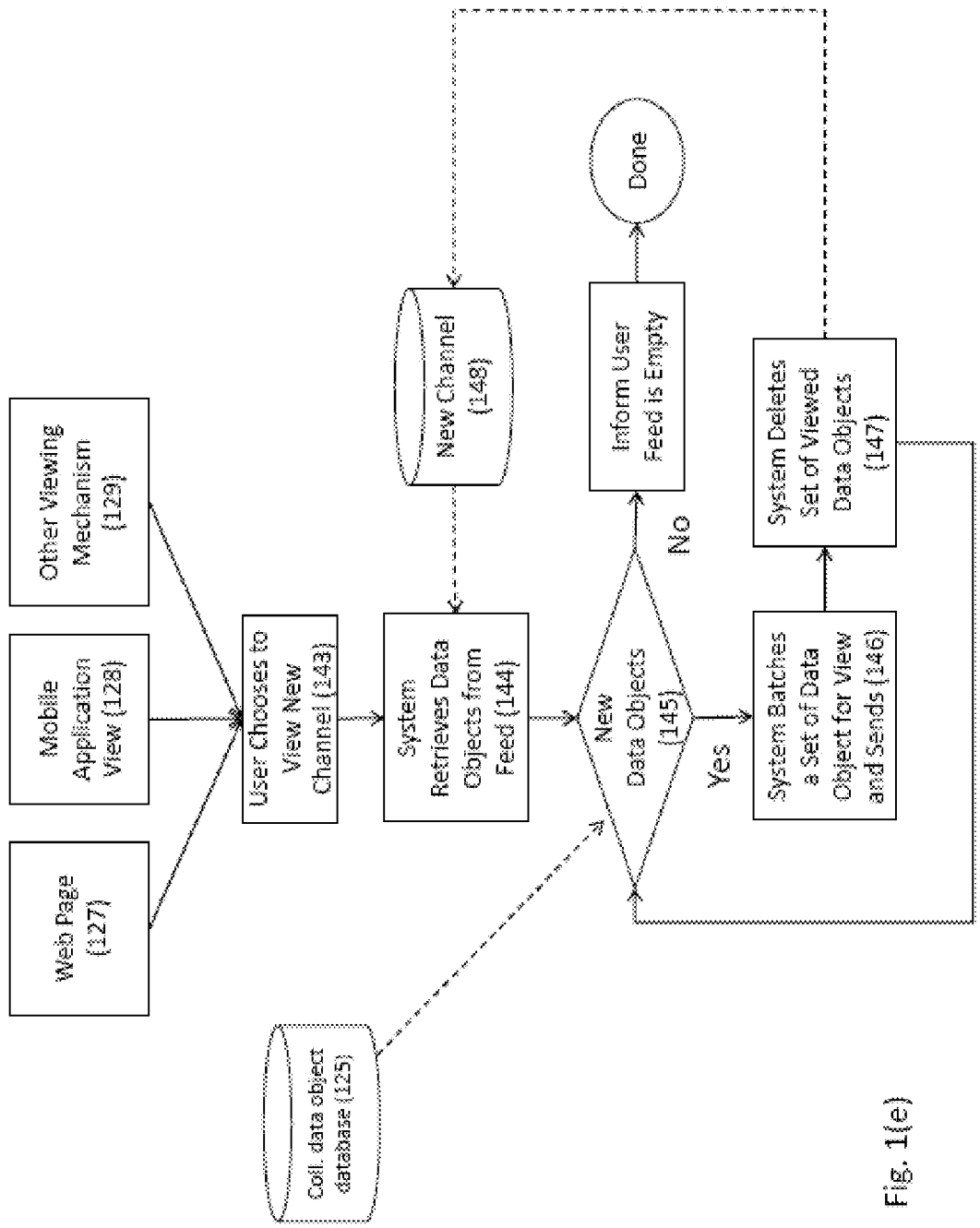
Figure 1F:
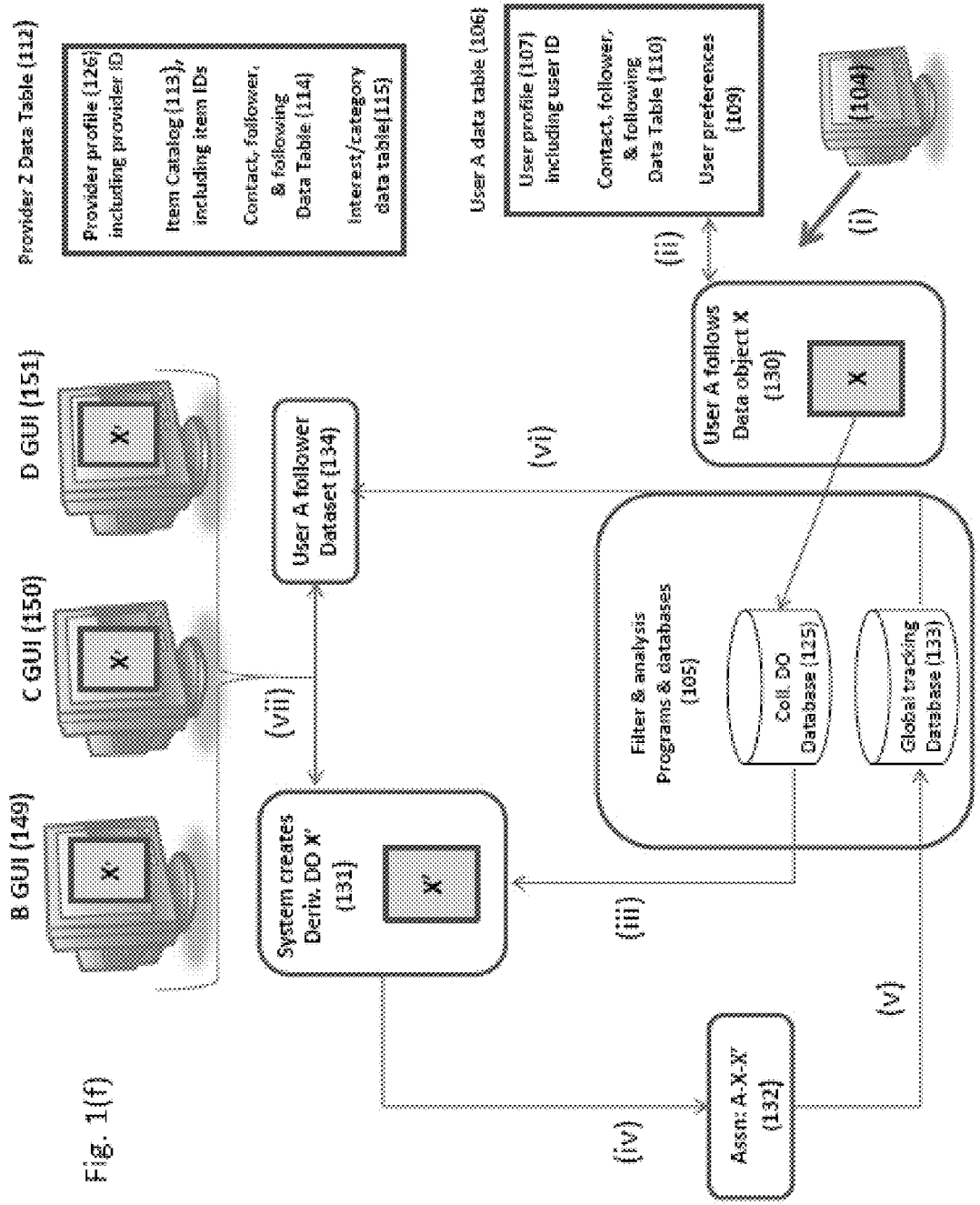
Figure 1G:
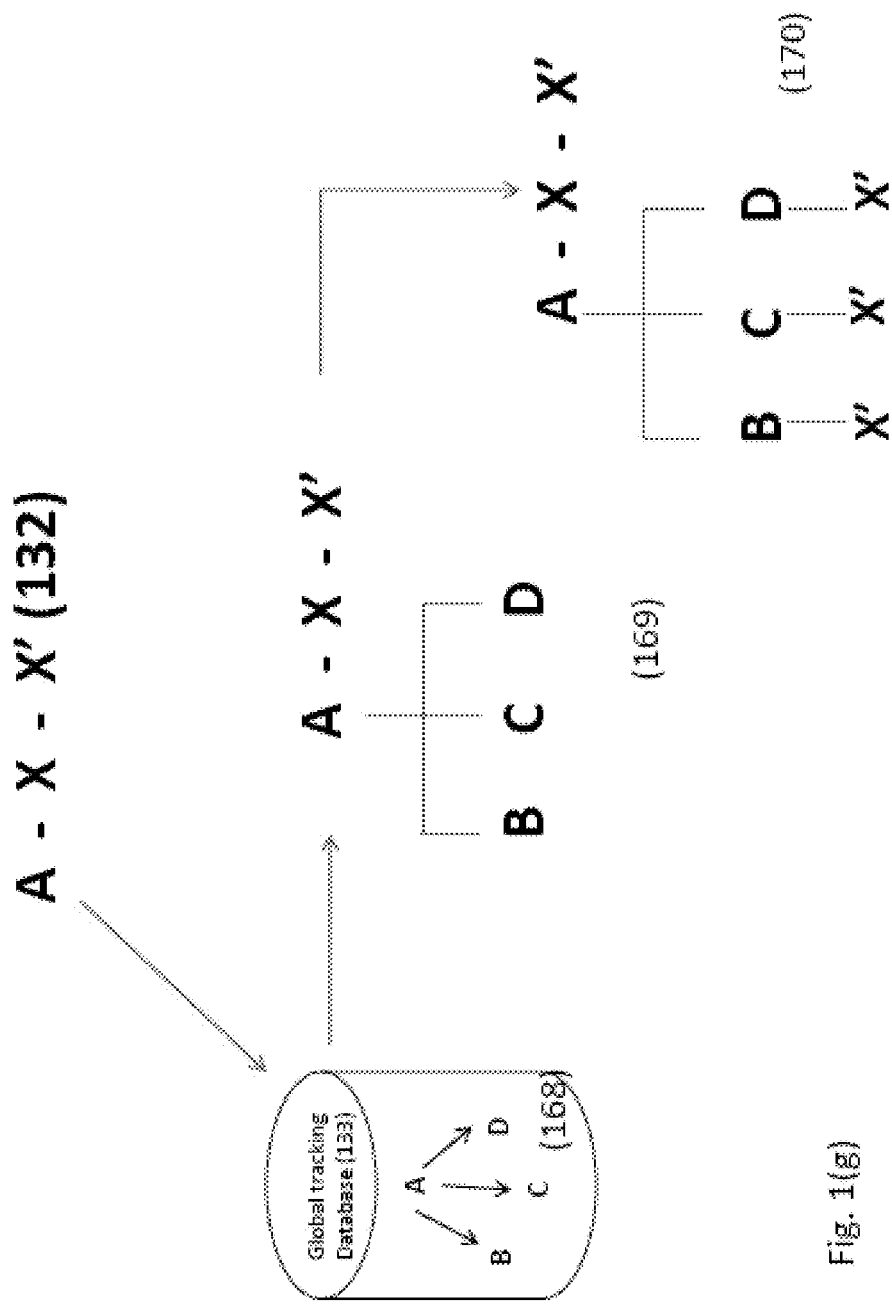
FIG. 1(g) is a schematic illustration of an association between a user, A, data object X, derivative data object X', and the followers of user A, users B, C, and D.
Figure 1H:
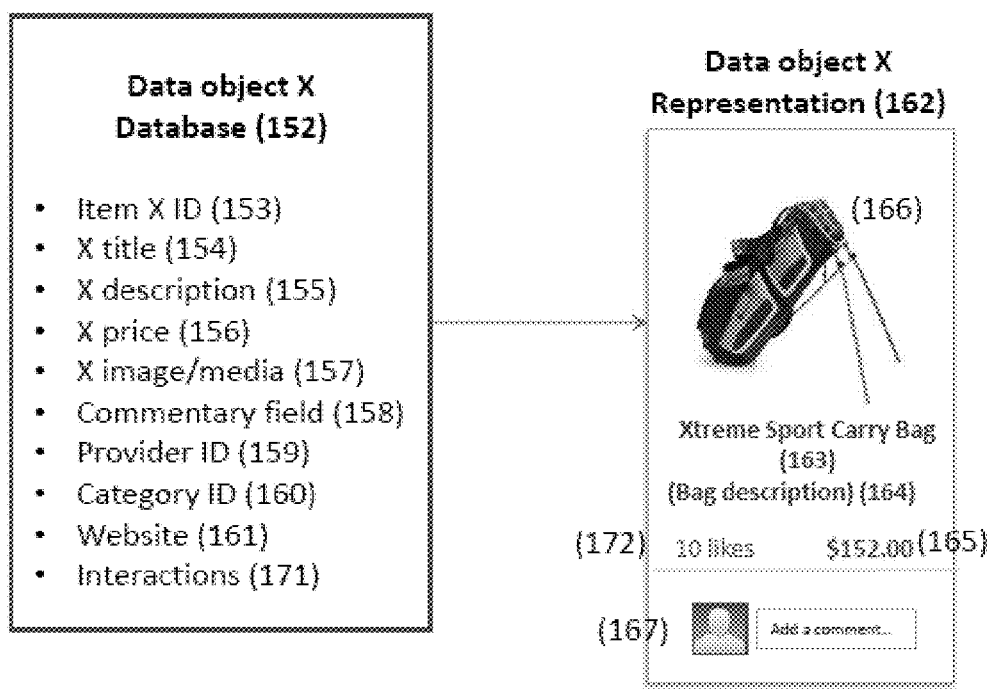
FIG. 1(h) is an illustration of a data object and the types of data stored within the data object database and the data object representation generated by the system.

Data transfer and management on the system are illustrated schematically in FIG. 1(c). Each data object, user, provider, item, and category on the system is associated in the system with a unique identifier (ID) and as described above in reference to FIG. 1(a), each provider is associated in the system with an individual provider data table (124). Moreover, each user, item, provider, brand, etc., is associated in the system with a data object and each data object is stored in a collective data object database (125) on the system (a component of element (105) in FIG. 1(a)). As described above, each provider is associated in the system with a provider profile (126). Each data object includes a reference to the user identifier (ID) of the user (or provider) who created it, as well as the unique ID of the user, provider, item, category, etc. referenced in that data object. Therefore, for example, a user having user identifier A, referred to below as user A, accesses the system via a web page (127), mobile application view (128), or other viewing mechanism (129), and for example, chooses to follow a provider data object having identifier X, and the system then creates a derivative data object having identifier X' (131). In this example, data object X is a source data object and derivative data object X' is a derivative of source data object X. Derivative data object X' is stored in the collective data object database. The system then creates an association between user A, data object X, and data object X' (132) and that association is stored in a global tracking database (133) (also a component of element (105) in FIG. 1(*a*)). Therefore, in this specific example, the association that is created includes the following data: user A, data object X, and data object X'. The system then surveys the global tracking database for the dataset of followers of user A on the system, i.e., users B, C, and D (134). If user A has no followers, derivative data object X' representation is displayed in one or more user A customized sections, channels or feeds, e.g., a section, channel and/or feed related to recent user A activities on the system (135). If user A has a follower, e.g., user B, the system displays derivative data object X' representation in a user B customized section, channel or feed (136) designed to display data object representations new to user B on the system (137); and likewise, if user A has additional followers, e.g., users C and D, the system displays derivative data object X' representation in a user C customized channel or feed and a user D customized channel or feed, respectively. If an additional association is added to the global tracking database related to user A and/or data object X', the system identifies those additional associations global tracking database (138) and displays any updates to the dataset of additional associations in the New Channel.

An additional embodiment is depicted in FIG. 1(*d*) in which user A likes data object X representation. As described above, the act of following a data object representation constitutes a system tracking preference that generates a derivative data object based on the followed data object, whereas liking a data object representation does not generate a system tracking preference. Therefore, as shown in FIG. 1(*d*), if user A likes data object X representation, that preference is associated with data object X in the collective data object database and likewise, user A's preference for data object X is stored in user A's profile (under the item preferences data table (142)), but the system does not generate a derivative data object. An association between user A and data object X is created and stored to the global tracking database and/or an additional tracking database, which may be a component of the global tracking database or a separate database in the system. The system displays data object X representation (140) in one or more of user A's GUI sections, channels, or feeds (141) as well as one or more sections, channels, or feeds of user A's followers.

A further data transfer and management embodiment is illustrated schematically in FIG. 1(*e*). If a user interfaces with the system via a web page, mobile application, or other viewing mechanism and chooses to view his/her New Channel (143), the system retrieves a dataset of data objects previously displayed in the New Channel (144), queries the collective data object database for objects not previously displayed in the user's New Channel (145), generates a dataset of new data objects (146), deletes those data objects previously displayed or viewed on the system (147), and displays the dataset of new data object representations in the New Channel (148). If no new data objects are available in the collective data object database, the system displays a message to the user via the GUI that the New Channel is empty (149). In one embodiment, the system can determine whether a data object representation has been viewed by a user, e.g., by detecting via JavaScript in the browser that the data object was displayed in the GUI and a message is sent to the server to instruct the system to remove the data object from the New Channel data table. When the New Channel is refreshed, that data object representation will no longer be displayed. Alternatively, the system may not detect actual "views" by a user in his/her browser, but instead, simply maintain an inventory of data objects that have been presented in the New Channel and once presented, the reference to that data object is deleted from the New Channel data table. In yet another alternative, the system can delete a reference to a data object within a selected time from first display in the New Channel, e.g., within one week, one month, three months, etc.

A further illustration of data transfer and management on the system is illustrated schematically in FIG. 1(*f*). User A (i) interfaces with the system on his GUI (104) and choses to follow data object X representation (130), a data object created by provider Z. As described above, provider Z is represented by a data table (112), which includes a profile (126) including provider Z's ID, provider Z's item catalog (113) (and each item in that catalog has a unique item ID), a contact, follower, and following data table (114), and an interest and/or category data table (115) which includes the interest and/or category IDs for each interest and/or category, as well as the unique item IDs for each product in an interest and/or category of provider Z. When user A choses to follow data object X representation, that preference is (ii) stored in user A's data table (106), which includes his user profile (107), including his user ID, his contact, follower, and following data table (110), and user A's preferences (109). Data object X, stored in the collective data object database (125) is used by the system's filtering and analysis programs (105) to (iii) generate a derivative data object having identifier X' (131). Derivative data object X' is also stored in the collective data object database. The system then (iv) creates an association between user A, data object X, and data object X' (132) and that association is (v) stored in a global tracking database (133) (also a component of element (105)). The system then surveys the global tracking database to (vi) generate the dataset of followers of user A on the system, i.e., users B, C, and D (134). The system (vii) displays derivative data object X' representation to the followers of user A, e.g., users B, C, and C in a B, C, and D customized section, channel or feed (149, 150, and 151, respectively) designed to display data object representations new to users B, C, and D, respectively, on the system.

As illustrated in FIGS. 1(*c*)-(*f*), the global tracking database provides a simple organizational structure that allows the system to identify relationships between data objects, users, providers, categories, etc. It allows the system to track an evolving network of relationships between data objects, users, providers, categories, etc. For example, as illustrated in FIG. 1(*g*), and in the examples described above, an association is created between user A, data object X, and derivative data object X' (132). The system then queries the global tracking database for followers/followees of user A and identifies the dataset of followers/followees of user A, users B, C, and D (168), associates the followers/followees of user A with the A-X-X' association (169), and then associates the followers/followees of user A, users B, C, and D, with derivative data object X' (170). This iterative process is used continuously as new associations are added to the global tracking database.

An example of a data object and the accompanying data object representation is illustrated in FIG. 1(*h*). Data object X is a database (152), that includes an item ID (153), a title (154), item description (155), a price (156), optionally, an image and/or media (157), a commentary field (158), the provider ID (159), optionally, a category ID for the category associated with the item (160), optionally, a hyperlink to a website (161), e.g., a product website, a provider website, a reseller/distributor website, etc., and one or more interactions (or interaction data) (171) one or more users and/or providers on the system have had with that data object. As described above, the one or more interactions can include but are not limited to: viewing the data object representation, expressing a preference for the data object representation, commenting on the data object representation, participating in a dialog regarding the data object representation, offering an opinion regarding the data object representation, providing a rating for the data object representation, clicking through the data object representation to view additional details, clicking through the data object representation to view first brand-hosted information, participating in a survey regarding the data object representation, requesting further information from a brand regarding the data object representation, buying a commercial item displayed in the data object representation from a third-party retailer/reseller, buying a commercial item displayed in the data object representation directly from the brand, buying a commercial item displayed in the data object representation from an individual, participating in an auction regarding the data object representation, offering a commercial item displayed in the data object representation for free, loan, sale, lease, and/or rental, requesting to purchase a commercial item displayed in the data object representation, requesting that a discontinued commercial item displayed in the data object representation is re-introduced by the brand and/or an authorized retailer/reseller thereof, suggesting to the brand product ideas, improvements, and/or corrections regarding the data object representation, or combinations thereof.

The system extracts the data contained in the data object to generate a data object X representation (162), including a title (163), item description (164), a price (165), an image and/or media (166), a commentary field (167), optionally, a hyperlink to a website, e.g., a product website, a provider website, a reseller/distributor website, etc. (not shown), and one or more interactions with the data object representation (172). The data object representation can include less than the full dataset contained in the database, e.g., omitting a visual representation of the item ID, provider ID, and category ID.

As described herein in reference to FIG. 1(*h*), each data object includes interaction data for that data object. The system also includes a global interaction data database that stores all interaction data for each data object in the collective data object database. The global interaction data database can be a subcomponent of the global tracking database or a separate database maintained on the system. The system uses the interaction data stored in the global interaction data database to generated marketing data for providers that participate on the system, as described herein. In specific example, if data object X representation has been liked 10 times and user A indicates that he also likes data object X representation, then the number of users on the system that have liked data object X representation will be increase to 11. If user A un-likes data object X representation, the number of users liking data object X representation is reduced to 10. For the purpose of reporting usage statistics and other analytics to a provider, the system records the number of interactions with the data object, e.g., in this specific example, the total number of likes the data object X representation has ever received on the system (11), together with the total number of un-likes the data object X representation has received on the system (1), such that the current like count is 10, which is the number of likes displayed in field (172) of the data object X representation. Each interaction with a data object representation is recorded separately in the global interaction data database along with the user ID of the user who interacted with the data object representation and the date that it occurred. This enables the system to display statistics to the providers and to do time-series analysis of the user activity.

In one specific example, if a provider would like to understand how users are interacting with a data object representation, the system can query the global interaction data database for the set of interactions taken by users on the system regarding that data object representation. The set of interactions generated by the system will include the number of comments, ratings, likes, shares, followers, etc. associated with that data object. The set of interactions will also include the click through rate of the data object, the number of purchases associated with that data object, etc. The provider can also compare the interaction data set related to a particular data object relative to other data objects in the provider's catalog, a competitor provider's catalog, data objects in the same product category as the particular data object, etc. These and other marketing analytics, described in more detail below, can be explored using the interaction data associated with a data object and stored in the global interaction data database.

Consumer-User Profile & Interface

A consumer-user can use the system without signing in, specifying any item/brand preferences and/or interests, or providing any personal information. In this embodiment, the system allows an unregistered consumer-user to view the content of the system, but an unregistered consumer-user's access can be limited to unrestricted functions of the system, e.g., the unregistered consumer-user can search the collective brand data table and/or a specific brand data table, view item and/or brand details (item or brand data object representations, respectively), view consumer-user and brand-user activity as it is occurring across all of the users, etc., while a registered consumer-user can create one or more item and/or brand lists, follow one or more items, brands and/or individuals in the system, etc.

Figure 2A:
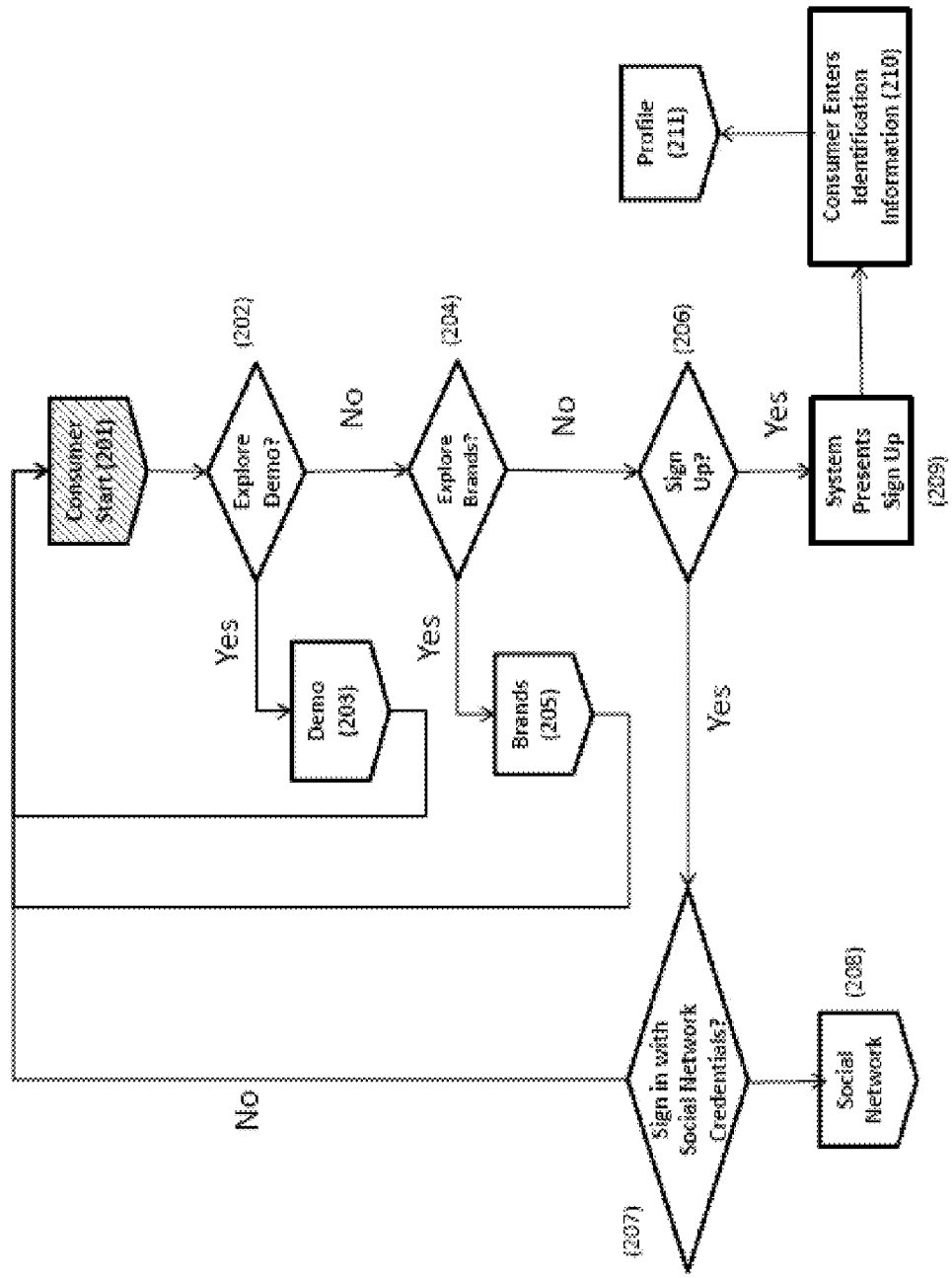
FIG. 2(a) illustrates how a consumer-user can create a profile on the system.

In a preferred embodiment, a consumer-user creates a profile on the system that includes a consumer-user profile comprising his/her name, email, password, and optionally one or more additional fields, e.g., address, telephone number, sex, date of birth, approximate individual or household income, employment information, a reference to a separate social networking website, age verification information, e.g., driver's license number or another form of personal identification, nickname(s), avatar, place of birth, occupation, hobbies, alma mater(s), marital status, the age and identity of one or more relatives, etc. A method of creating a profile on the system is illustrated in FIG. 2(*a*). An unregistered consumer-user accesses the system (201) and optionally, is given the opportunity to explore the system by viewing a system demonstration (202). If the consumer-user elects to view the demonstration, the system displays the demonstration to the user (203) and redirects the user to the initial landing page for an unregistered user (201). In addition, the consumer-user is given the option to view the various brands that participate in the system (204), optionally directing the system to display a searchable brand listing (205), and/or the consumer-user can simply search the collective brand data table for brands that participate in the system. The consumer-user is given the opportunity to create a profile on the system (206), and if selected, the system displays a sign-up screen (209) that includes information the system will use to identify that consumer-user (210).

Figure 3B:
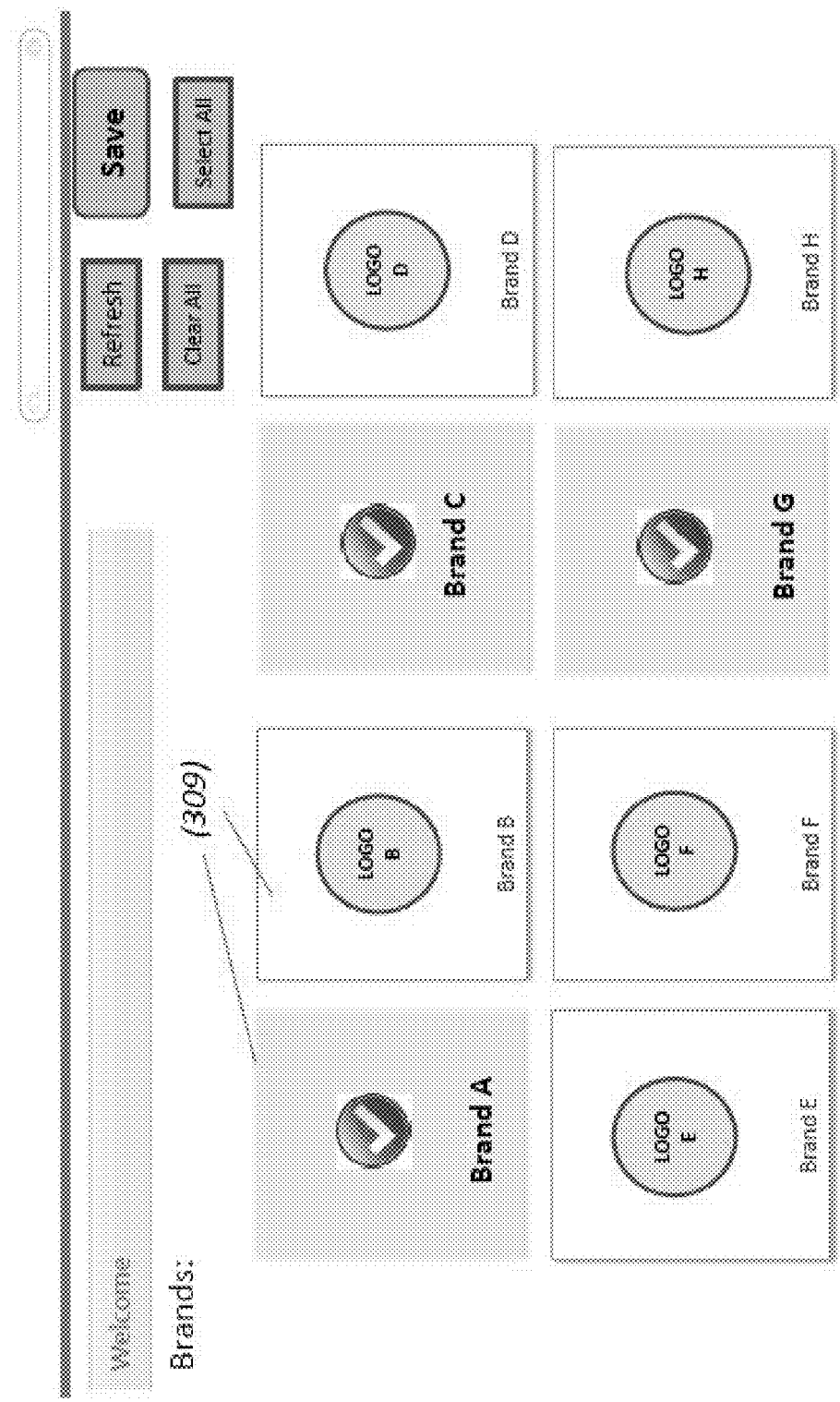
FIG. 3(b) shows one embodiment of a brand-de-selection screen that can be used to create a profile on the system.
Figure 3C:
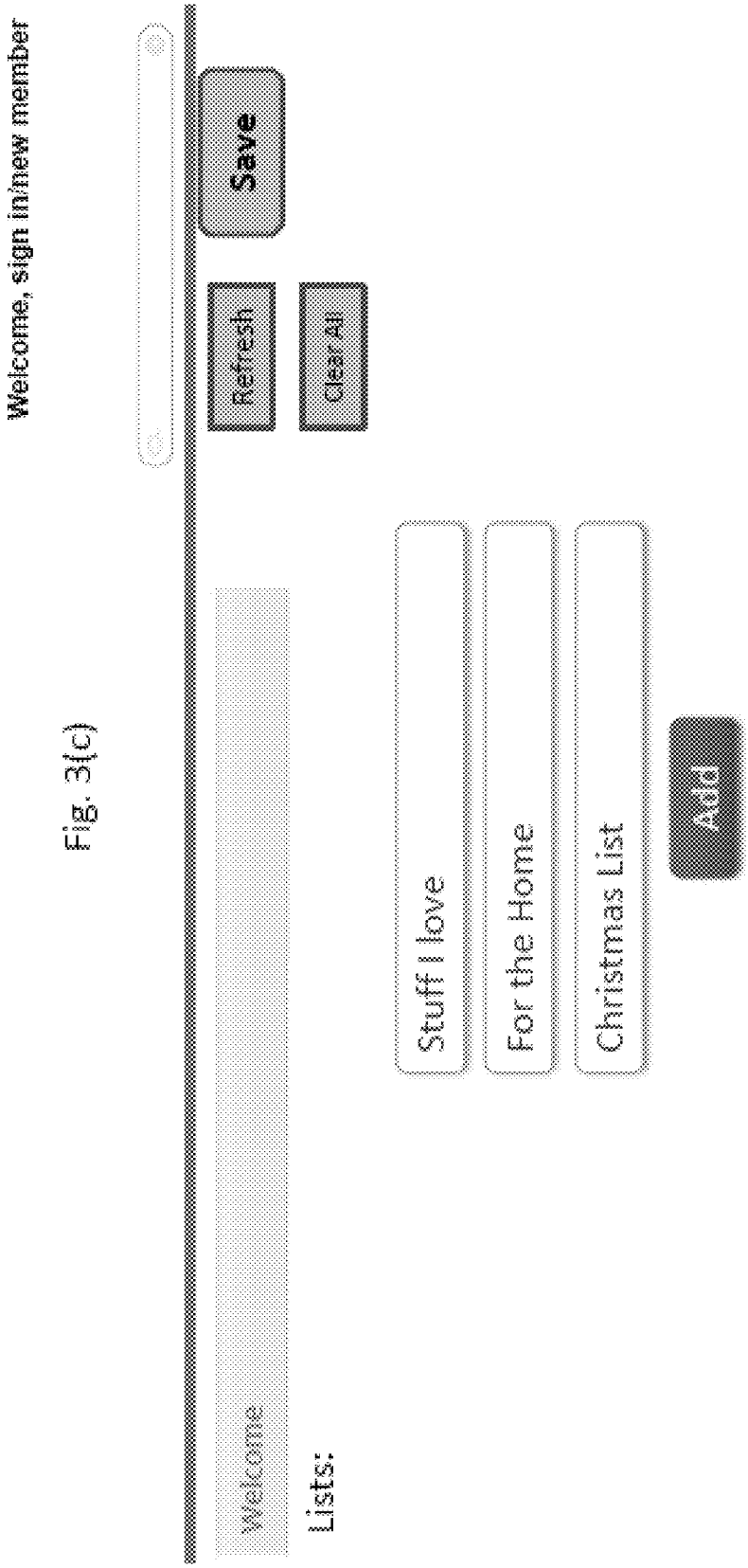
FIG. 3(c) shows one or more lists that can be created by the consumer-user during profile set-up on the system.

In one embodiment, the profile creation process includes collecting information from a consumer-user regarding his/her interests in one or more interest categories, as well as, e.g., his/her hobbies, occupation, etc. FIG. 3(*a*) illustrates one method of creating a profile on the system. FIG. 3(a) is an example of a profile creation screen. The module displays a series of interests (301) and the consumer-user selects those interests he/she prefers. The module can then display a series of brands that fall within the interest categories selected and the consumer-user can de-select brands within that interest category in which the consumer-user is not interested (302) (FIG. 3(b)). Likewise, the module can display avatars of people the consumer-user is following once the consumer-user links the system to his/her contacts in a social networking site, and the consumer-user can de-select those people he/she does not wish to follow on the system (not shown). Moreover, the module can display one or more lists the consumer-user may wish to create in view of his/her interests and the consumer-user can de-select those lists he/she does not wish to populate on the system and/or create new lists he/she wants to populate on the system (FIG. 3(c)).

Figure 3D:
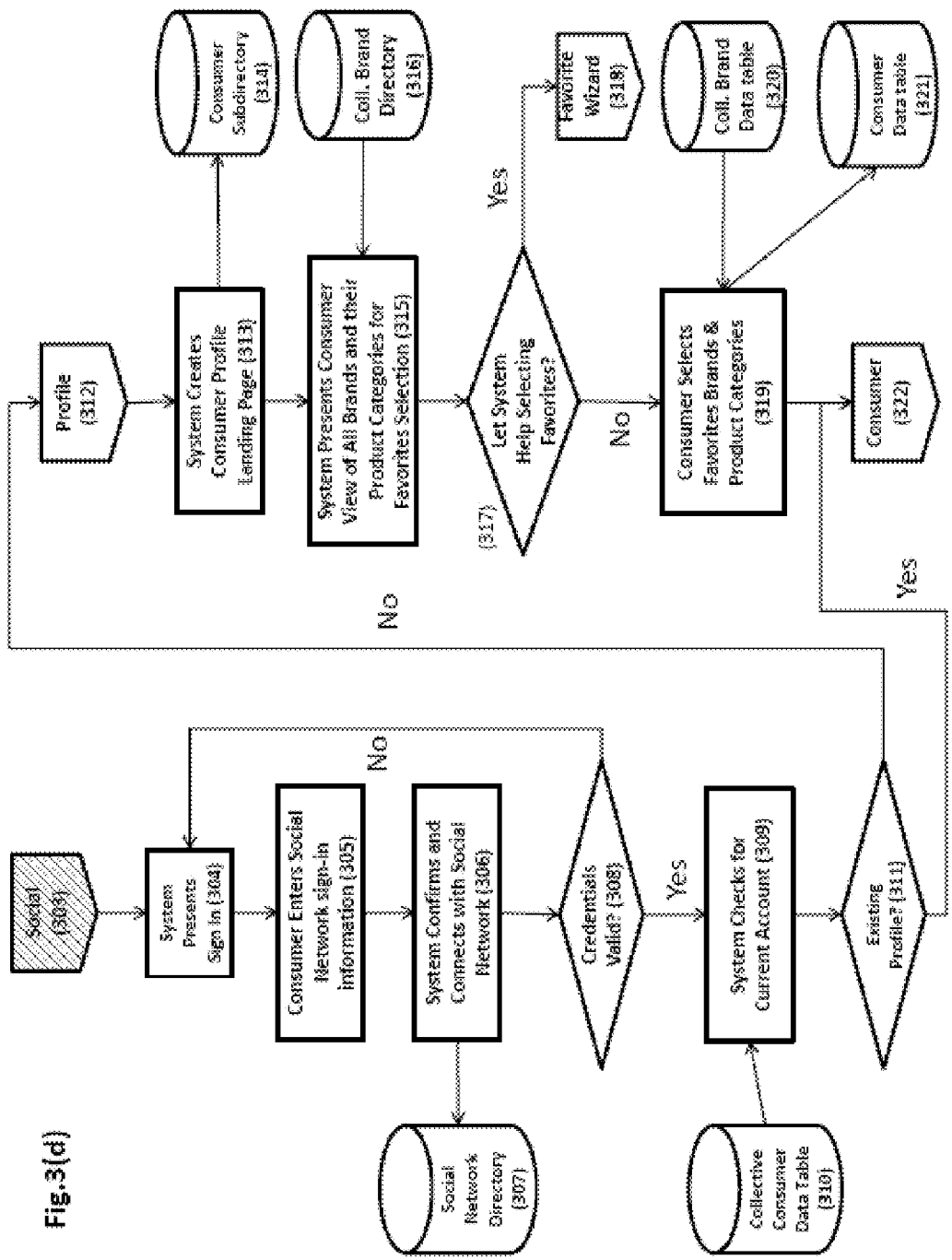
FIGS. 3(d)-(e) schematically illustrate the profile creation process on the system.

FIG. 3(d) is a schematic illustration of how a consumer-user can create a profile on the system. In one embodiment, the consumer-user signs into a social networking site (303) and he/she is directed to a system sign in screen (304). The consumer-user is prompted to enter his/her social network login credentials (305) and the system connects (306) with the social network (307) to confirm that the credentials are valid (308). If the credentials are not valid, the system prompts the consumer-user to login without using his/her social network credentials. If the credentials are valid, the system queries the collective consumer data table (309, 310) to confirm that consumer-user has an existing profile on the system (311). If the consumer-user has an existing profile (312), the system displays the consumer-user landing page for that profile (313) based on information drawn from the consumer-user profile data table (314). If the consumer-user does not have an existing profile, the system creates a new profile on the system for that consumer-user and stores profile information in a consumer profile data table for that consumer-user. The system presents a consumer-user with one or more listings of brands and/or item categories for the consumer-user to select his/her favorites, as described above in reference to FIGS. 3(a)-(c) (315), and information regarding brands, brand categories, items, and item categories, presented at this stage of the process is supplied by the collective brand data table (316). The system also includes a feature that facilitates favorite selection (317), known as a favorite wizard (318), and described below. The consumer-user selects favorite brands and item categories (319), as well as optional subcategories (not shown), and the system draws information for this process from the collective brand data table (320), saving the results in the consumer brand preferences data table for that consumer-user (321). At the conclusion of this process, a consumer-user profile is created (322).

Once a consumer-user expresses a preference for a data object, the system software determines which consumer-users GUIs, channels or feeds the data object should be displayed in by querying the followee/follower relationships stored in the collective consumer data table, individual consumer-data tables, collective brand data table, and/or individual brand data tables. For example, if consumer-user Bob follows Brand Y shoes on the system and Brand Y adds a new shoe data object, the system will query the collective consumer data table, individual consumer-data tables, collective brand data table, and/or individual brand data tables to look for a preference Bob has expressed in Brand Y shoes so that the new shoe data object is displayed in one or more sections, channels, or feeds of Bob's consumer-user GUI.

The system will copy a reference to the data object into the appropriate pre-defined or customized channel or feed data tables and a consumer-user associated with each pre-defined or customized channel will see the new data object upon the next refresh of the channel or feed GUI. Moreover, for the channels or feeds designed to display data object representations not previously viewed by a consumer-user (e.g., "New Channel"), after the system has determined that a data object has been viewed by a given consumer-user and/or previously presented by the system to the consumer-user in his/her GUI, the system will remove the data object from the New Channel by deleting the reference from the New Channel data table. In one embodiment, the system can determine whether the data object has been viewed by a consumer-user, e.g., by detecting via JavaScript in the browser that the data object was displayed in the consumer-user's GUI and a message is sent to the server to instruct the system to remove the data object from the New Channel data table. When the New Channel is refreshed, that data tile will no longer be displayed. Alternatively, the system may not detect actual "views" by a consumer-user in his/her browser, but instead, simply maintain an inventory of data objects that have been presented in the New Channel and once presented, the reference to that data object is deleted from the New Channel data table. In yet another alternative, the system can delete a reference to a data object within a selected time from first display in the New Channel, e.g., within one week, one month, three months, etc.

Figure 3E:
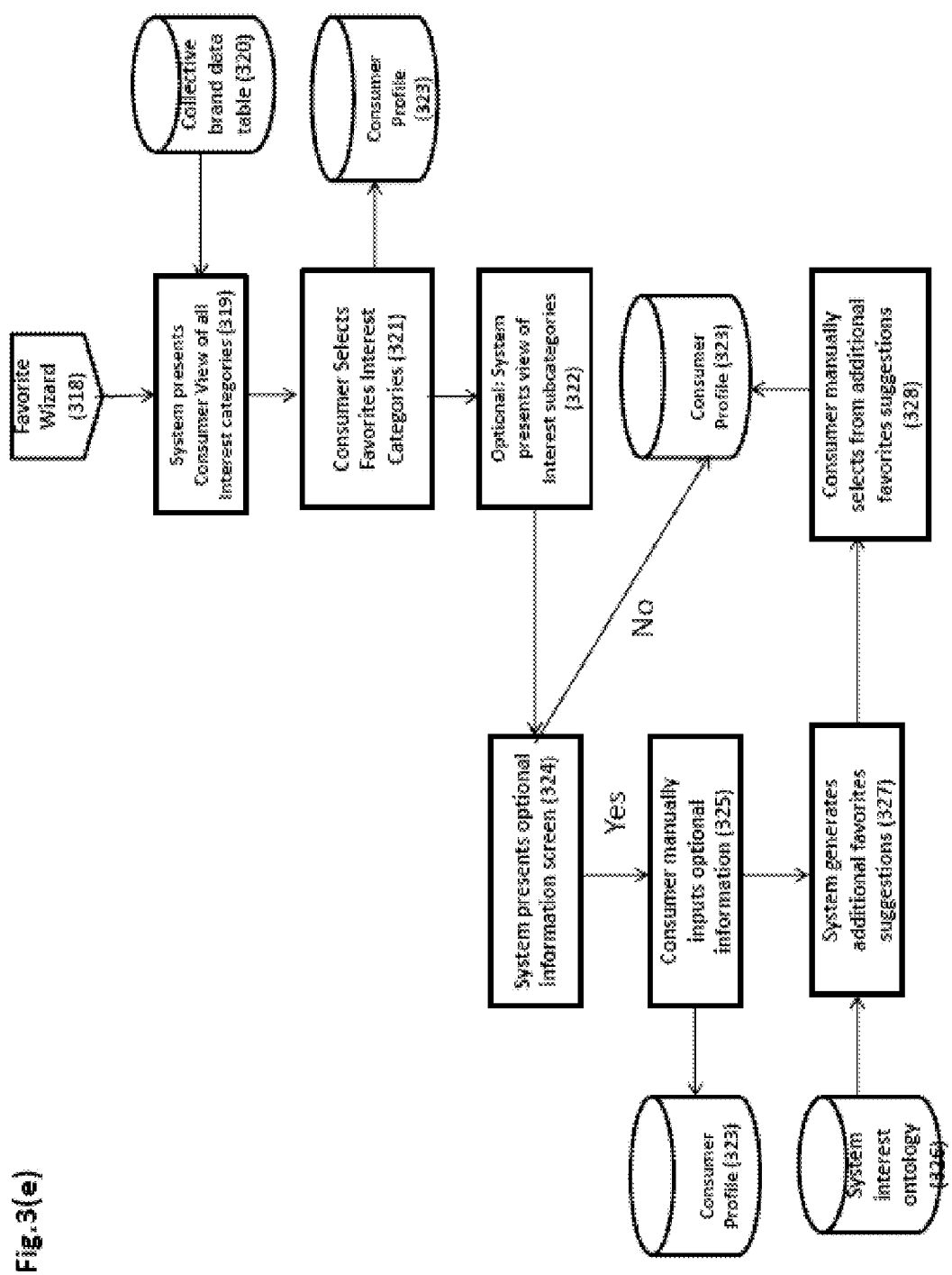

FIG. 3(e) illustrates the favorite wizard (318) referenced above. The favorite wizard presents the consumer-user a view of all interest categories (319), based on information drawn from the collective brand data table (320). The consumer-user selects favorite interest categories (321) and optionally, subcategories (322) and those selections are saved to the consumer profile (323). The system optionally presents one or more fields regarding optional information (324), e.g., concerning the consumer-user's occupation, average household income, home ownership, purchasing responsibilities, children, marital status, etc., that can be used by the system to generate item/brand suggestions. If the consumer-user elects to include the optional information in the profile, he/she inputs the information (325), which is saved to the consumer profile (323). The system optionally generates additional interest category and/or brand suggestions (327) based on the optional information provided by the consumer-user and information contained in the collective brand data table (326), and the consumer-user selects from the additional suggestions (328) to generate a profile stored to the consumer-user profile (323).

In an additional embodiment, the favorite wizard can also compare the consumer-user's profile information, e.g., age range, sex, and interests, to item and/or brand selections of comparable consumer-users on the system, and the system displays suggestions based on that comparison. For example, if a consumer-user is a male, age 45, with an interest in golf, the system will survey the item/brand preferences of additional male consumer-users on the system within the same age range that have also expressed an interest in golf, and display items and/or brands the additional consumer-users have selected as suggested favorites.

The following example serves to illustrate the profile creation system described above and illustrated in FIGS. 3(a)-(e), the consumer-user identifies one or more preferred interest categories, e.g., sports and outdoors, and the system displays one or more preferred interest subcategories, e.g., within the category of sports and outdoors, the consumer-user can specify an interest in team sports, exercise and fitness, outdoor recreation, athletic and outdoor clothing, etc. For each additional interest category selected, the consumer-user can optionally select interest subcategories, e.g., within the category of toys, the consumer-user can specify an interest in video games, dolls, and/or construction toys, and within the category of small consumer electronics, the consumer-user can specify an interest in cameras, telephones, and/or radios. Each preferred interest subcategory can be further categorized into additional subcategories, e.g., within the subcategory of cameras, the consumer-user can specify an interest in digital cameras, SLRs, and camcorders, etc. The system can include one or more predefined interest categories and subcategories and/or the consumer-user can define consumer-user-specific interest categories and subcategories. As described above, each category (and subcategory) comprises a unique ID and products and/or brands associated with that category also comprise a unique ID. Therefore, if a consumer-user expresses a preference for a particular category of products on the system, an association is made by the system between the user ID and the category ID, and the system then uses that association to identify item IDs included in that category and display those item IDs to the user. Hence, the system matches the unique user IDs, category IDs and item IDs within that category to generate a tailored subset of data objects matching his/her preferences.

Once the consumer-user has selected an interest category and/or one or more subcategories, the selection screen is updated to display representative brands that participate in the system that are categorized within the interest categories and/or subcategories highlighted by the consumer-user. In one embodiment, a brand can pay an additional fee to be prominently displayed in the selection screen, e.g., to be displayed in the first grouping of representative brands that are categorized within a selected interest category (this is an example of one way of "featuring" an item which is described in more detail below). The interest category selection step can be updated at any time during the selection process by the consumer-user. The various representative brands can be shown in the selection screen using the individual brand logo or the field can include a list of brands by brand name. The consumer-user can select and/or de-select one or more brands from the lists provided in the profile set-up, i.e., to select favorite brands and/or to remove brands the consumer-user does not want to browse on the system. Alternatively, the consumer-user need not select and/or de-select any brands from the lists provided in the profile set-up which allows the consumer-user to view information from all brands categorized within the general interest categories/subcategories selected by the consumer-user. For example, the consumer-user can specify an interest in women's clothing of any brand or of a particular designer. In addition, the consumer-user can de-select women's clothing made by a particular manufacturer which would inform the system to filter the consumer-user's results to remove that manufacturer from the consumer-user's view. Still further, the consumer-user can refresh all or part of the brand selection process at any time during profile set-up.

In addition or alternatively, the consumer-user can also select one or more brands during the profile set-up without any reference to a particular interest category. In this embodiment, the system presents a list of brands that participate in the system and the consumer-user selects those brands in which he/she has an interest. The list of brands can be displayed to the consumer-user in any order, e.g., alphabetical or divided into one or more interest categories. The consumer-user can also provide information regarding which items/brands the consumer-user already owns or has experience with in order to allow the system to filter the results of a brand's item offerings to eliminate items/brands the consumer-user already owns. In this regard, the system can provide targeted shopping results including items that are new to a given consumer-user, albeit not necessarily a newly released item on the system or in the general marketplace.

The system can collect additional information from a consumer-user that may better inform the system regarding the consumer-user's shopping preferences. For example, the system can collect information regarding occupation, income, home ownership, whether the consumer-user is primarily responsible for the household shopping, and whether he/she has any children and their approximate age ranges. Information about whether the consumer-user is primarily responsible for household shopping because while the consumer-user may not have an interest in household items, as the primary household shopper, he/she will nevertheless be interested in items related to housewares, cleaning supplies, etc., e.g., goods and services associated with maintaining a household (a consumer-user can also chose not to provide this information if he/she is not interested in receiving information about such items). Similarly, information about the number of children the consumer has may inform the system and/or a brand that the consumer's interests may extend to items for children, e.g., clothing and toys, although the consumer-user has not necessarily expressed an interest in those items at another stage of the profile creation process (a consumer-user can also chose not to provide this information if he/she is not interested in receiving information about such item). These optional categories of additional information can be added to the user's profile to extend the scope of data objects the system can display to the user.

The consumer-user can also include a list of one or more contacts in his/her profile. The contacts need not be consumer-users of the system. In a preferred embodiment, one or more of the consumer-user's contacts are also consumer-users ("additional consumer-users") of the system. In one embodiment, a consumer-user's contact data table is populated by importing one or more contacts of a consumer-user's contact data table of a social networking website. Alternatively or additionally, the contact data table can be populated by importing one or more contacts of a consumer-user's contact data table of an email exchange system. In one embodiment, the contact data table includes a list of individuals and/or brands followed by the consumer-user and/or those brands and/or individuals that follow the consumer-user. Alternatively, the consumer-user profile can include a follow/follower data table that includes a list of individuals and/or brands followed by the consumer-user and/or those brands and/or individuals that follow the consumer-user and the follower/follower data table is separated from the contact data table.

The system can allow a consumer-user to manage interactions with contacts or contacts on a social networking site via the system, e.g., to browse and search all users of the system that participate in a particular social networking site, to invite other system users to become contacts via a social networking site, to accept and/or reject friend invitations via the system, delete contacts or contacts from a contacts or contacts list on the system, to send a private message to one or more contacts or contacts in their network via the system, to block communications from a contact in their network over the system, and/or to report a friend's or contact's misconduct on the system to a system administrator. Moreover a consumer-user can view their contact list in a grid or list format, sort their contacts or contacts list alphabetically by first or last name, perform keyword (or name) searching on a contacts or contacts list, group contacts or contacts in one or more lists, and filter a contacts or contacts list to display all contacts or contacts, those recently added and/or with updated profiles, etc., and add a contacts from a contacts list to one or more preferred lists, e.g., a gift list and/or a watch list.

In addition, the consumer-user can also create one or more lists in his/her consumer-user profile populated by his/her preferred interests, items and/or brands. Each individual consumer profile includes one or more additional data tables including a consumer-user's purchasing preferences, e.g., brand preferences, item preferences, and interest categories. The one or more additional data tables can include one or more item lists organized in any manner defined by the consumer-user. For example, a consumer-user can create one or more lists, including but not limited to: desired items, owned items, used items, preferred items, items identified by a consumer for a third party, items viewed by the consumer, items shared or commented on by the consumer with a contact, items shared or commented on by a contact with a consumer, and all items, as well as one or more brand lists (also organized in any manner defined by the consumer-user), including but not limited to: desired brands, owned brands, used brands, preferred brands, brands identified by the consumer for a third party, brand data object representations shared or commented on by the consumer with a friend, brand data object representations shared or commented on by a friend with the consumer, and all brands.

For example, the consumer-user can create one or more lists of items for specific reasons, e.g., a wish list, gift list, birthday list and/or holiday list. As used herein, a wish list is a list of item/brands desired by a consumer-user, while a gift list is a list of items/brands the consumer-user may want as a gift for a third party. A birthday list and holiday list are each examples of specialized gift lists that can be created for a specific occasion. In one embodiment, the consumer-user can grant access to one or more lists in his/her consumer-user profile to one or more contacts. For example, the consumer-user can grant a friend access to a limited number of the lists in his or her profile, e.g., only his/her wish or gift list, or one or more of his/her contacts can be granted full access to all of his/her lists. In this regard, the access granted to a friend can be view-only access or the friend can be granted permission by the consumer-user to comment on one or more of the items in the consumer-user's lists. For example, if the consumer-user creates a wish list for a given event, e.g., a wedding or baby registry, he/she can grant access to that registry to one or more contacts, and the contacts can be permitted to indicate whether they purchased one or more items on the registry, optionally identifying themselves by name. Still further, the consumer-user profile can also include a list of items and/or brand pages available on the system bookmarked by the consumer-user and one or more contacts can be granted access to the consumer-user's bookmarks.

For an item and/or brand data object representation, a consumer-user can provide a comment, write a review and/or rate the item or brand. A comment from one user to another regarding a brand or item can be about any subject, including but not limited to, a suggestion to purchase that item for oneself or an individual, an indication that one user likes or dislikes the item, an indication that one user would like to purchase an item from another user, etc. The following attributes for the item/brand rating and reviews can be included by the consumer-user in his/her comment and/or review: consumer-user name or anonymous rating, comment or review date, rating (e.g., on a scale of one to five stars or another rating system created by the system), and comment and/or review text. In a preferred embodiment, the consumer-user can provide a comment on an item and/or data object representation and contacts of the consumer-user can do the same. A brand can also include a comment on an item and/or brand data object representation. Because the filtering program is configured to select that information relevant to an individual consumer-user on the system, only those comments supplied by a contact, follower, and/or one followed by the specific consumer-user and/or by a brand in which that consumer-user has expressed an interest are displayed in the data object representation for that item and/or brand as it appears in that specific consumer-user's interface.

In addition, as described above, a consumer-user can also interact with a data object representation as follows: viewing one or more data object representations, expressing a preference, commenting on one or more data object representations and/or derivative data object representations, participating in a dialog regarding one or more data object representations or derivative data object representations, offering an opinion, providing a rating, clicking through one or more data object representations to view additional details, clicking through one or more data object to view first brand-hosted information, participating in a survey, requesting further information, buying a commercial item displayed in one or more data object representations from a third-party retailer/reseller, buying a commercial item displayed in one or more data object representations of the subset directly from the brand, buying a commercial item displayed in one or more data object representations from an individual, participating in an auction, offering a commercial item displayed in one or more data object representations in the subset for free, loan, sale, lease, and/or rental, requesting to purchase a commercial item displayed in one or more data object representations, requesting that a discontinued commercial item displayed in one or more data object representations in the subset is re-introduced by the first brand and/or an authorized retailer/reseller thereof, suggesting to the first brand product ideas, improvements, and/or corrections regarding one or more data object representations in the subset, removing a data object representation from one or more lists ("de-listing"), sharing a data object representation with an individual or group, e.g., emailing the data object representation (or a hyperlink to the data object), including a hyperlink for that data object on a social networking system, etc., "un-liking" a data object, e.g., removing that data object representation from the list of liked data object representations in a consumer-user's profile, "un-friending", e.g., removing that data object representation from the list of "friends" in a consumer-user's profile, or combinations thereof.

Figure 4A:
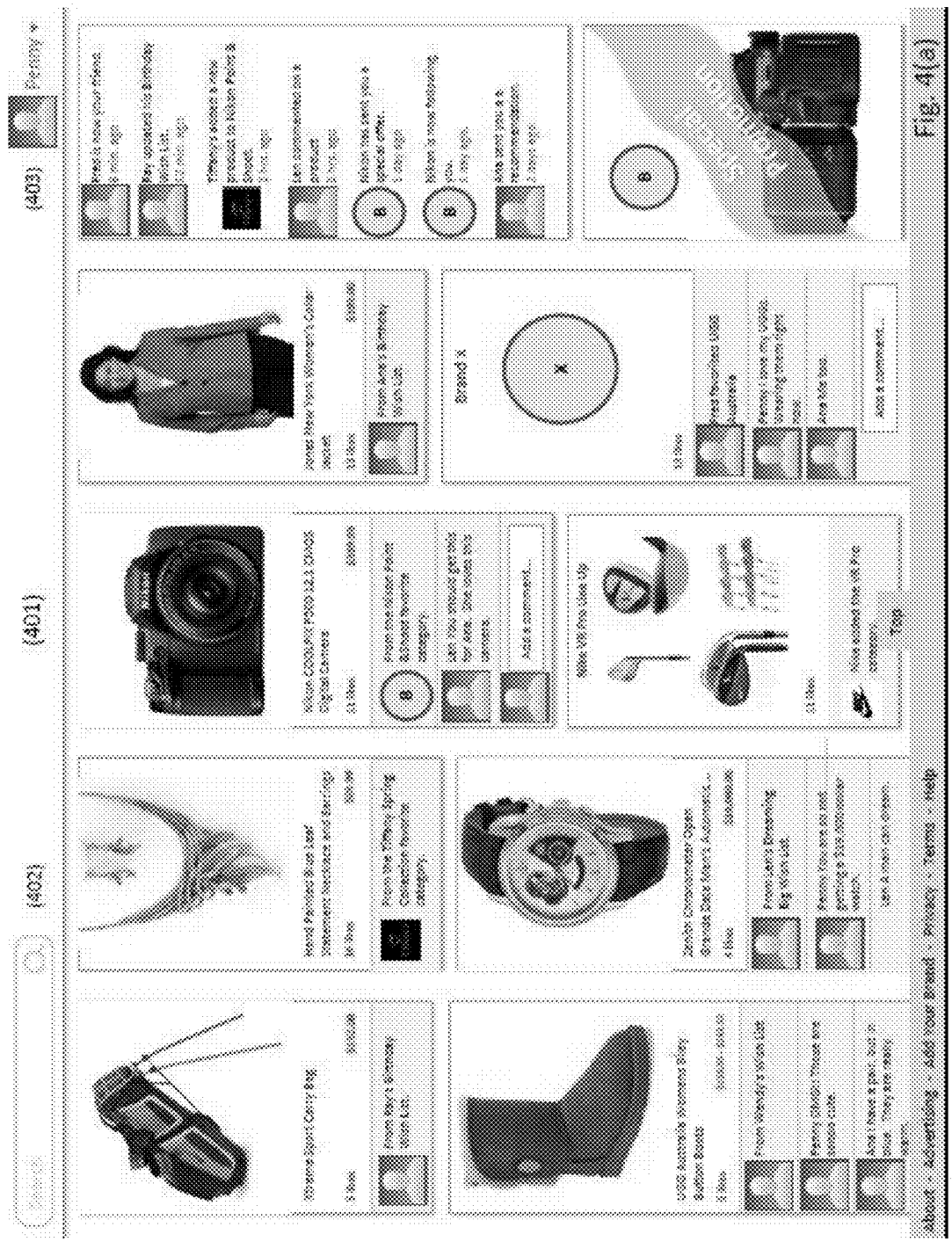
FIGS. 4(a)-(f) illustrate several embodiments of a consumer-user's landing page on the system.
Figure 4B:
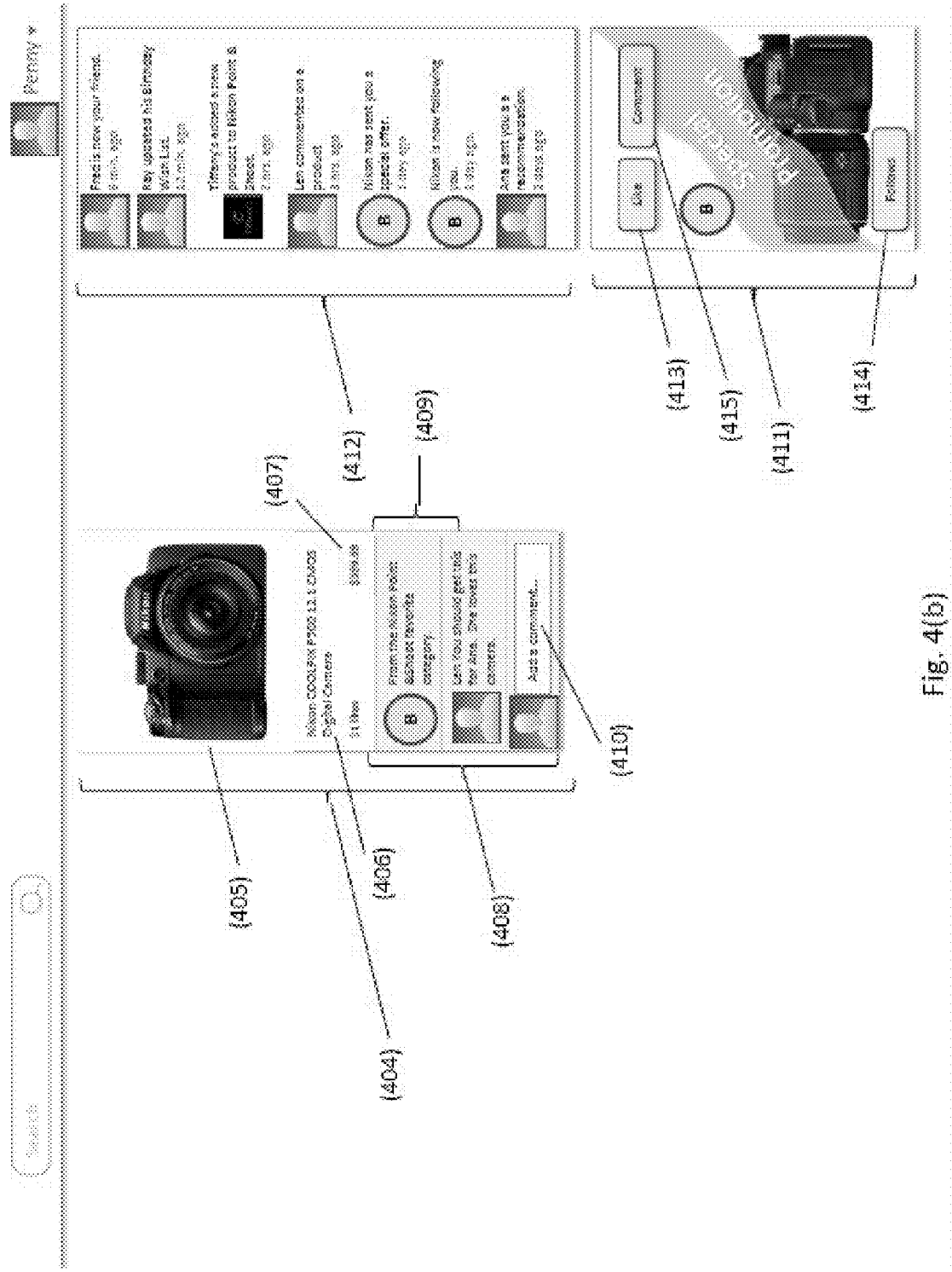

Once the consumer-user creates a consumer-user profile and an system profile, the information provided by the consumer-user is formatted by the network to create a consumer-user GUI or consumer-user landing page (or a "home page") that is tailored to the consumer-user's profile. One non-limiting example of a consumer-user GUI landing page is depicted in FIGS. 4(a)-(f). The GUI includes a header (401) that includes a search field (402) and an optional consumer avatar (403) that identifies the consumer-user GUI as one that has been customized by the system for the consumer represented by that avatar (in an alternative embodiment, the consumer avatar can be replaced by a username field (not shown)). A series of data object representations are shown in FIG. 4(a) (404) and a more detailed view of a data object representation is shown in FIG. 4(b), wherein that data object representation includes a selectable common visual representation of an item, including an item image (405), a title (406), a price (407), and a commentary field (408), including comments from contacts or followers of the individual consumer-user, including the brand that supplies the item depicted in the data object representation (409), as well as a field that can be selected by the user to add a comment to the commentary field (410). An additional item data object representation is depicted in 411, which includes promotional information related to an item or brand in which the consumer-user has expressed an interest. The consumer-user interface can also include an activity feed (412) which provides information regarding activities the consumer-user has engaged in on the system and/or activities of contacts or follows of the consumer-user. The activity feed can be displayed in chronological, reverse chronological, random order, or a consumer-user defined order. In a preferred embodiment, the activity feed is displayed in reverse chronological order. Each data object representation can also include icons (413-414) that the consumer-user can select to indicate a preference for that data object (e.g., "like" (413) or "follow" (414) or to add a comment regarding that data object representation if a commentary field has not been added by a friend or follower of that consumer-user (415).

Figure 4C:
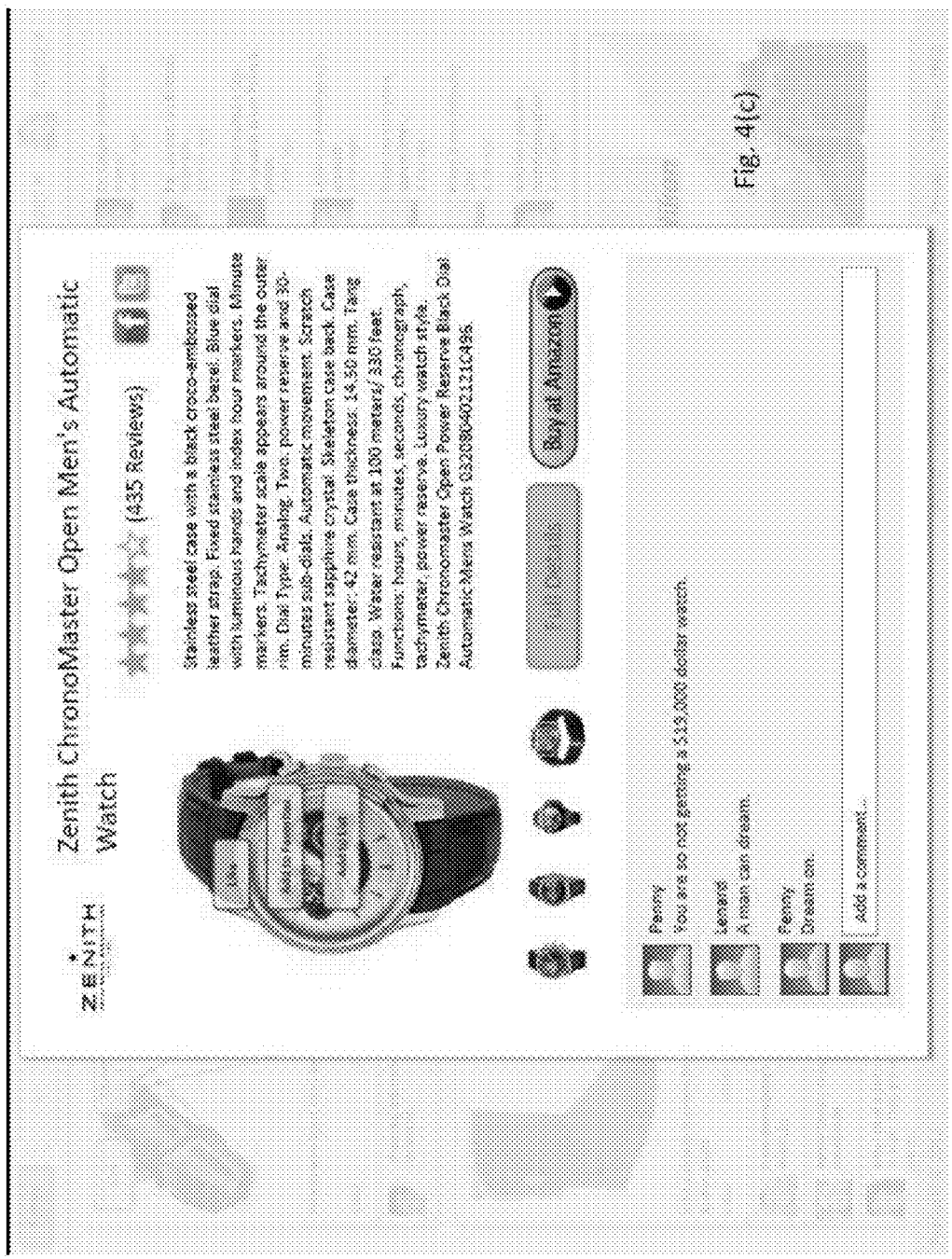

As noted above, each data object representation can be selected by a consumer-user and the system displays additional information related to that data object. An example of a more detailed view of a data object representation is shown in FIG. 4(c). The detailed view includes one or more item image(s), an item title, an item price, a detailed description of the item, purchasing options, and a commentary field, including comments from contacts of the individual consumer-user, including the brand that supplies the item depicted in the data object, as well as a field that can be selected by the user to add a comment to the commentary field.

Figure 4D:
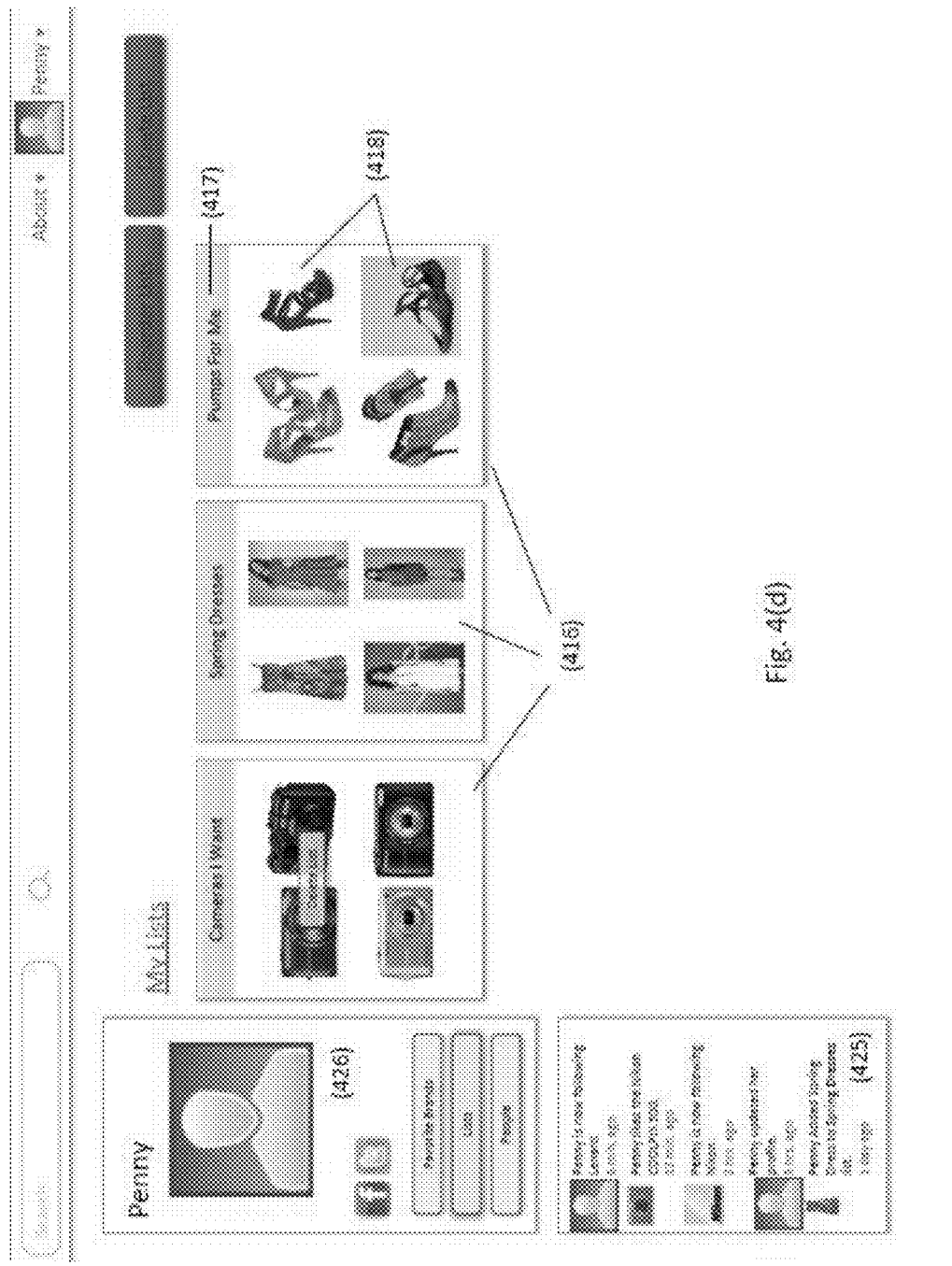
Figure 4E:
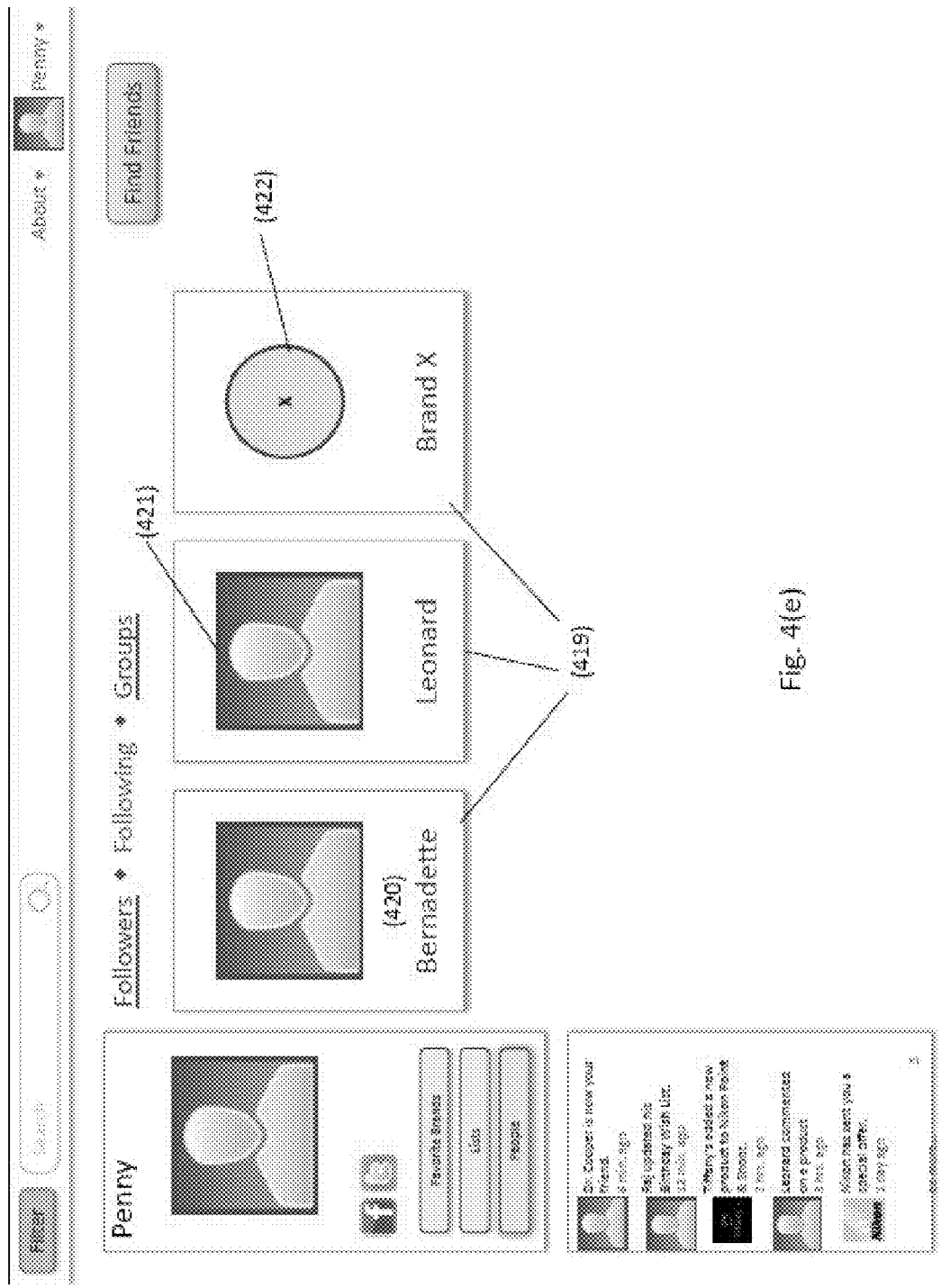
Figure 4F:
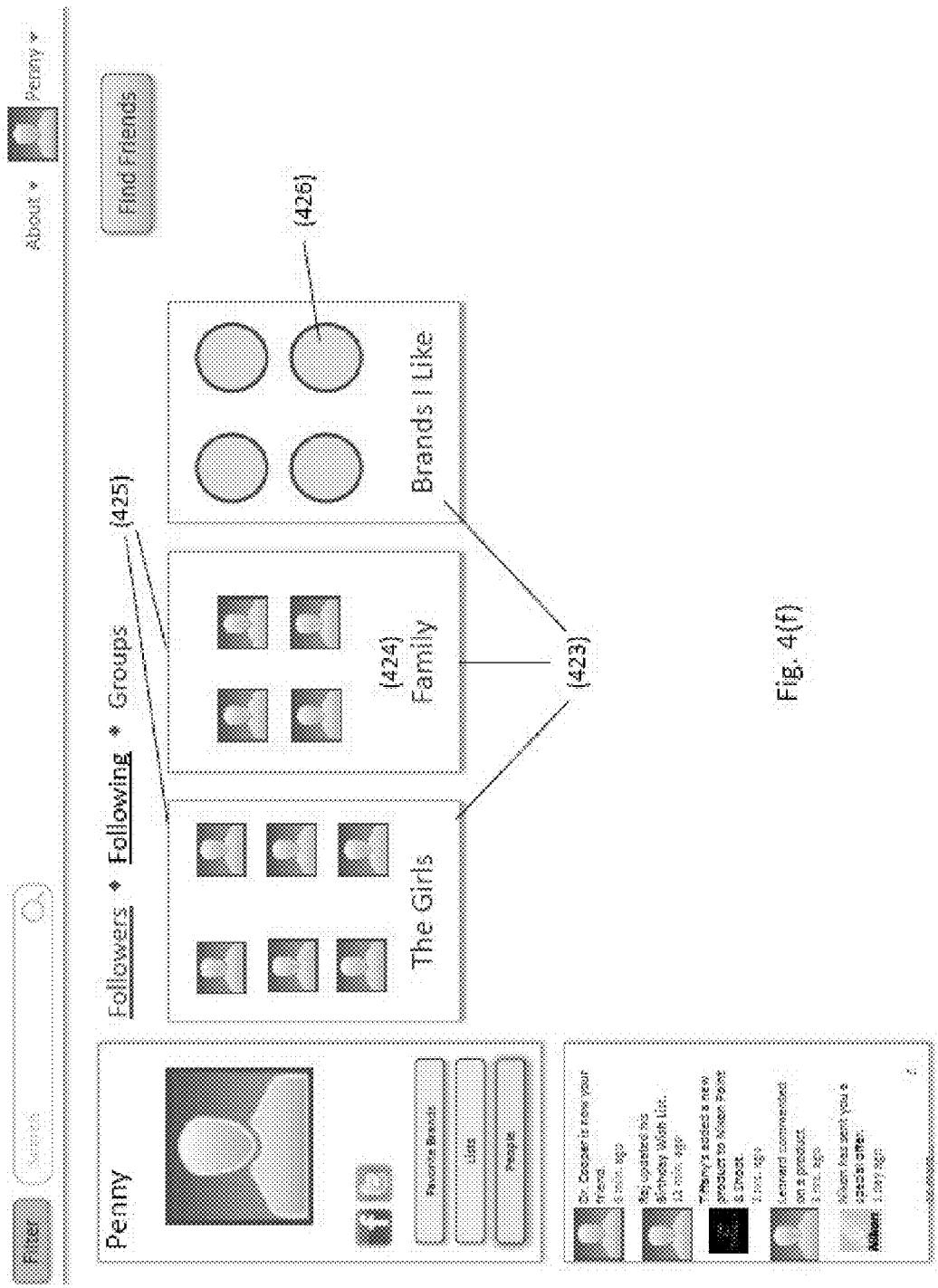

FIG. 4(d) illustrates one embodiment of a screen a consumer-user can access via the landing page (e.g., via a drop-down menu under the consumer-user icon or username (not shown) to provide more detail regarding one or more lists the consumer-user has created in the system. Each list is represented by a data object representation (416), and that data object representation can include a name for that list (417) and optionally one or more images of items included in that list (418). Another screen a consumer-user can access via the landing page is shown in FIG. 4(e), which includes more detail regarding one or more individuals and/or brands the consumer-user follows on the system and/or one or more individuals and/or brands that follow the consumer-user on the system. Each individual or brand is represented by a data object representation (419) and the data object representation can include the individual or brands name (420) and optionally, an avatar (421) or brand logo or trademark (422). Moreover, the consumer-user can also access a screen via the landing page that includes more detail regarding groups of individuals and/or brands the consumer-user follows on the system and/or one or more individuals and/or brands that follow the consumer-user on the system (FIG. 4(f)). Each group of individuals or brands is represented by a data object representation (423) and the data object representation can include the group name (424) and optionally, one or more avatars (425) or brand logos or trademarks (426).

As noted above, a consumer-user can interact with one or more contacts on the system, e.g., by sharing items or brands with contacts or followers, by adding to and/or commenting on a data object representation, etc. In one specific embodiment, a consumer-user can also use the system to solicit comments from one or more contacts or followers regarding one or more item or brand data object representations in which the consumer-user is interested. For example, if a consumer-user is considering a purchase of two or more items, he/she can share those item pages with one or more contacts or followers via the system and ask those contacts or followers to vote for or otherwise comment on the item or brand he/she should purchase. In one embodiment, the system offers a voting mechanism that can be sent via the system from a consumer-user to one or more contacts or followers, and the voting mechanism enables the one or more contacts or followers to indicate which item or an item of a brand the consumer-user should purchase. In addition, the voting mechanism also includes a field that allows the one or more contacts or followers to comment on the item offerings.

Likewise, the system displays items/brands in a variety of formats, including but not limited to, a grid, list, slide show, and/or carousel format, and the system allows the consumer-user to page through items/brands in the display. The system can display the total number of items and/or the consumer-user can specify the number of items that can be viewed on a given page. The system can display featured and/or unreleased items in a visually distinguishable way in the displayed format from other items. In a slide show and/or carousel format, the consumer-user can view the slide show in full- or partial screen mode. Any of the display formats include a feature to navigate from the selected view to the item details page, as well as, bookmarking an item so as to create a redacted list of items to be viewed in detail at a later time. In addition, the slide show and/or carousel formats includes navigation controls that enable the consumer-user to go to the beginning and end of the slide show, go forward and reverse one item page in the slide slow, continuously play and/or pause the slide show. Any of the display formats can also provide a Quick View button over the item image when the consumer-user moves his/her cursor/mouse over the item. The Quick View can display a popup sub-display containing an abbreviated list of item details and the Quick View also enables the consumer-user to navigate from the Quick View to the full item display page.

In addition, any of the landing pages described herein can display a sampling of information about additional consumer-users of the system, including but not limited to contacts, followers, celebrities, subject matter experts, and critics. In one embodiment, a consumer-user can select the categories of additional consumer-users that the system displays on the landing page. In addition, the consumer-user can identify specific additional consumer-users he/she wants displayed on the landing page, e.g., certain specific contacts, followers, celebrities, subject matter experts, and/or critics, or a select group of contacts, followers, celebrities, and/or critics. Alternatively, the system can randomly select additional consumer-users that can be displayed on the landing page, e.g., in the absence of instructions from the consumer-user. For example, the system can randomly display information regarding contacts or followers from the consumer-user's contacts data table and the system can periodically rotate the display of information regarding contacts from the contacts data table on the landing page, e.g., changes can be implemented by the system each time the consumer-user logs into the system, daily, weekly, monthly, etc. Similarly, the system can randomly display information regarding celebrities, subject matter experts, and/or critics, e.g., celebrities, subject matter experts, and/or critics that have identified certain items and/or brands identified by the consumer-user in his/her preferences. The system can periodically rotate the display of information regarding celebrities and/or critics on the landing page, e.g., changes can be implemented by the system each time the consumer-user logs into the system, daily, weekly, monthly, etc.

The system can display a collection of featured items based on one or more system criteria. For example, the system can display a collection of items most viewed/searched by system consumer-users, ranked e.g., by a combination of criteria selected from the number of item page viewings, the number of times the item page is added to a preferred item list by system consumer-users (e.g., a favorite, wish, watch, and/or gift list), the number of times the item page is bookmarked by system consumer-users, and/or consumer-user ratings for the item. The system can also display a collection of items having the highest ratings provided by system consumer-users. Moreover, the system can display a collection of items recommended by a consumer-user based on the consumer-user's profile. Consumer-users can filter the results of these item collections, in ascending or descending order, based on one or more of the following criteria: brand, price, average review, relevance to a search criteria, release date, etc., and a consumer-user can display the collection or a filtered view of the collection in a grid, list, carousel, or slide show presentation view.

The system can also display a list of all brands available on the system. The data table can be organized alphabetically and/or by interest category/subcategory. Consumer-users can perform a keyword search of brands and items in the all brand data table and the consumer-user can filter the brand data table and/or the results of a keyword search based on the following criteria: item/brand category, time, price, average customer review, relevance, release date, etc. A consumer-user can display the all brand data table or a filtered view of the data table in a grid, list, carousel, or slide show presentation view.

The system allows the consumer-user to search the site, including the item/brand pages and all related content using keyword searches. The system can segregate the search results by the following content types: brands, items, articles, reviews, blogs, etc. For each content type, the number of search results for that type are displayed and the search results for each content type are displayed in a list format. The display of brand search results can include a picture of the brand logo, the brand name, and a description of the brand, among other information. The consumer-user can view the brand's page by clicking on the brand logo or the name of the brand. The display of item search results can include in or more of the following attributes: one or more item images, the item name, a description of the item, the price, average item rating, and the number of ratings. The consumer-user can to view the item details page for an item by clicking on either the item picture or the item name. The display of results of searching within articles can include a picture of the author, if provided, the author name, the title of the article, the date the article was written, and an introduction to the article. The consumer-user can view the entire article by clicking on the title of the article. The display of results of searching within item reviews can include a picture of the item being reviewed, the name of the item, the reviewer's name or alias, the date the review was written, and an introduction to the review. The consumer-user can view the entire review by clicking on the title of the review. The display of results of searching within blogs can include a picture or avatar of the blogger, the blogger's name or alias, the date the blog was written, the blog title, and an introduction to the blog. The consumer-user can view the entire blog by clicking on the title of the blog.

The system is configured to send consumer-users notifications regarding new items/brands and/or new information about items and/or brands and the consumer-user can receive such notifications via any of a variety of methods. In one embodiment, such notifications are modifications to item or brand data objects, including derivative data objects, and those modified data object representations are displayed in the consumer-user GUI in reverse chronological order, as described above. In addition or alternatively, the system can also notify a consumer-user by email, text messaging and/or private messaging. The system can also send a notification to a consumer-user in a social networking site, e.g., Facebook, Twitter, Friendster, MySpace, etc. An additional system consumer-user or brand can send the consumer-user a variety of notifications, including but not limited to: (a) a consumer-user of the system can send an additional consumer-user a message regarding an item, an interest category, a brand, a brand category, etc.; (b) a brand can send the consumer-user a message regarding new information related to an item, the brand, an interest category, etc. and/or a brand can send the consumer-user a message regarding a new item and/or category of items available (in a preferred embodiment, the brand can instruct the system to send a group of consumer-users that have expressed a preference for a brand or brand item, rather than giving a brand access to individual consumer-user's contact information); (c) a consumer-user can receive a friend invitation; (d) a consumer-user can receive a notification that another consumer-user and/or brand has elected to follow that consumer-user; (e) a consumer-user can receive a notification regarding a friend's or follower's impending birthday, anniversary, or the like; (f) a consumer-user can receive an invitation to join the system and/or to join a brand or item club; (g) a consumer-user can receive a notification that a brand has been added to an additional consumer-user's preferred brand data table, e.g., a friend or follower of the consumer-user; (h) a consumer-user can receive a notification that an item category has been added to a friend's or follower's preferred item data table; (i) a consumer-user can receive a notification that an item has been added to a friend's or follower's preferred item data table; (j) a consumer-user can receive a notification that an item has been added to a friend's or follower's wish, watch, and/or gift list; and/or (k) a consumer-user can receive a notification that a friend or follower has commented on, posted an item review and/or blog entry for, and/or suggested an item and/or brand. Moreover, a consumer-user can filter the notifications they receive in a variety of ways, including but not limited to: (a) received from a particular consumer-user; (b) received from a particular brand; (c) date; and (d) regarding a particular item/brand in the consumer-user's preferred item/brand data table; in ascending or descending order.

It will be understood that the components described above can be organized and depicted in a user-interface in a variety of ways, but such variations fall within the full scope of the invention. Moreover, various additional features can be included in the homepage, e.g., advertising materials, featured items, brands, additional consumer-users, additional links to the consumer-user's profile, one or more consumer data tables, additional system browsing features, etc., and such additional features are within the full scope of the invention.

Brand Profile & Interface

Brands also create an system profile that includes brand information, including but not limited to the brand's name, contact information, website and a link thereto, email, and password, as well as a list of authorized brand-users of the brand profile. The brand can designate one or more brand managers or users (referred to herein as "brand-users"), e.g., an individual or group of individuals authorized to access and/or modify the brand profile or components thereof, and the brand profile will also include contact information, e.g., a name and email, and a password for each brand-user. A brand can also include a brand identifying key or password used to identify the brand or a brand-user if one or more of verifiable credentials are not provided at login to the system.

Figure 5B:
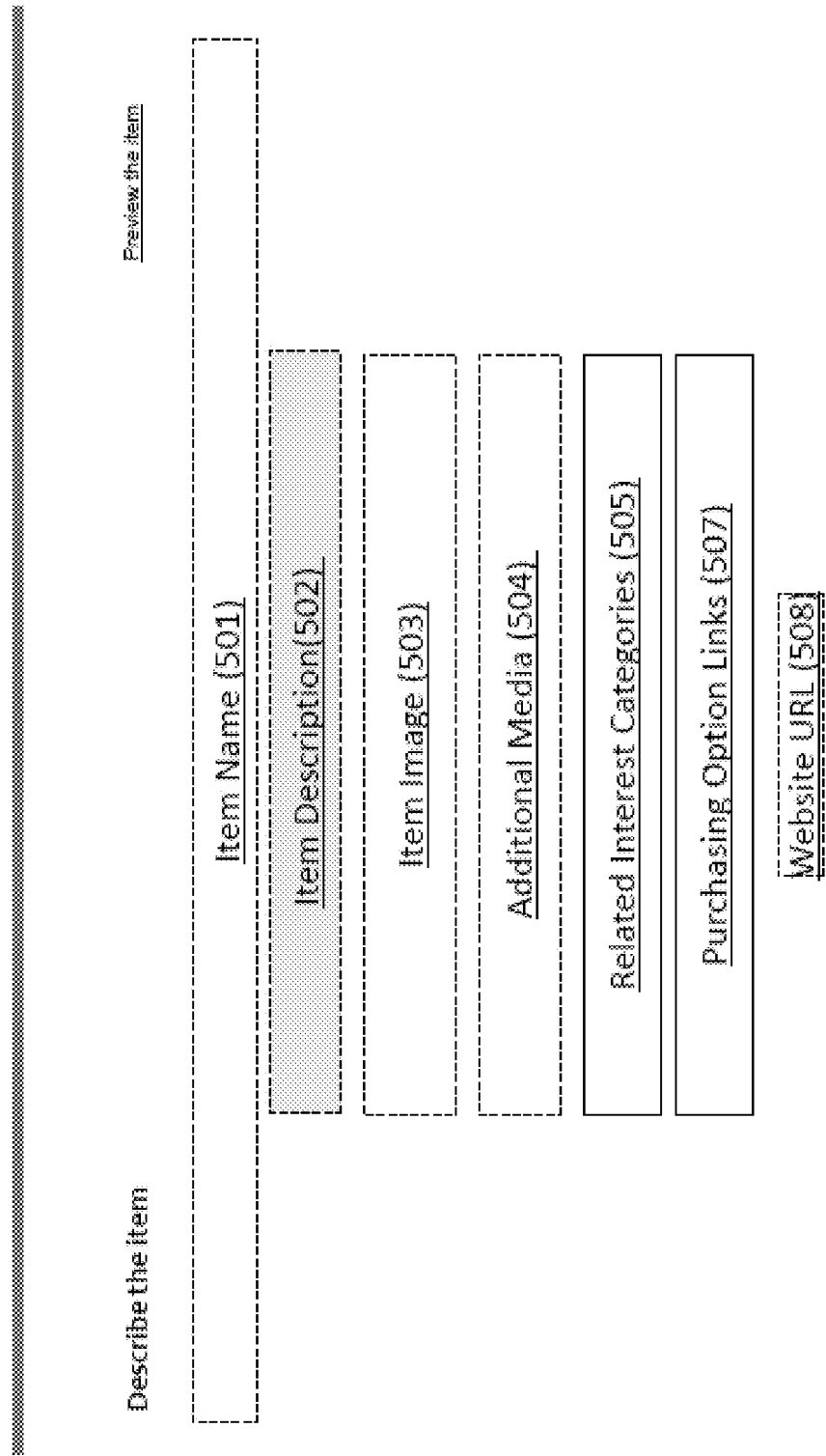

As shown in FIG. 5(a), in one embodiment, the brand establishes a profile on the system using a designated brand name, a website URL, and optionally one or more brand logos or trademarks and item lists. Much like the consumer-user's ability to create one or more lists, a brand can also organize its items in one or more lists grouped by the brand, e.g., current, discontinued, new, sale, and future item lists. Optionally, a brand can create one or more brand interest categories (not shown), including a description for each interest category, or in an alternative or additional embodiment, the brand can adopt one or more brand item categories created by the system to list the brand items on the system. For each item, a brand can create a data object that includes the common visual representation of an item or brand described above, as shown in FIG. 5(b). The data object representation includes one or more of the following: an item name (501), a description (502), an image 5603), optional additional media (504), e.g., videos, additional images, supporting documentation, etc., interest categories lists in which the item is included (505), one or more links to purchasing options (507), and a website URL for the brand (or authorized retailer or reseller) that offers the item (508). Preferably, each data object on the system regardless of origin includes an item image, item name, item price, and a commentary field (not shown; the commentary field is preferably automatically incorporated into the data object by the system once the data object is created by the brand). If selected by a consumer-user, the data object representation will display additional information regarding the item, e.g., a more detailed description of the item, additional media, purchasing options, a website URL for the brand, item ratings, etc. Item information that can be included in an item data object includes but is not limited to: an item identifier, optional SKU and/or custom identifier, a description of the item, an item image, item media (e.g., item-specific video and audio files as well as print media), retail price, shipping and handling information, sales, coupons, etc., advertising materials, item reviews and/or ratings, discussion forums, item-related news and events, instructions for use and/or assembly, associated/related items and/or accessories offered by the brand and/or an associated brand, item statistics, the identity and contact information for authorized retailers and/or resellers, authorized service providers for a given item or brand (e.g., for item assembly or after-market detailing), etc., item-specific supporting documents and information, e.g., an item insert, specifications, manual, instructions, literature references, reviews, blog links, links to discussion forums, etc., purchasing information including but not limited to price, coupons or discounts offered by the manufacturer, authorized retailer and/or wholesaler, shipping and handling information, the identity and contact information for an authorized retailer, wholesaler, and/or distributor, warrantee information, etc. In a specific embodiment, some of the information listed above for a given item may only be available to members of a brand or item club (described in more detail herein). For example, certain promotional opportunities may only be accessed by or offered to item and/or brand club members, e.g., coupons, discounts, etc.

Certain types of specialty items/brands may warrant the inclusion of additional information, including but not limited to, geographic-specific information related to authorized retailers/resellers/service providers, shipping restrictions, seasonal availability or other availability limitations or restrictions (e.g., backorder), and suggested storage and handling information. For example, for brands that offer perishable food stuffs, e.g., produce, the brand can include information related to the seasonal availability for a given item or group of items in a particular geographic location, specific authorized retailers/resellers in a given city, state, etc., as well as any shipping restrictions that may apply and safe handling information. For brands that offer items that require an owner's license or permit, the brand can also include information related to where and/or how a consumer-user can obtain the appropriate license and this information can differ from one geographic location to the next. The brand can also include a list and/or hyperlinks to a website of one or more licensing authorities. In this embodiment, the system can include a mechanism to allow a brand to verify a consumer-user's license, age, etc., e.g., when prompted for an item requiring license and/or age-restrictions, a consumer-user can provide his/her license identification number, age, etc., and the system can verify the validity of the license and/or that the consumer-user has indicated an appropriate age.

In a preferred embodiment, a data object related to a commercial item can include one or more commercial item trademarks, commercial item description information, commercial item media, commercial item purchasing information, commercial item retail information, commercial item promotional information, related first brand products, or combinations thereof; the commercial item description information can comprise an item image, one or more item-specific supporting documents and information, one or more commercial item reviews, a commercial item rating, or combinations thereof; the commercial item media may include a commercial item-specific video file, a commercial item-specific audio file, or print media; and the commercial item-specific supporting documents and information comprises one or more literature references, reviews, blog link, press release, forum link, or combinations thereof.

In addition or alternatively, as described above, a consumer-user of the system can create an item data object using, for example, the process illustrated in FIG. 5(b) and described above.

Figure 5C:
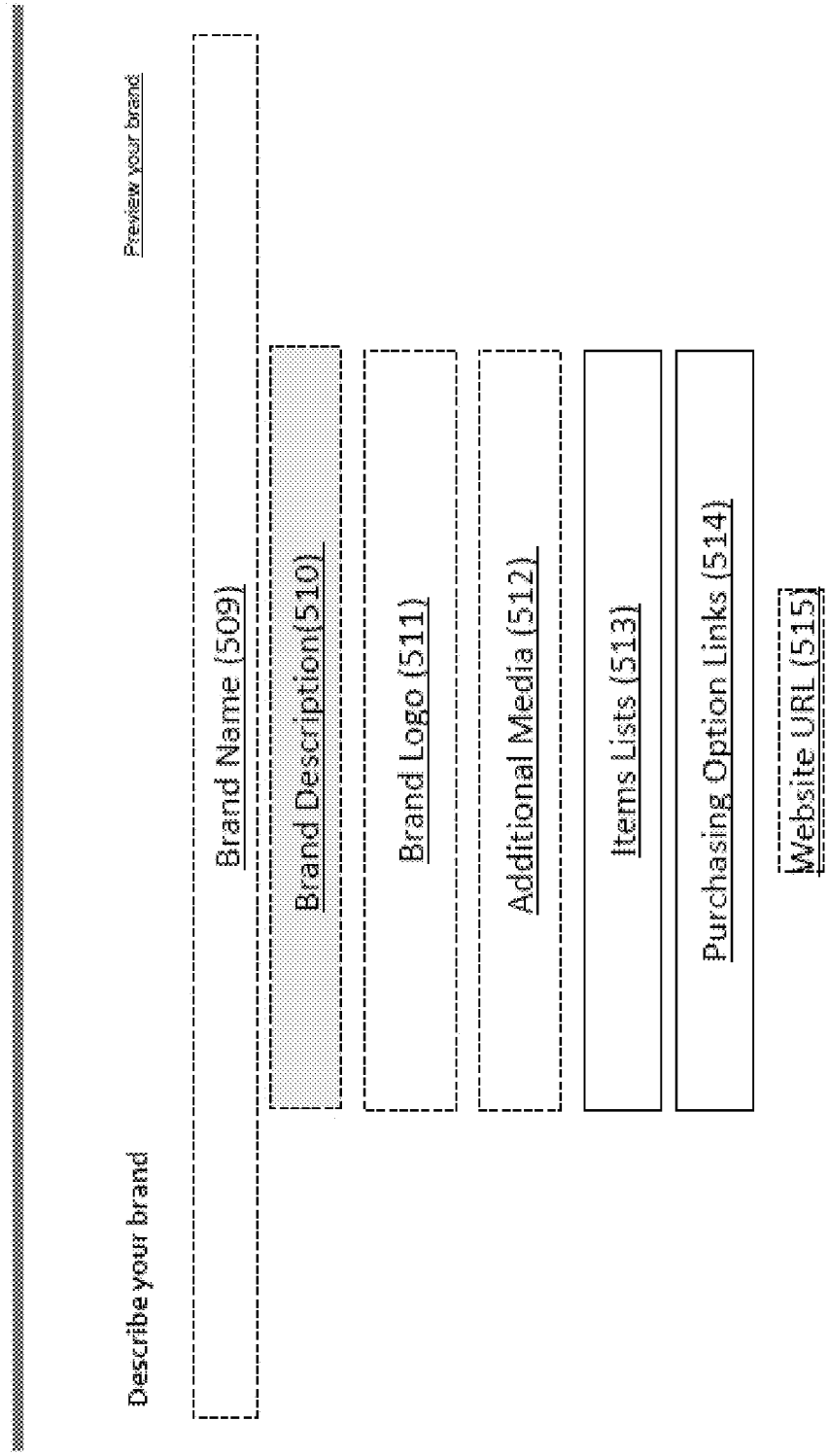

A brand can also create a brand data object as shown in FIG. 5(c), which includes a brand name (509), brand description (510), brand logo or trademark (511), additional brand media (612), item lists (513), purchasing option links (514), and a website URL (515). The brand data object can also include one or more interest categories associated with that brand (not shown). The purpose of a brand data object is distinct from that of an item data object in that the latter is designed to provide the viewer with information about a single item, whereas a brand data object is designed to give the viewer general information about the brand, e.g., the types of item or services they offer, their logos or trademarks, where their items can be purchased, etc. The brand data object can be accessed via one or more hyperlinks on the system, e.g., by selecting the brand name or brand icon under the list of brands available on the system.

Much like an item data object, each brand data object on the system regardless of origin includes an image, e.g., a brand logo or trademark, a brand name, and a commentary field (and like the item data object, the commentary field is preferably automatically incorporated into the data object by the system once the data object is created by the brand). If selected by a consumer-user, the brand data object representation will display additional information regarding the brand, e.g., a more detailed description of the brand, additional media, purchasing options, a website URL for the brand, brand ratings, etc. Information that can be included in a brand data object includes but is not limited to: a list of brand items, brand media (e.g., video and audio files as well as print media), sales, coupons, etc., advertising materials, item reviews and/or ratings, discussion forums, brand-related news and events, associated brand(s), brand statistics, the identity and contact information for the brand and/or for authorized retailers and/or resellers, authorized service providers for a given item or brand, etc., the identity and contact information for an authorized wholesaler and/or distributor, warrantee information, etc. In a specific embodiment, some of the information listed above for a given brand may only be available to members of a brand or item club (described in more detail herein). For example, certain promotional opportunities may only be accessed by or offered to item and/or brand club members, e.g., coupons, discounts, etc.

In a preferred embodiment, a brand data object can include: one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof. The brand description information can include a brand image, one or more brand-specific supporting documents and information, one or more brand reviews, a brand rating, or combinations thereof; brand media can include a brand-specific video file, a brand-specific audio file, or print media; brand-specific supporting documents and information can include one or more literature references, reviews, blog link, press release, forum link, or combinations thereof.

Alternatively or additionally, the brand has the option of creating a stand-alone brand page that is directly accessible on the system via one or more hyperlinks, e.g., by selecting the brand name or brand icon under the list of brands available on the system. The brand page optionally includes a brand banner a brand description, brand media (including but not limited video files and pictures, as well as audio files, press releases, etc.), featured item categories, featured items, item lists, and avatars of one or more individuals that like the brand, e.g., celebrity endorsements or subject-matter experts in the relevant field. The brand page can also be customized to include additional information, including but not limited to a listing of one or more brand trademarks or service marks, brand retail information, brand item distributors, a brand description, brand media, brand items, a brand portfolio, etc. A brand page can be viewed by any consumer-user of the system, with a system profile or not, or the brand page can be configured to be viewed only by those consumer-users of the system that follow the brand or a brand item.

A brand can be a corporate brand, an umbrella brand, a family brand, and combinations thereof, in which case, the brand can include one or more related brands (alternatively referred to herein as "brand associates"), e.g., an endorsed brand, a sub-brand, an individual item brand, and combinations thereof. Therefore, the brand page can include additional information regarding one or more brand associates. The brand description can include but is not limited to, an item ontology, a target market description, and combinations thereof. The brand information can further include advertising materials, brand reviews and/or ratings, discussion forums, brand-related news and events, brand statistics, the identity and contact information for authorized retailers and/or resellers, authorized service providers (e.g., for item assembly or after-market detailing), etc. The brand can include literature references, blog and/or discussion forum links, etc. The brand information can include brand media including but not limited to video files, audio files, print media and press releases. The brand page can be accessed via one or more hyperlinks on the system, e.g., by selecting the brand name or brand icon under the list of brands available on the system.

A brand may opt to highlight certain promotional offers for an item or brand by creating an item or brand data object that includes an indicator in the visual representation to reflect the fact that that item or brand is associated with a promotion, e.g., item data objects of discontinued items can be displayed in different color scheme than those of non-discounted items, etc. Likewise, the data object representations of new items recently created by the brand can include a color scheme that differentiates those data object representations from other data object representations on the system. If an item will be discounted in the future, the brand can add a comment to the data object representation and/or alter the data object content to notify consumer-users interested in that item that it will soon be discounted. Data object representations of discounted or sale items can also include icons designed to indicate the time and/or quantity remaining for that discount or sale, e.g., a clock or time appears on the data object that counts down the remaining time for that discount or sale and/or counts down the quantity of items available at that discounted price. In an alternative or additional embodiment, a brand can also create a specialized brand page focused on one or more item categories, e.g., promotional, discontinued, new, sale, and/or future items.

Optionally, the system allows the brand to promote its items in various ways. For example, the brand can elect to allow the system to feature the brand, which authorizes the system to prominently display brand advertising and/or items in a featured items section of the GUI. For example, featured items can be displayed in a consumer-user's GUI if he/she has expressed interest in the corresponding interest category, in general advertising for the system, in the profile set-up process as described above, etc., and each of these methods of featuring an item may garner the same or a different fee. In one embodiment, the brand pays an extra fee for this service. Alternatively, the brand can compete with other brands on the system to be displayed in the featured brands section of the system, e.g., by a competitive bidding process based e.g., on a bid offered by the brand in terms of a value of cost per click. One or more mechanisms for featuring a brand or item can be provided by the system and there can be an additional fee associated with each type of featuring mechanism, for a group of featuring mechanisms (e.g., for one price the brand can feature its items in a variety of ways), or for all featuring mechanisms offered by the system (e.g., for one price the brand can feature its item using all featuring mechanisms offered by the system).

The brand can also specify security settings that enable the brand to segregate certain categories, data tables, and/or data tables of information provided in the brand profile from view from consumer-users of the system. For example, while item listings can be viewable by a consumer-user of the system, brand profile, inventory, and supply information may only be available to one or more designated brand users. Likewise, a brand can also specify security settings that enable the brand to grant view only or full access of one or more brand-users to certain categories, data tables, and/or data tables of information provided in the brand profile.

Figure 6A:
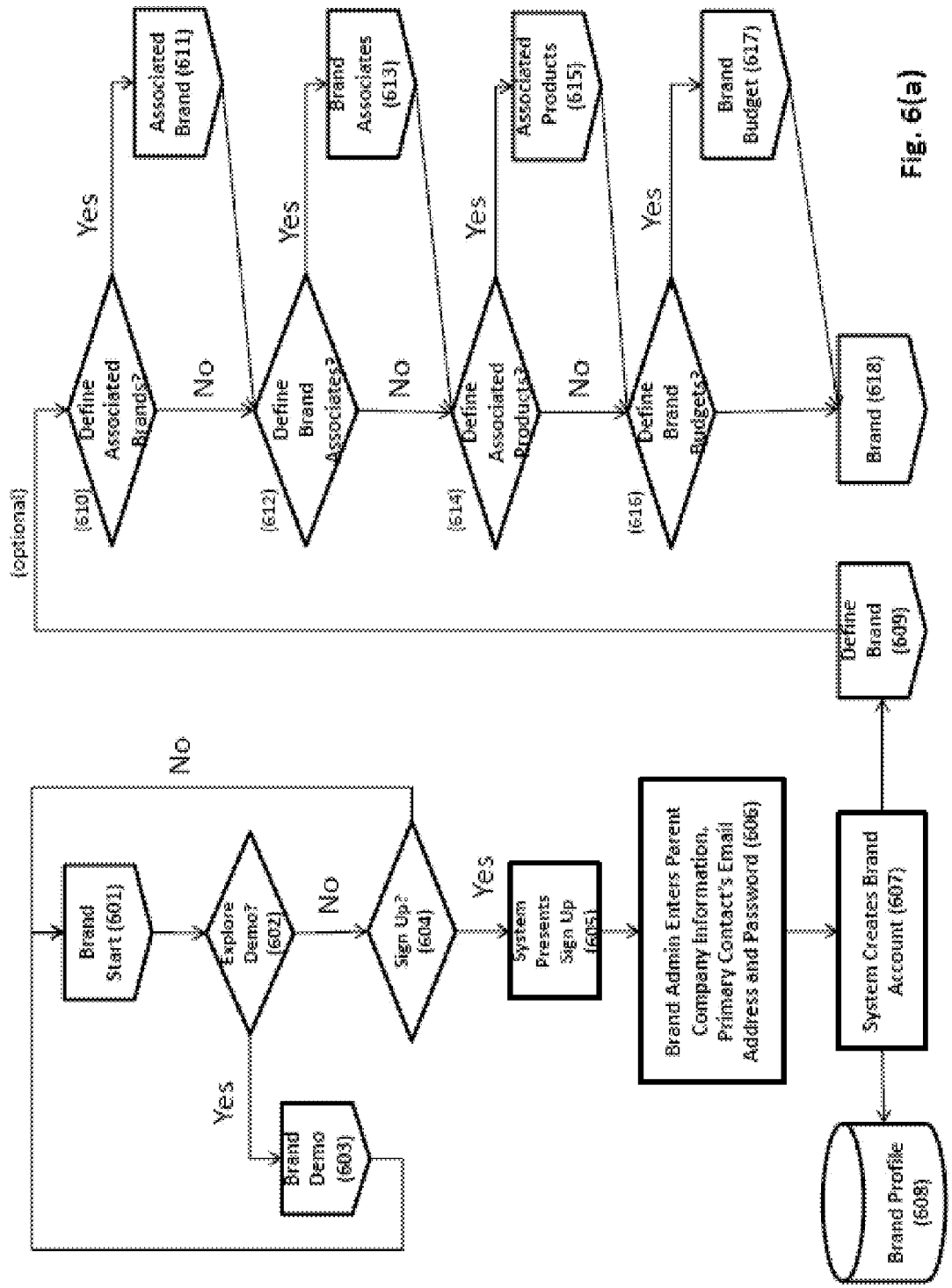
FIGS. 6(a)-(f) is a schematic illustration of the process used to create a brand profile.

The creation of a brand profile on the system is further illustrated in FIG. 6(a). A brand creates a profile (601) and optionally views a demonstration of the system (602, 603). The system presents a sign-up screen (605), which allows the brand administrator and/or an authorized brand user to enter pertinent information about the brand, e.g., parent company information, contact information, password information, etc. (606). The system creates a brand profile (607) which is stored to the collective brand data table (not shown) in an individual brand data table (608). The brand can add information to the profile regarding the brand (609), e.g., the ability to define associated or related brands (610-613), associated items (614-615), and a budget for use of the system, e.g., for advertising and marketing on the system by the brand (616-617). This information is stored to the brand profile (618) in the brand data table.

Figure 6B:
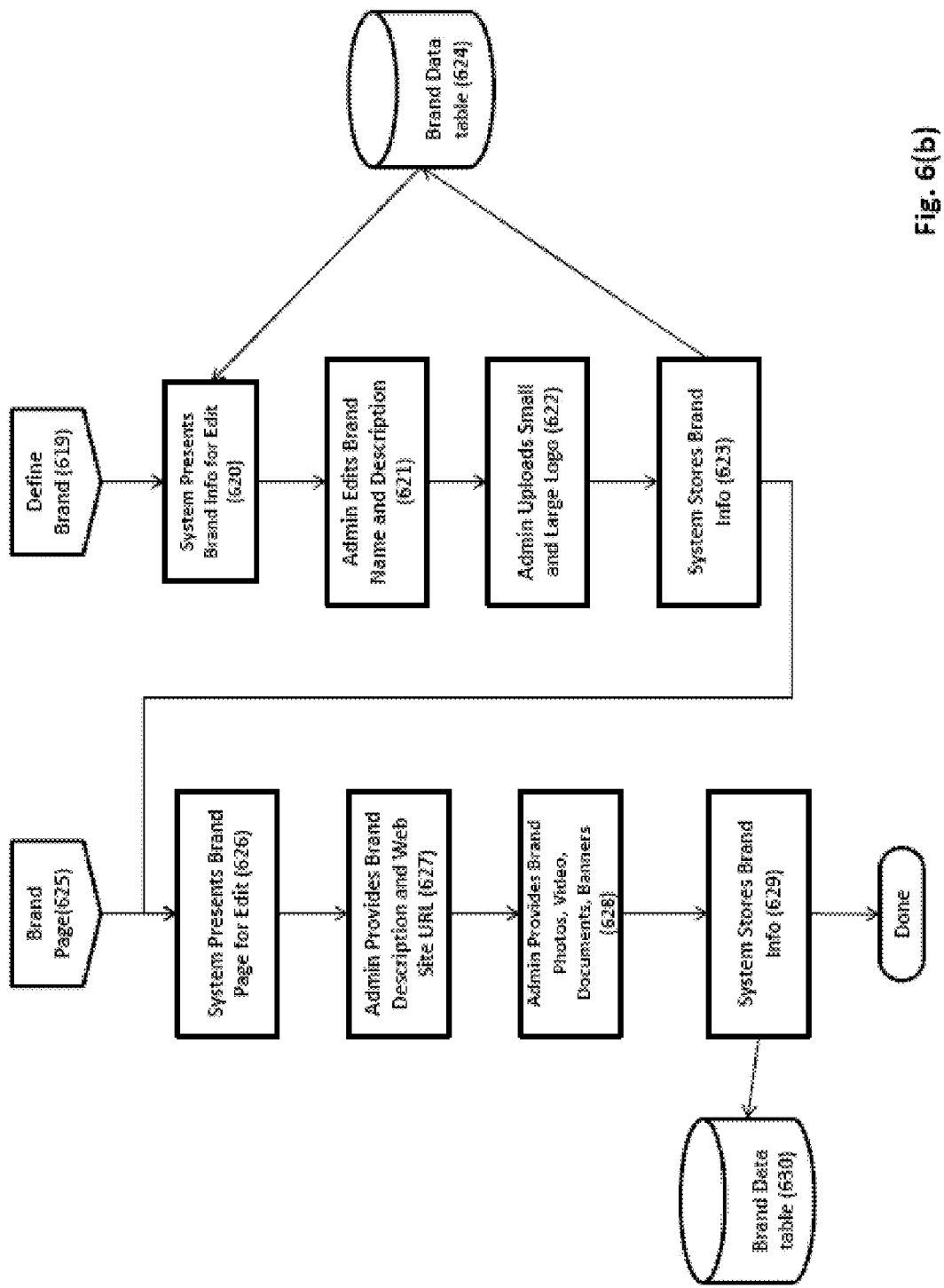
Figure 6C:
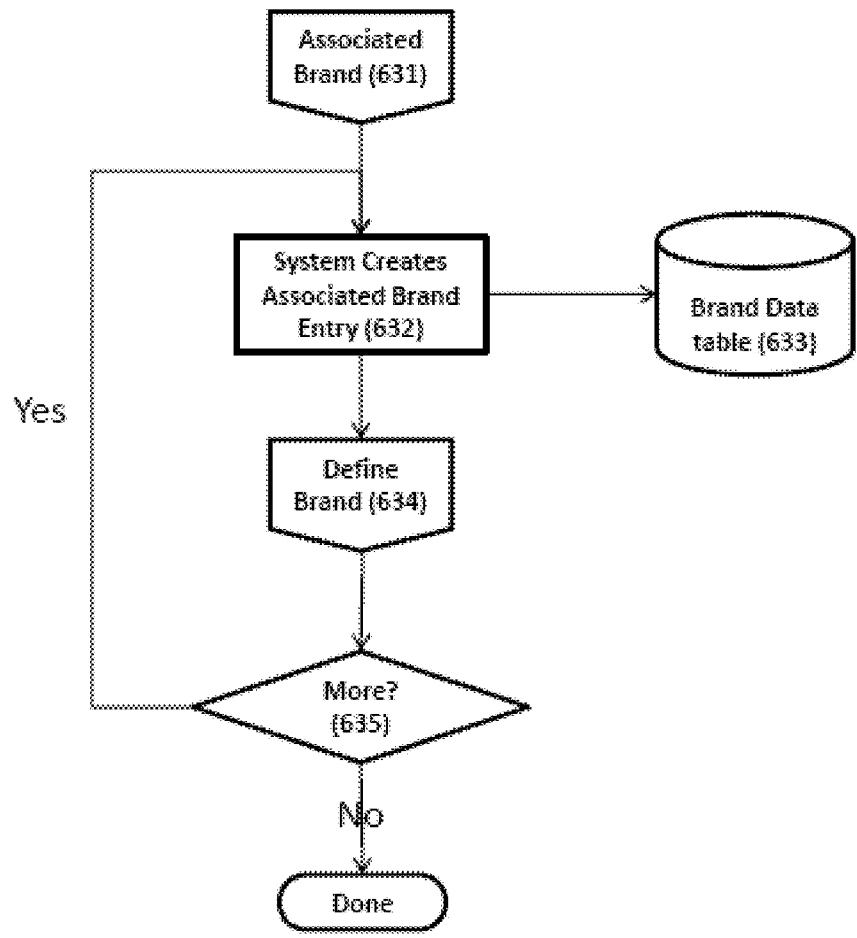
Figure 6D:
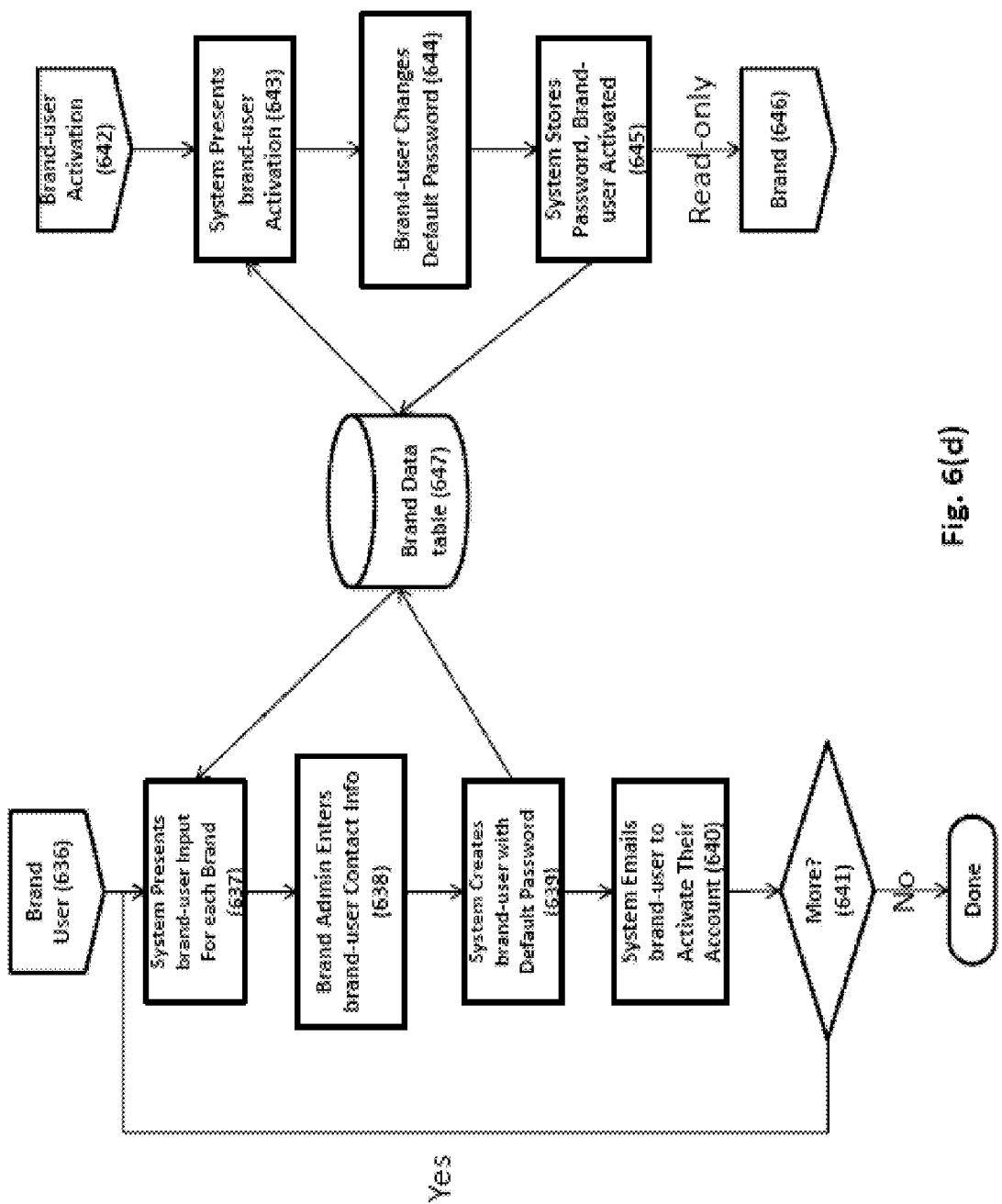

As shown in FIG. 6(b), a brand can also edit brand information in the brand profile (620-621), include logos, associated images, and brand media (622), etc., which is stored to the brand data table. The brand can optionally create a brand page (625) that can be edited to include brand-defined content, websites, and media (626-628), which is also stored to the brand data table (630). FIG. 6(c) shows that each associated brand (631) can also be defined as described above and the content of the associated brand profile can also be adjusted by the brand administrator and/or an authorized brand-user and stored to the brand data table. The brand-administrator and/or authorized brand-user also has the ability to modify access of one or more additional brand-users of a brand profile, as illustrated in FIG. 6(d). The brand administrator enters contact information for each authorized brand-user and the system creates credentials for that brand-user to enable the brand-user to activate the profile and be associated in the system as an authorized user for the brand (636-641). The identity and login information for each authorized brand-user is stored to the brand data table (647). In addition, each brand-user activates his/her profile on the system (642), by viewing an activation screen (643), and changing the default system password (644). That information is stored to the system in the brand data table (645, 647).

Figure 6E:
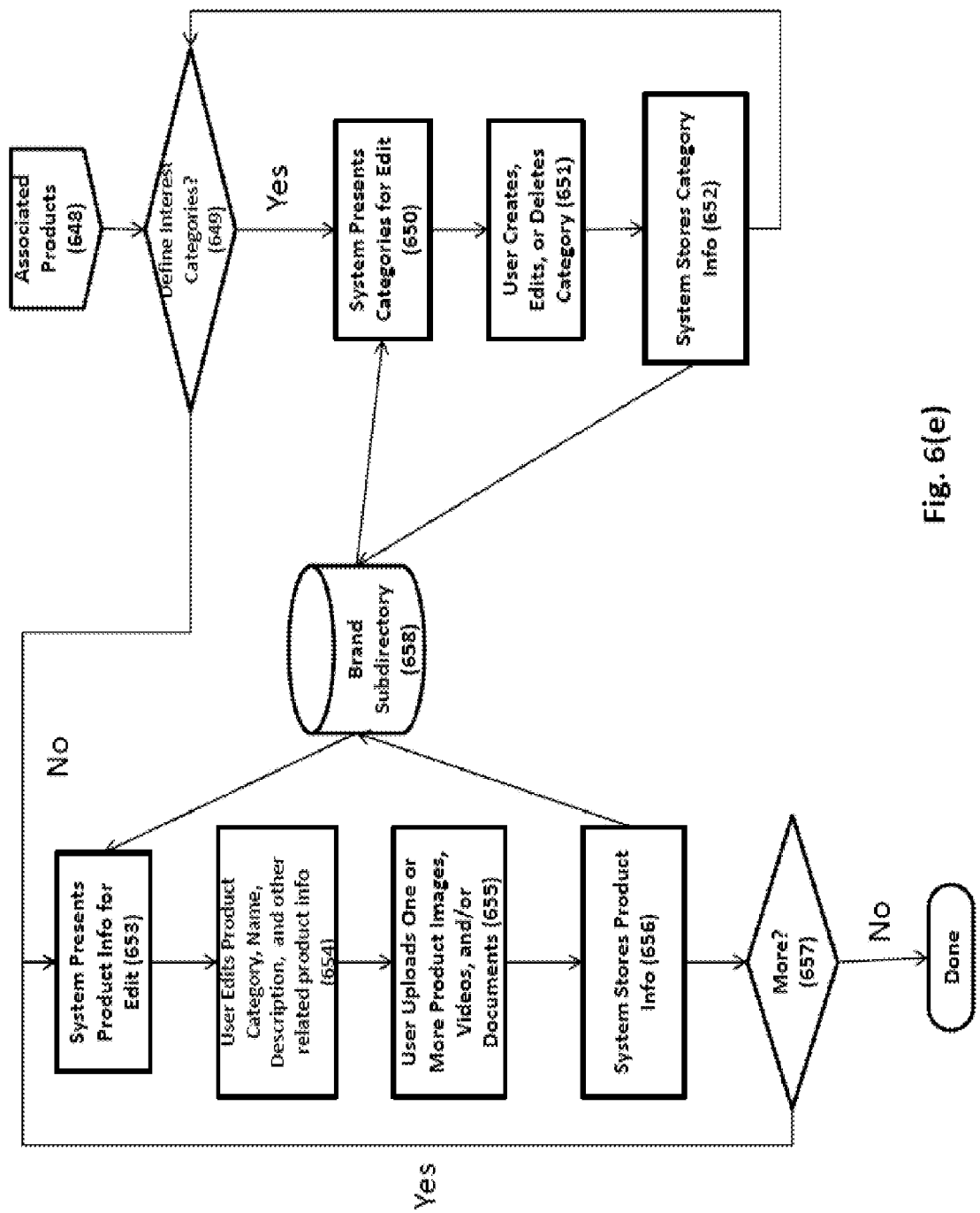
Figure 6F:
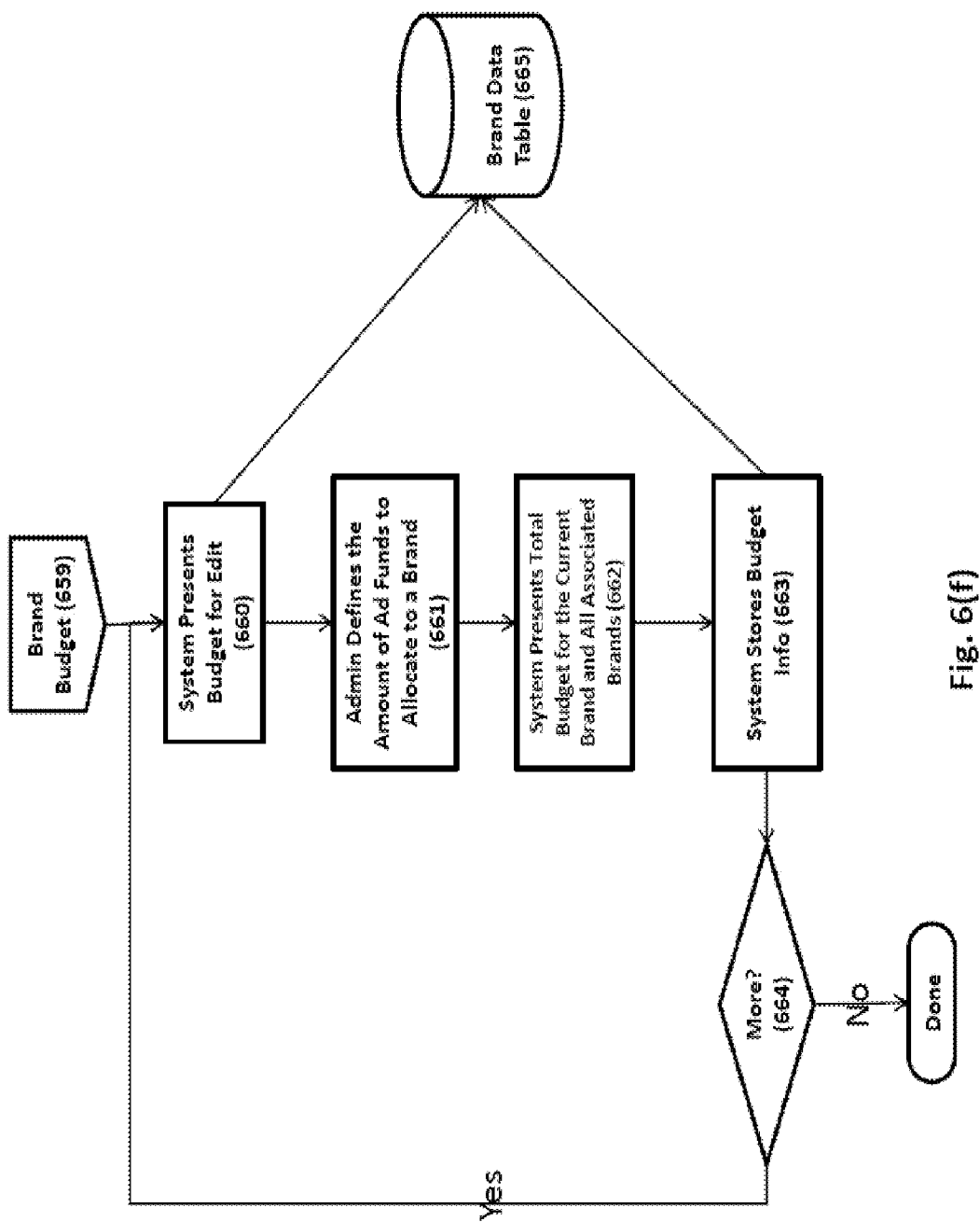

A brand (and/or consumer-user) can create an item data object as illustrated in FIG. 6(e). The system queries the brand administrator and/or authorized brand-user for item information (753) and the user (brand-user if created by a brand or consumer-user if created by a consumer-user) edits the item information (654-655), which is stored to the brand data table (658). The system allows the brand to define interest categories and subcategories (649-651), which are stored to the brand data table. Similarly, as shown in FIG. 6(f), a brand can define a budget for use of the system (659), which can be edited, further defined, and stored to the brand data table (660-665).

In one embodiment, based on the information provided for the brand profile, the system will configure a brand landing page that allows consumer-users to browse brand items, brand information, etc. The brand landing page can be automatically configured by the system or customized by the brand as described above, e.g., to display certain brand advertising, banners, trademarks, service marks, etc., in a manner designated by the brand. The brand landing page can display brand items or item categories randomly or based on item or category popularity (as defined by item page viewings, item purchases, or another item classification mechanism). The brand landing page can include a brand club link to a brand club website available only to members of the brand club. The brand landing page can also display a random sample of consumer-users that have added their brand or a brand item to their consumer-user profile, if permitted by the consumer-user. In addition, the brand landing page can display one or more of the following: the number of consumer-users who have added the brand or a brand item to their favorites, the number of consumer-users that have followed the brand, the number of consumer-users and/or other brands the brand follows, a list of its most popular items, a sample of its item categories, a hyperlink to the brand's website, a hyperlink to the brand's club(s), and one or more advertisements for the brand and/or for a brand affiliate. It will be understood that the components described above can be organized and depicted in a brand page in a variety of ways, but such variations fall within the full scope of the invention.

In one embodiment, a brand can also create a brand and/or item club that includes featured item information and/or promotional opportunities available only to brand club members, e.g., consumer-users of the system that have expressed particular interest in a brand, e.g., via the creation of a brand-specific consumer-user profile. The brand/item club can display brand/item-specific content, e.g., video, audio, print media, discussion forms, etc., available only to brand/item club members, as well as item pre-release announcements, special promotions, incentives to participate in brand/item surveys and focus groups, etc. to members of the brand club. For example, the brand club can include press releases regarding the brand and/or related items, as well as hyperlinks to discussion forums related to the brand and/or item. Still further, the brand can identify certain celebrities, critics, and/or consumer advocate groups that have identified with and/or commented on the brand and/or one or more items of the brand. For example, if a brand has a celebrity endorsement relationship, the brand can display information about that celebrity and his/her endorsement of the brand and/or an item on the brand page. Similarly, the brand can identify certain individuals or groups as critics of the brand, items, or a category or subcategory of items for which the brand is known and the brand can provide information regarding the item/brand opinions of those individuals or groups. Such information can be provided in a hyperlink to a third party website, or as an audio, video, or text file, as well as a link to a blog or other discussion forum. It will be understood that the components described above can be organized and depicted in a user-interface in a variety of ways, but such variations fall within the full scope of the invention. Moreover, various additional features can be included in the item and/or brand club page, e.g., advertising materials, featured items, additional system browsing features, etc., and such additional features are within the full scope of the invention.

A brand can interact with one or more followers on the system, e.g., by sharing items or brands with followers and those consumer-users the brand follows, by adding to and/or commenting on a data object, etc. In one specific embodiment, a brand can also use the system to solicit comments from one or more followers/following regarding one or more item or brand data objects in which the followers/following are interested. For example, a brand can add a comment to an item data object asking its followers/following to comment or give a rating of that item. The brand can also use the commentary field in the data object representation to notify consumer-users of related items it offers, e.g., if a consumer-user likes a brand item, then the brand can suggest that that item can be used with one or more accessories, e.g., offered by that brand or by a related brand. The system can also be used by a brand to compare its items with those of a competitor brand. For example, a brand can comment on or create a promotional data object regarding a competitor brand, thereby challenging that competitor brand to submit its comments in response, as well as users of those brand/competitor brand items to engage in the challenge.

In a preferred embodiment, the processor is configured to notify the consumer regarding new item information, new brand information, or combinations thereof, based on the consumer purchasing preferences, interaction data, or combinations thereof. The system can send the consumer-user a message, as described above, and/or the system can display those data object representations not previously displayed to the consumer-user in the consumer-user GUI in a more prominent position in the GUI relative to other data object representations. For example, those data object representations not previously displayed by the system to the consumer-user can be displayed in reverse chronological order, so that the newest data object representations appear at the top of the interface (this is one embodiment of how newer data object representations can be featured in the GUI relative to other data object representations and it not intended to be a limiting embodiment). The new item information includes a new item offered on the system and information related to that new item offering; new information regarding an existing item offered on the system (e.g., an item represented by a data object that may have been previously displayed to the consumer-user, but new information about that item that was not previously displayed to the consumer-user); an item offering new to the consumer based on the consumer purchasing preferences and information related to the item offering new to that consumer; and combinations thereof. The new item information can include the identity of newly released item(s), new item description information, new item media, new purchasing information, and combinations thereof. The new item description information can include new item-specific supporting documents and information, item accessories and/or related items, item recall information, discontinued item information, and combinations thereof. New purchasing information includes but is not limited to new item pricing information, new shipping and handling information, new authorized retailer information, new availability (e.g., removal from backorder), item trademarks, item description, item media, new purchasing information, retail information, or combinations thereof.

Likewise, the system can also notify consumer-users of new brand information, e.g., a new brand of items offered on the system and information related to the new brand of items; new information related to an existing brand of items offered on the system; a brand of items new to the consumer based on the consumer purchasing preferences and information related to the brand items new to the consumer, and combinations thereof. Such new brand information can include information related to one or more brand trademarks, brand description, brand media, new purchasing information, retail information, brand items, brand portfolio, related brands within the brand portfolio, related brand description, related brand items, and combinations thereof. Brand description information can include a brand image, one or more brand-specific supporting documents and information, one or more brand reviews, a brand rating, and combinations thereof. Brand media includes a brand-specific video file, a brand-specific audio file, and print media. Brand-specific supporting documents and information are selected from the group consisting of a literature references, reviews, blog link, press release, forum link, and combinations thereof.

The system can also be directed by a brand to send a consumer-user direct advertising or promotional information via the system. Such direct advertising can be informed by the interaction data generated by the system, so that the brand can direct those materials to only those consumer-users on the system that have expressed an interest in the brand or its items. In a preferred embodiment, direct advertising and/or promotional information regarding an item or brand is relayed to those consumer-users having an interest in that item or brand by advertising- or promotion-specific data object representations that are displayed by the system on the consumer-user's GUI.

Figure 7A:
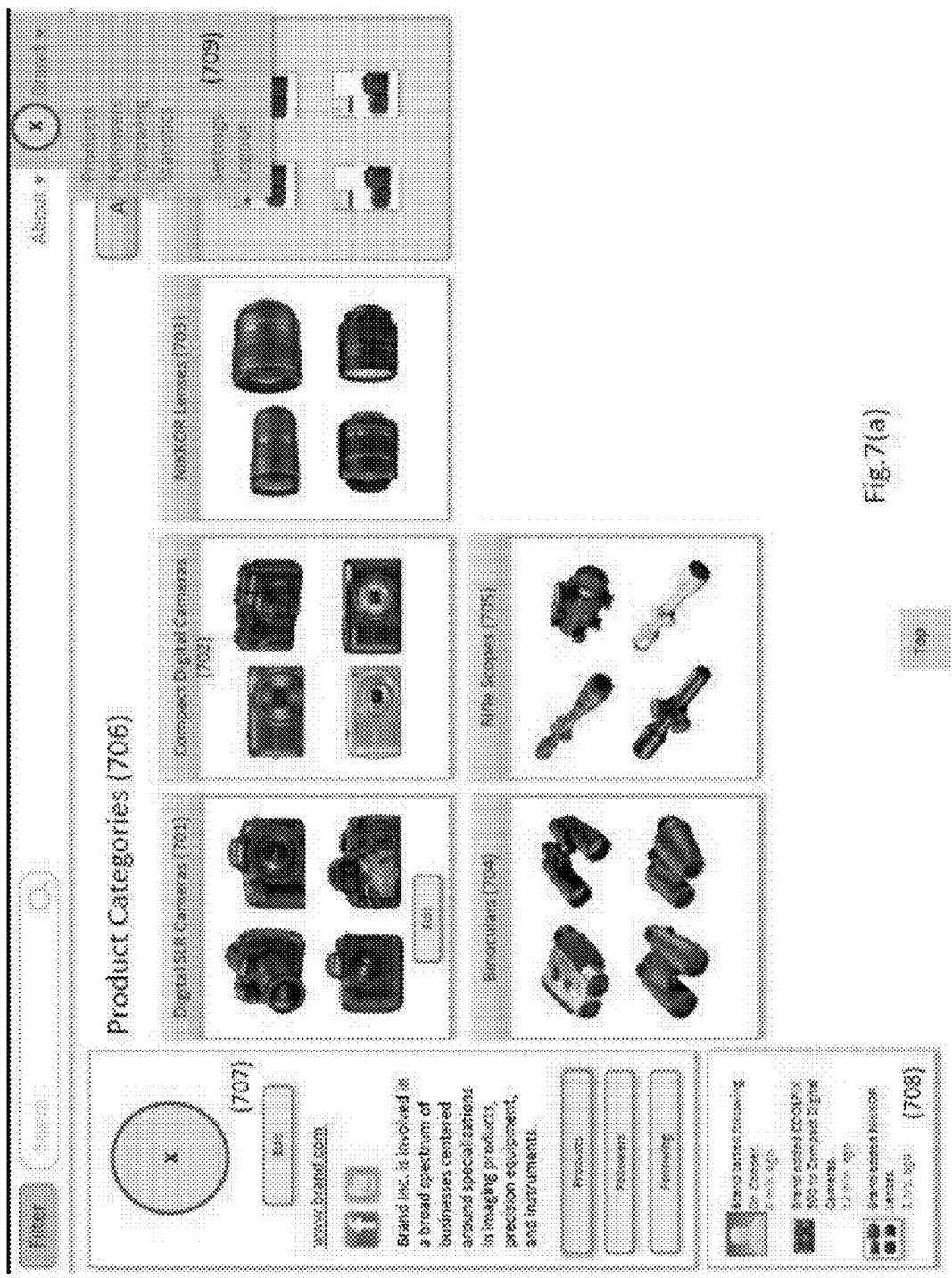
FIGS. 7(a)-(b) illustrate several embodiments of a brand's landing page on the system.
Figure 7B:
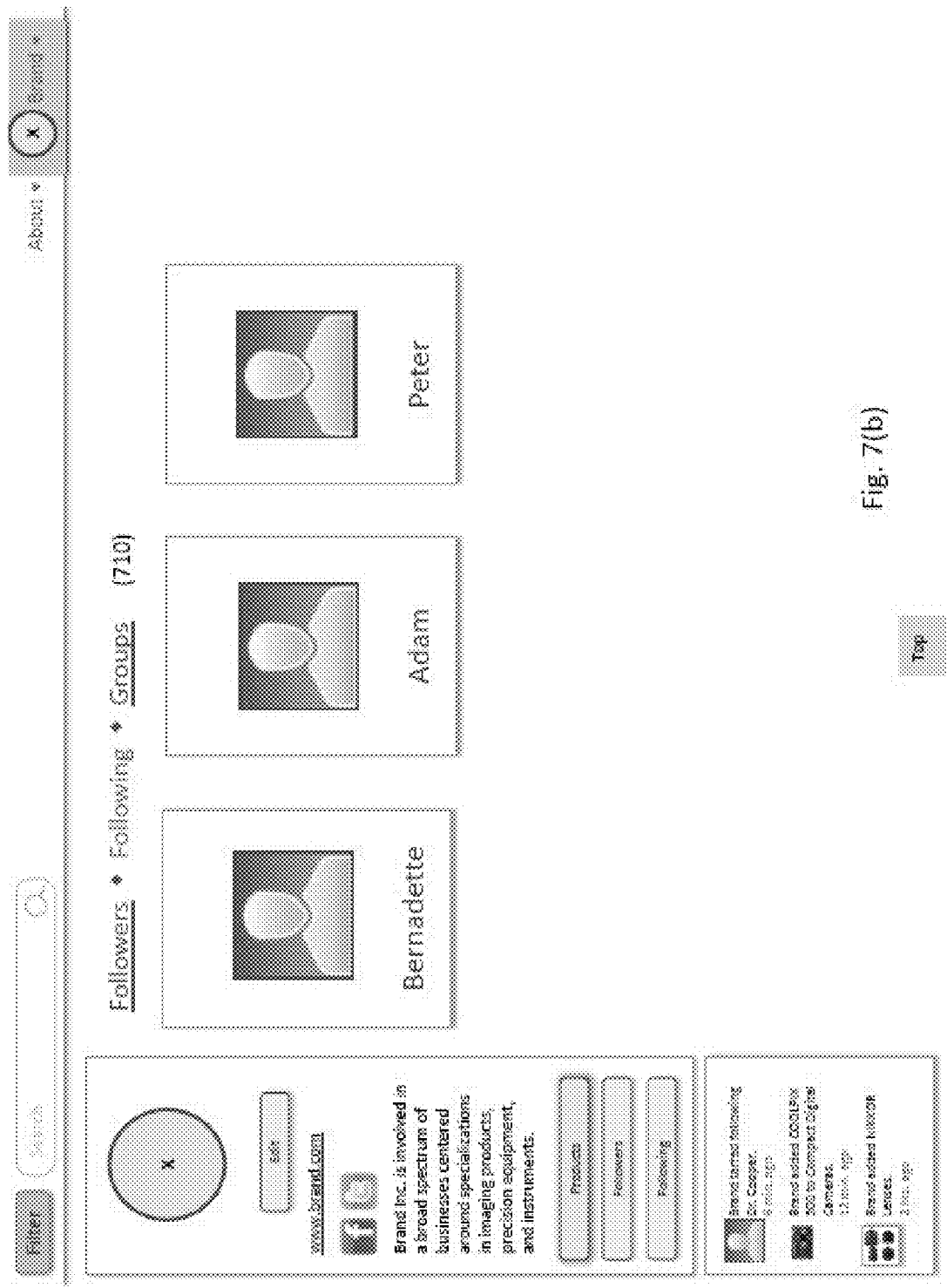

Once a brand profile has been created, a brand-user GUI is displayed by the system that is displayed only to authorized brand-users and includes details regarding the items offered on the system, followers of the brand and its items, statistics regarding how users are interfacing with the brand on the system (as described in more detail below), etc. As shown in FIG. 7(a), the brand-user GUI includes one or more data object representations (701-705) representing individual item (and/or interest) categories (706), a section of the GUI including general information about the brand and links to more details regarding brand items, followers, and individuals the brand follows (707), an activity field (708) that displays activities of the brand and/or followers or individuals the brand follows on the system. Finally, the brand-user GUI also includes a selectable menu (709) that allows the brand-user to access more information regarding brand items, followers, individuals followed by the brand ("following"), brand statistics on the system, system settings, and a link to logout of the system. In addition, much like the consumer-user GUI, as shown in FIG. 7(b), the brand-user GUI also displays more detailed information about individuals following that brand (710), as well as individuals the brand follows (not shown).

Marketing Analytics

The system offers the consumer a way to stay abreast of new items and innovations from their favorite brands, allowing consumers to form a personal relationship with the brands they are passionate about and share the experience with their contacts and other passionate shoppers that are part of the system community. As described above, the system aggregates new items submitted by numerous brands and presents them to consumers in an elegant, organized, and compelling way. Consumer-users do not have to hunt for or accidentally stumble across new items, but rather the new items are pushed to them in a timely manner. Consumer-users are kept up-to-date and informed so that they can make educated decisions about what and when to purchase. In addition to enabling the user to follow brands they like, the system also allows consumers to discover new brand and items. Based on what the consumer has viewed or otherwise expressed an interest in, the system makes recommendations for items and brands with which the consumer may not have been familiar.

In addition, the system includes a mechanism for brands to communicate with existing and potential customers. In one embodiment, the brand communicates with consumer-users on the system by modifying brand-related data object representations as described above, or by sharing information with members via push notifications and/or directly with members of a brand club or item club. Alternatively or additionally, the brand can inform the system administrator to send directed advertising materials, item or brand information, etc., via email through the system to all consumer-users that have expressed an interest in a brand or its items via one or more purchasing preferences. The ability to provide item pre-release announcements, special promotions, incentives to participate in brand/item surveys and focus groups, etc. to such a targeted group of consumers is extremely valuable to the brand.

The system provides interaction data to the brand so that a brand can optimize its marketing strategy and consumer outreach. The aggregation and analysis of data collected on the shopping and buying habits of the community of consumer-users is a valuable source of market research data. Surveys, reports, analysis, data mining and visualizations of the data collected by the system can be offered to brands to enable them to optimize their marketing strategy and consumer outreach. As described above in reference to FIG. 1(h), the system generates interaction data for each data object and stores that interaction data with the data object, as well as in a global interaction data database. The interaction data includes but are not limited to, the number and identity of: consumers of the system, consumers of one or more interest categories, and consumers of one or more interest categories; consumer demographics of: all consumer-users of the system, consumer-users of one or more interest categories, system-consumer clicks, system-consumer clicks per interest category, system-consumer impressions, system-consumer impressions per interest category, average interest category click through rate, interest category seasonal trend data, average conversion rate, and combinations thereof. Consumer demographics includes information related to system-users' gender, ethnicity, age, income, education, home ownership, location, employment status, shopping history, interests, and combinations thereof. In one embodiment, the system provides interaction data including consumer-users' shopping history, e.g., a history of items purchased via the system, items purchased via a third party shopping system, items browsed via the system, brands of items purchased via the system, items identified in the consumer purchasing preferences, brands of items purchased via a third party shopping system, brand browsing history via the system, brands identified in the consumer purchasing preferences, or combinations thereof. Shopping history interaction data can be made available to the brand if individual consumer-users provide such information and if those consumer-users allow dissemination of that information to a brand.

In a further preferred embodiment, the system generates data object-specific interaction data, e.g., for each individual data object or a data object and its derivative data objects the system collects interaction data which is accessible to the brand associated with that data object. This data object-specific interaction data includes but is not limited to, the number and identity of: consumers of the system interacting with that data object representation, consumers of one or more interest categories that interact with that data object representation, consumer demographics of all consumer-users interacting with that data object representation, data object representation clicks, data object representation impressions, data object representation click through rate, data object seasonal trend data, average conversion rate for that data object, and combinations thereof. Consumer demographics that can be collected for an individual data object includes information related to system-users' gender, ethnicity, age, income, education, home ownership, location, employment status, shopping history, interests, and combinations thereof. In one embodiment, the system provides data object-specific interaction data including consumer-users' shopping history, e.g., a history of items purchased via the system, items purchased via a third party shopping system, items browsed via the system, brands of items purchased via the system, items identified in the consumer purchasing preferences, brands of items purchased via a third party shopping system, brand browsing history via the system, brands identified in the consumer purchasing preferences, or combinations thereof. Shopping history interaction data can be made available to the brand if individual consumer-users provide such information and if those consumer-users allow dissemination of that information to a brand.

In one embodiment, the processor includes an analysis program configured to generate a comparative analysis for each brand on the system based on interaction data over a defined time interval. The comparative analysis includes a comparison of one or more interaction data parameters described above for one brand vs. one or more additional brands on the system. The comparison can be for all brands on the system, and/or for all brands within the interest category or subcategory. For example, if a brand sells shoes, the system can generate an analysis of interaction data for the brand itself, but the system can also provide a comparison of the brand and other brands on the system that sell shoes. In this regard, the interaction data provided by the system for the brand can include the number of consumers on the system with an interest in shopping for shoes, the demographics of those consumers interested in shoes, system-consumer clicks within the shoe interest category, system-consumer impressions within the shoe category, average click through rate for consumers browsing for shoes on the system, seasonal trend data for the shoe interest category, average conversion rate within the shoe interest category, etc. If a sampling of consumer-users have provided shopping history information, the interaction data can include a history of shoe purchases via the system for those consumer-users, shoe purchases via a third party shopping system(s), shoes browsed via the system, shoe brands purchased via the system, shoes identified in the consumers' purchasing preferences, shoe brands purchased via a third party shopping system, shoe brand browsing history via the system, shoe brands identified in the consumers' purchasing preferences, and combinations thereof. In a further embodiment, the analysis program can generate a comparative analysis of a brand versus one or more brands selling items in the same interest category and optionally within the same price point range. In this regard, the brand can better understand how it compares to a brand with the same customer base. The analysis program can generate a comparative analysis over a defined time interval, e.g., for the entire time the brand or a brand comparator (a brand in the same interest category as another brand) has participated in the system (e.g., from the date a brand profile was created to the present), over a given range of time the brand or a brand comparator has participated in the system, a defined number of years, months, or days prior to a consumer login date on the system, e.g., from 1-5 years prior to a consumer login on the system, 1-6 months prior to a consumer login on the system, etc.

The analysis program can also provide an analysis based on brand interaction data, including but not limited to brand item data object representation-consumer clicks, brand item data object representation-consumer impressions, brand item data object representation click through rate(s), brand item data object conversion rate, brand interest category-consumer clicks, brand interest category-consumer impressions, brand interest category click through rate(s), brand interest category conversion rate, and combinations thereof. In one embodiment, the brand interaction data are for (i) consumers that have identified a brand in the consumer purchasing preferences; (ii) consumers that have identified a brand interest category in the consumer purchasing preferences; (iii) consumers that have identified a brand item in the consumer purchasing preferences; (iv) consumers that have identified a brand interest category in the consumer purchasing preferences; (v) consumers that have followed a brand; (vi) consumers that have followed a brand item; (vii) consumers that have liked a brand; (viii) consumers that have liked a brand item; (ix) consumers that have commented on and/or rated a brand; (x) consumers that have comments on and/or rated a brand item; (xi) consumers that have added a brand item to one or more lists; and (xii) combinations thereof.

The processor can also provide a brand ranking data in relation to an additional brand in the same brand and/or interest category and/or the collective brand and/or interest category. Therefore, the processor can generate a ranked ordered list of brands in a given brand and/or interest category, based on e.g., the number of: brand items sold on the system, consumers that have identified that brand in their consumer purchasing preferences, etc. For example, the processor can generate a ranked order list of shoe brands on the system in descending/ascending order of the number of shoes sold on the system and/or the total shoe sales on the system. Such ranking data can be generated for a brand without reference to a time interval or in relation to a specified time interval, e.g., since the brand registered on the system, and/or from a defined date to the present.

The processor can generate interaction data for a given location relative to others. For example, if consumer-users have provided their geographic location, the system can generate a map of a country, county, city, etc., that reflects where consumer-users reside that have expressed an interest in that item and/or brand. The brand can select the geographic location it wants to receive interaction data about or the system can create a map that reflects the location of all consumer-users interested in the brand. The map can also reflect the relative interest of consumer-users in that brand from one geographic locations or territory to another. For example, the map may highlight a city in red that includes a large number of consumer-users of the system interested in the brand, whereas a city in blue indicates a relatively low number of interested consumer-users. The map can further reflect the relative number of interested consumer-users in relation to the overall population of that geographic location. A brand can use this information, e.g., to identify those geographic locations that may be well served by a physical brand store front because of high demand in a relatively dense population.

Aggregation & Presentation of Selected System Content

In an additional embodiment, the system allows a consumer-user, a brand, and/or a group of consumer-users to select and aggregate content available on the system, e.g., videos, slide shows, audio, graphics, print media, etc., and combinations thereof, into a data table on the system and organize, annotate, and present that content in any suitable presentation format or medium and make that presentation available to additional consumer-users of the system. The content can be generally available to all system consumer-users or content or a selection thereof can be made available to a subset of consumer-users, e.g., members of an item or brand club. An individual can optionally annotate the presentation, e.g., adding written, audio, and/or video commentary to all or a portion of the presentation, save that presentation to a selected data table on the system, and share that presentation with the community of consumer-users of the system or a selection thereof.

For example, if a brand wants to promote items in a particular interest category, it can aggregate item media available on the system for items within that interest category, e.g., print media (e.g., written materials and print advertising), video media (e.g., video advertising (commercials), item demonstrations, video reviews, etc.), audio media (e.g., audio advertising, audio discussion forums, or podcasts), etc., in any suitable presentation format, e.g., in a streaming video that can be viewed on a television and/or on a computer, with or without supplementary written, visual, or auditory commentary, and make that presentation available to consumer-users of the system or a selection thereof. The brand can create a collection of such presentation materials, e.g., for items within a selected interest category, across item categories, or for all items, and the brand can save the collected presentations in one or more data tables on the system. Each presentation is optionally identified by a name and description, and the presentations can be modified, e.g., new items or content can be added, updated, and/or deleted from the data table, by the creator or a representative thereof. In addition, a consumer-user can aggregate item and/or brand media available on the system, e.g., items and/or brands in which the consumer-user has expressed an interest, e.g., print media, video media, audio media, etc., in any suitable presentation format, with or without written, visual, or auditory commentary, and make that presentation available to additional consumer-users of the system or a selection thereof. Likewise, a group of consumer-users or a consumer-advocate group or representative thereof can also aggregate item and/or brand media available on the system, e.g., items and/or brands that have been reviewed by that group, e.g., print media, video media, audio media, etc., in any suitable presentation format, with or without written, visual, or auditory commentary, and make that presentation available to additional consumer-users of the system or a selection thereof.

Figure 10:
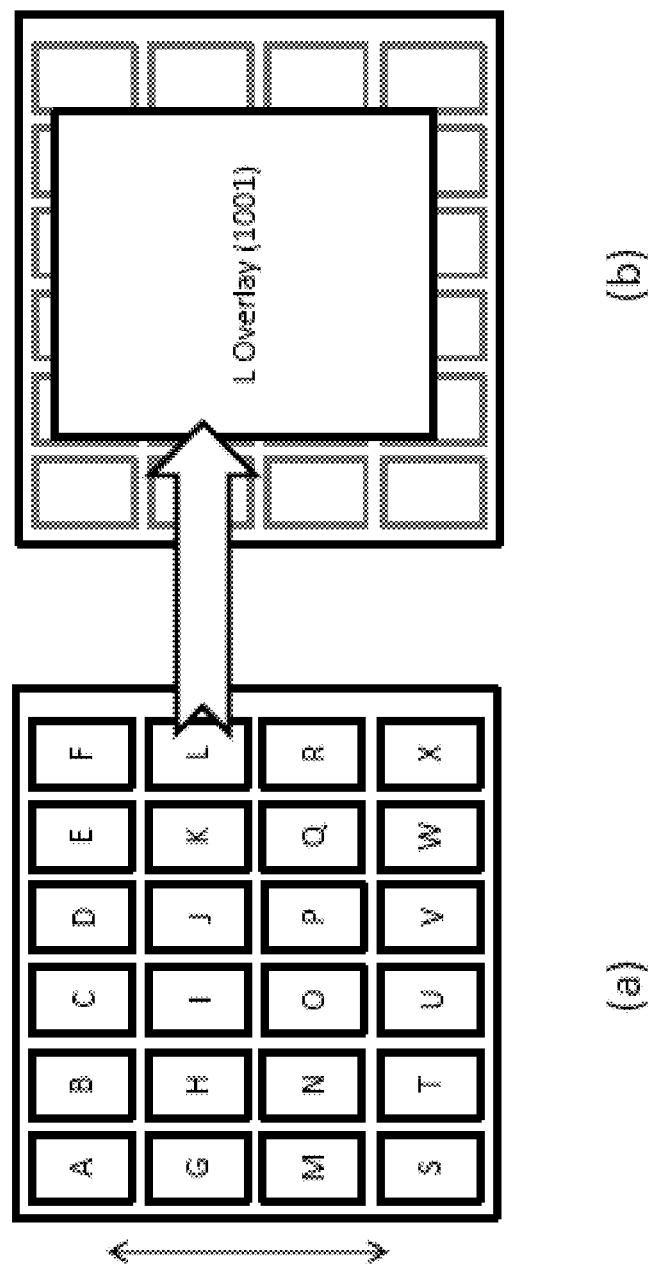
FIGS. 10(a)-(b) illustrate the display of a set of data object representations on a computer screen.
Figure 12A:
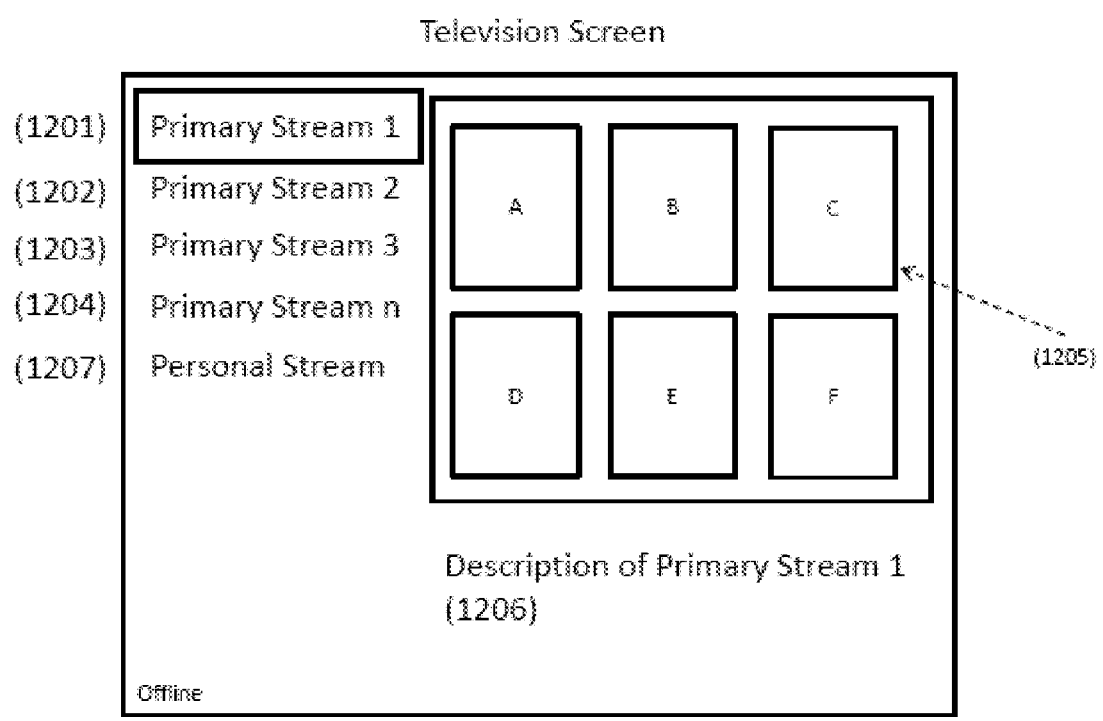
Figure 12B:
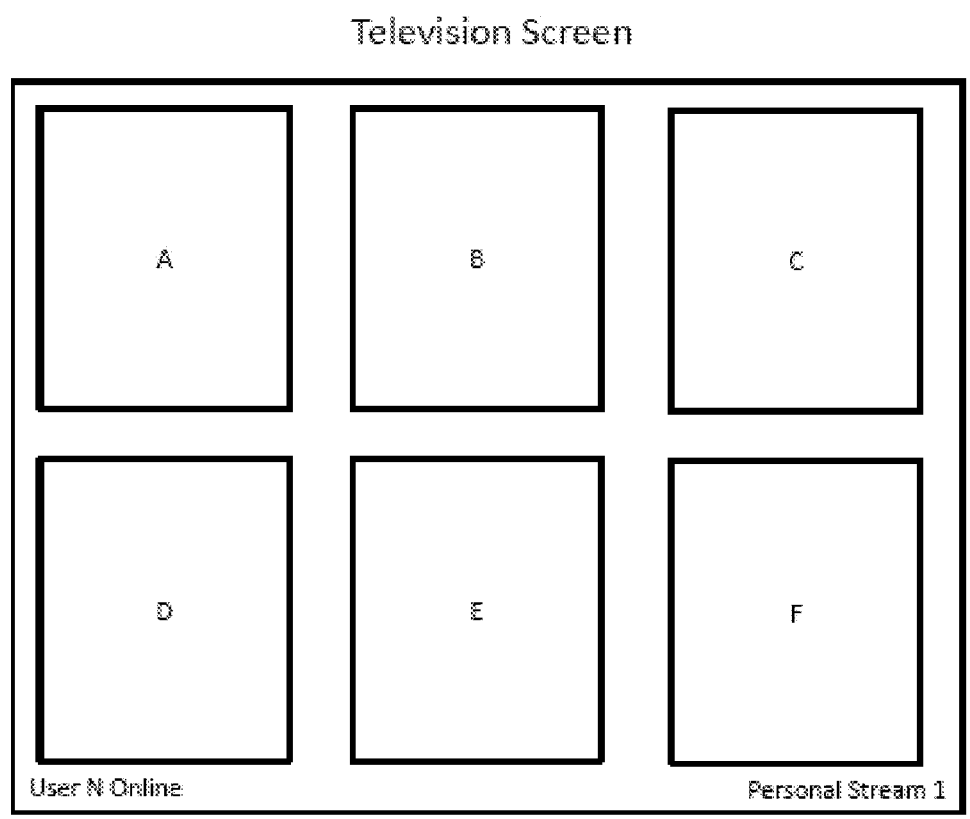
Figure 12C:
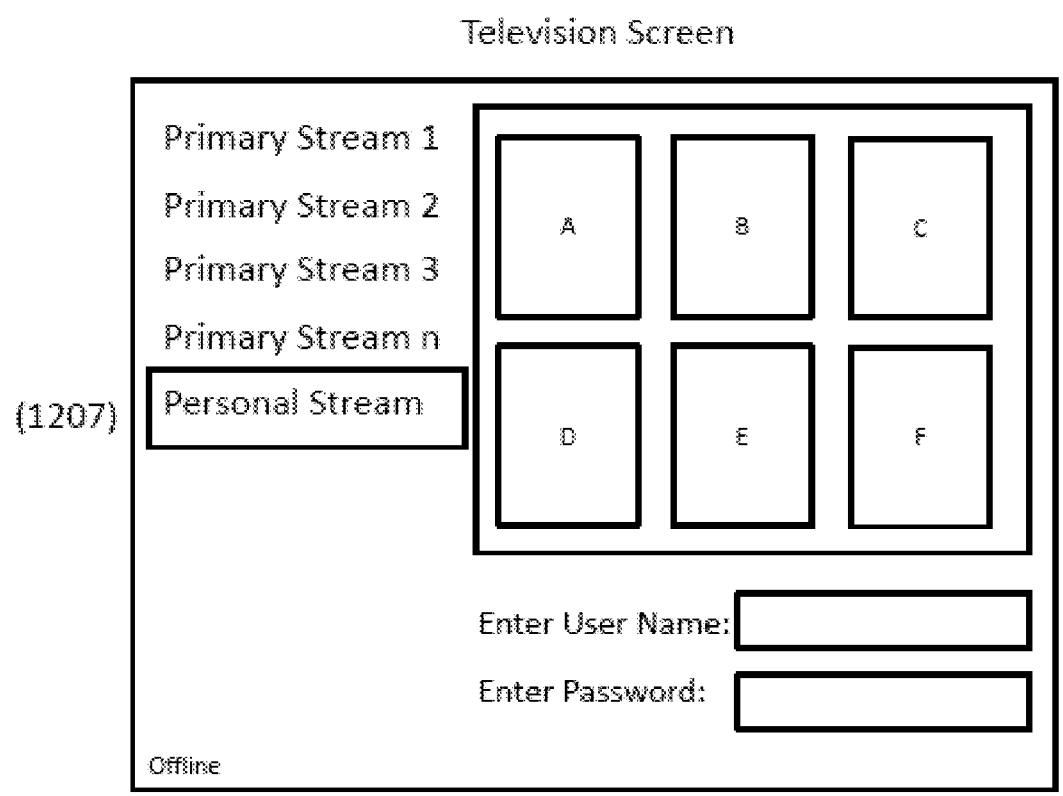
Figure 12D:
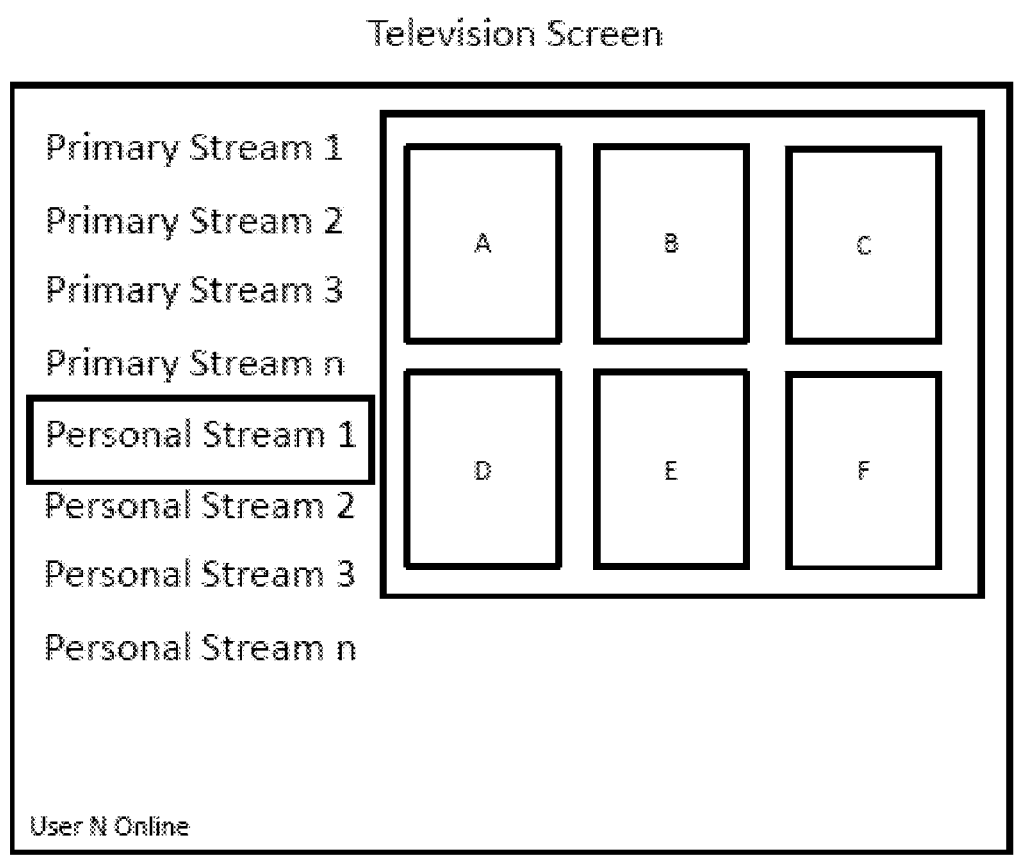

Presentation of data object representations in a desktop and/or mobile computing interface preferentially can be a reverse chronological stream of most recently updated and/or created data object representations. As illustrated in FIG. 10(a), the stream of data object representations, elements A-X in FIG. 10(a), can be presented in a continuous flow, from left to right and down in the GUI. In a specific embodiment, the GUI displays an infinite scroll of data object representations if system activity on those data object representations is continuous. Alternatively, the GUI can display a certain pre-defined number of data object representations per screen of the GUI, depending on GUI size and resolution. The user can scroll down the screen of the browser, if web-based, or application interface, if the application is native to a computing device. In this way the system can batch up the viewable data object representations in sets because the number of data object representations approaches infinity and therefore cannot be displayed on the computing device as one complete set. As the user scrolls down, the interface fetches the next set of data object representations to display. Additionally, as described herein, the user interacts with a specific data object representation by selecting it to open a detailed view of the selected data object. This view can be an overlay view (1001) as illustrated in FIG. 10(*b*) or it can be a full screen view (not shown).

To present this same set of data object representations on a television, the dataset can be organized into a video stream where each frame is a certain defined set of data object representations viewable in one television screen. This is illustrated in FIGS. (11)(a)-(c), wherein the available set of data object representations are organized, in this case, as six data object representations per frame (e.g., Frame 1 (1101), Frame 2 (1102), Frame 3 (1103), and Frame 4 (1104)), with a potentially infinite set of frames each containing some number of data object representations. It is beneficial that each data object representation viewable in a frame is completely viewable on the television screen to provide an optimal experience for the viewer. The system can provide one or more different streams of data object representations based on system preferences and/or user preferences. Each of these streams can be broadcast to one or more specific frequencies or channels for television viewing as allocated to the system by a governing entity. The system can continuously broadcast the various streams of data object representations as the system is used. The transition from one frame to the next can have a system-provided, pre-programmed delay to provide the user an optimum time to sufficiently view each frame, for example, 3 seconds per frame meaning, each frame is viewed for 3 seconds before transitioning to the next frame. This is merely an example of a representative delay timeframe. The "3 second delay" can also be realized by repeating each frame a prescribed number of times consecutively in the stream to emulate a normal video viewing experience.

In viewing a particular stream of data object representations, the television decoder, referred to as decoder, can dictate how the user can interact with the stream of data object representations. Various decoders support decoding received television broadcast transmissions, namely, Digital Video Broadcasting (DVB) via satellite (DVB-S, DVB-S2, DVB-SH), cable (DVB-C, DVB-C2) and other internationally-recognized mechanisms for transmission, into a form which can be viewed on a television. The stream can also be transmitted over UHF or VHF on a provided frequency (e.g., channel) received over a standard antenna without a decoder meaning the viewer cannot interact with the stream. They can only view content as it streams on their television screen.

If viewing a particular stream on a decoder, for example, Cable Digital Video Recorder (DVR), TiVO, Roku, DirectTV, GoogleTV, Apple TV, gaming systems, including but not limited to, XBOX360, XBOX1, PS3, PS4, and/or WiiU, and others, the system can generate a more interactive experience on the stream of data object representations for the user. These interactive experiences can be realized on a decoder using a development environment, for example, DVB Multimedia Home Platform which provides a platform for developing commercial video applications on decoders. Since the autonomous unit in the stream is the frame of data object representations, using a "select" function of the decoder and/or its remote control can identify the currently viewed frame for detailed viewing. The stream of data object representations can pause for the user when viewing the data object details of a particular frame. The decoder can be enabled to request from the system the data object representations contained in the selected frame. The system can return the full set of data for each data object representation in the frame or a smaller set of one or more data object representations if the data is too large to send in one message to the decoder. In this way, the decoder can request the details of one or more data object representations to present to the user. As illustrated in FIGS. 11(*b*) and (*c*), the first data object, data object representation A (1105), can be displayed in full detail (1106) much like the computer orientation view (as shown in FIGS. 10(*a*)-(*b*)). Additionally, the user can scroll through the provided set of data object representations using a "left" and "right" control (1107) on the decoder and/or its remote control. An "up" and "down" control (not shown) can be used also to provide the same function. The single-data-object representation-viewing modality is illustrated in FIG. 11 but all of the data object representations can be displayed in summary view much like the frame or as a list, and the user can use the up/down/left/right and select controls to navigate to the desired data object representation for viewing. The user can press the "exit" control on the decoder and/or its remote control to return to the stream which resumes streaming.

As described above, there can be one or more streams of data object representations. Each stream can be allocated to its own broadcast frequency or the various streams can be provided using an "on demand" modality as illustrated in FIG. 12. The viewer can select a prescribed channel on the decoder which can provide a list of available streams to view (referred to in FIG. 12 as Primary Streams 1-3 and n, (1201-1204, respectively), a summary view of a set of representative data object representations (1205), and a description of the stream (1206). The available streams can be those provided by default by the system. The viewer can choose a stream using the up/down and select control on the decoder and/or its remote control. Once a stream is chosen the user starts viewing as illustrated in FIG. 12(*b*) with the same interaction as described for FIG. 11.

There can also be a "personal" stream (1207) available for the viewer which on selection requires the user to log into the system as illustrated in FIG. 12(*c*), establishing a user-specific session. The system can provide the information of who is logged in through the decoder, as illustrated in lower left corner as an example, where, no one is logged in or ultimately someone is logged in. The decoder can also provide the user session control and display itself. Once logged in, the user can view the additional set of data object representation streams available just for that user as illustrated in FIG. 12(*d*). The user can then interact with the list as described for FIG. 12(*a*).

The mechanism of the viewer logging into the system from their television decoder can be made more efficient by the decoder providing to the user a decoder-specific "key," i.e., an alphanumeric string, for example, and optionally including one or more special characters. The decoder uses one or more art-recognized methods (algorithms) to decode signals (and likewise encode), and suitable methods include but are not limited to QAM for cable, ATSC for over the air transmissions, IP for Internet content, and the like. The key can then be entered into the system by the viewer via the web, mobile or other computer-oriented interface which can associate the user's television decoder with the user's login on the system. In this way, the user can be automatically logged into the system once they turn on the television as the decoder can automatically authenticate itself with the system. The mechanism of getting the decoder's key can be either presented to the user on the television screen for them to manually enter into the system or this can be performed automatically between the decoder and the system without user intervention. The key can also be copied off the decoder to an external storage medium, for example, USB stick, which is then uploaded into the system via a service provided by the system. The key can also be passed to the system by the decoder after a user manually logs into the system from the decoder. Typically it is best practice to inform the user of this kind of interaction between the decoder and system, giving them the option to opt-out of storing the decoder's key on the system. In addition, the system can support the viewer having one or more television decoders in the case of the viewer having multiple decoders.

Monetization

The system can be monetized by any suitable method. In one embodiment, consumer-users can pay for membership on the system or general access membership can be free, but access to certain services or portions of the system can garner a fee. For example, while general access membership can be free of charge, consumer-users can pay a fee to become a member of a brand or item club.

In a preferred embodiment, consumer-users are granted full access to the system free of charge, while brands pay to access and promote their items on the system as described above. In one embodiment, brands will pay a fee to advertise on the system and/or to include a hyperlink of a brand website to view a brand item on the system. In addition, a brand can pay a registration fee, e.g., a one-time flat fee for general access to the site, or a periodic subscription charge, e.g., a flat fee for general access to the site payable e.g., on a monthly, bimonthly, annual, semi-annual, etc. basis. In one embodiment, general access for a brand to the system is free, while the creation and display of a brand page on the system can be offered for a one time flat fee, a periodic flat fee, a flat fee per impression (known in the art as a cost per impression or CPM), flat fee per click (known as the cost per click or CPC) for a click-through to a brand website. Alternatively, the addition of an item listing on the system can be offered for a one time flat fee, a periodic flat fee, a flat fee per impression of the item listing on the system, or a fee based on a percentage of the sales of the item. In one embodiment, the brand can list a defined number of items on the system for free and for an additional fee the brand can list a number of items above that basic number.

Still further, the inclusion of certain features in the brand page can garner an additional fee. In one embodiment, the brand can include a defined number of images, video, and other media in the brand page, but for an additional fee the brand can include additional documents (e.g., item insert, manual, etc.) images, video, and other media. The additional fee can be based on a flat rate per additional image, video, or media, or on the number of impressions that yield a click through to view that image, video, or media. In addition, the inclusion of a website link to the brand or to a retailer or distributor of that brand can be offered for an additional flat fee, a cost per click through to that website, or a charge based on a percentage of item sales. The brand can also include a call button on the brand page, e.g., a link to a brand phone number (e.g., brand customer service, sales representative, etc.) that when clicked by the consumer-user places a call to that phone number. The inclusion of a call button can be offered for a flat fee per call button, a cost per click for each click through to the call button, or a charge calculated based on a percentage of item sales. As discussed above, the addition of an item on a featured item list and/or the addition of a brand on a featured brand list can also garner an additional fee in terms of a cost per impression for display in a featured list, a cost per click for display in a featured list, an auction among brands on the system to compete for display in a featured list (with bids made in terms of a flat price, a cost per impression, or a cost per click).

Monetization can also be based on items purchased via the system. For example, if an item is purchased directly through the system or a third party website, the brand will pay a cost per click flat fee for each time the item purchase is initiated on the system (even if the purchase is consummated on a third party website), a cost per click based on item sales, or a percentage of sales for all or some of the items purchased during the session on a third party website initiated on the system.

Still further, advertising items on the system, e.g., prominent advertising placement of a search result screen and/or a recommendations screen. Each of these advertising methods can be offered for a cost per click, cost per impression, or a flat fee, and optionally in an auction among brands on the system to compete for advertising space on the system.

Additional methods of monetization are also contemplated. For example, the system can offer the brand various types of interaction data free of charge, while certain types of interaction data or presentation of interaction data in different formats or custom formats can be offered for an additional fee. For example, demographic information can be offered for an additional fee, and optionally, the presentation of demographic information in a way that also reflects the relative geographic location of consumer-users with that demographic can also garner an additional fee. Moreover, the system can also offer a companion application that will operate on a smart phone, GPS, tablet, etc., and displays items from the system that are available from a store visited by a consumer-user. The companion application can be offered for a fee to the consumer-user and/or to the brand, retailer, etc. The companion application can also be offered for a fee to the consumer-user by the brand, retailer, etc. A companion application could also be developed for consumer-users specifically for a brand, retailer, etc.

Still further, the version of the system can be offered to a brand that allows the brand to create a system as described above with a singular focus on that brand's items. This tailored version of the system can be offered at an initial price for software customization, a percentage of sales made using the system as a brand platform, service charges for running the system servers, etc.

Specific Embodiments (a) System for Children

In a preferred embodiment, a system as described above is designed for use by children. The items included in this type of system are, for example, child safe and preferably include relevant safety information in the data objects, and further include an educational rating and an indication of a suitable age-range and gender. The system preferably requires a child's profile to be linked to a parent profile and the child's profile includes parental control settings that enables the parent to view the child's activities on the system, as well as to customize the fields the child can view of a data object, e.g., removing price, advertisements, and age-inappropriate content and commentaries associated with that data object. The parent also has the ability to restrict access to the child's activities on the system to a limited set of additional consumer-users and brand-users of the system. In addition, the system can include elements that are geared toward children, e.g., age-appropriate jokes, games, etc.

(b) Voting Mechanism

As noted above, a consumer-user can interact with one or more contacts on the system, e.g., by sharing items or brands with contacts, by adding to and/or commenting on a data object representation, etc. In one specific embodiment, a consumer-user can use the system to solicit comments from one or more contacts regarding one or more items or brand data objects in which the consumer-user is interested. For example, if a consumer-user is considering a purchase of two or more items, he/she can share those item pages with one or more contacts in his/her contacts network via the system and ask those contacts to vote for or otherwise comment on the item or brand he/she should purchase. In one embodiment, the system offers a voting mechanism that can be sent via the system from a consumer-user to one or more contacts, and the voting mechanism enables the one or more contacts to indicate which item or brand the consumer-user should purchase. In addition, the voting mechanism also includes a field that enables the one or more contacts to comment on the item offerings. In one embodiment, the consumer-user can request feedback on an item/brand comparison such as this of a subset of contacts in his/her network, e.g., only a select group of contacts or family. The contacts or family included in this voting mechanism can add any comments to the commentary field of the data object representation and contacts or family can also suggest other item/brand the consumer-user may consider in the alternative. A time limit can optionally be placed by the consumer-user on this voting mechanism or it may be unlimited. If the consumer-user places a time limit on the voting mechanism, the data object representation can be modified to include a countdown that indicates the time remaining in the vote. In one embodiment, voting mechanism dialogs such as this can be monitored by brands and brands are free to engage in the dialog regarding the item or brand. A data object representation that is the subject of a voting mechanism can also be highlighted in some way to differentiate it from other data object representations in the system, e.g., color-coded to indicate that it is the subject of a voting mechanism.

(c) Brand-Brand Challenge

The system can also be used by a brand to compare its items with those of a competitor brand. For example, a brand can comment on or create a promotional data object regarding a competitor brand, thereby challenging that competitor brand to submit its comments in response, and users of those brand/competitor brand items can also engage in the challenge. In one specific embodiment, a car manufacturer creates a data object for a new car and that data object representation highlights those features of the car that are superior to its competitor in the same class. The car manufacturer notifies the competitor car manufacturer that it has created this data object that includes information related to the competitor and the competitor can comment on that data object representation in the commentary field, e.g., in words or by the inclusion of supporting documentation challenging the superiority of the first car manufacturer. This debate is displayed in the system to consumer-users that have a relationship with the car manufacturer and/or the competitor car manufacturer, and those consumer-users can also submit their comments to the debate in the data object representation. Like the voting mechanism described above, the brand-brand challenge can have a time limit imposed on it, set by either party to the challenge, and data object representations created for this purpose can be highlighted to differentiate it from other data object representations in the system, e.g., color coded, to indicate that it is the subject of a brand-brand challenge.

System Architecture

Figure 8:
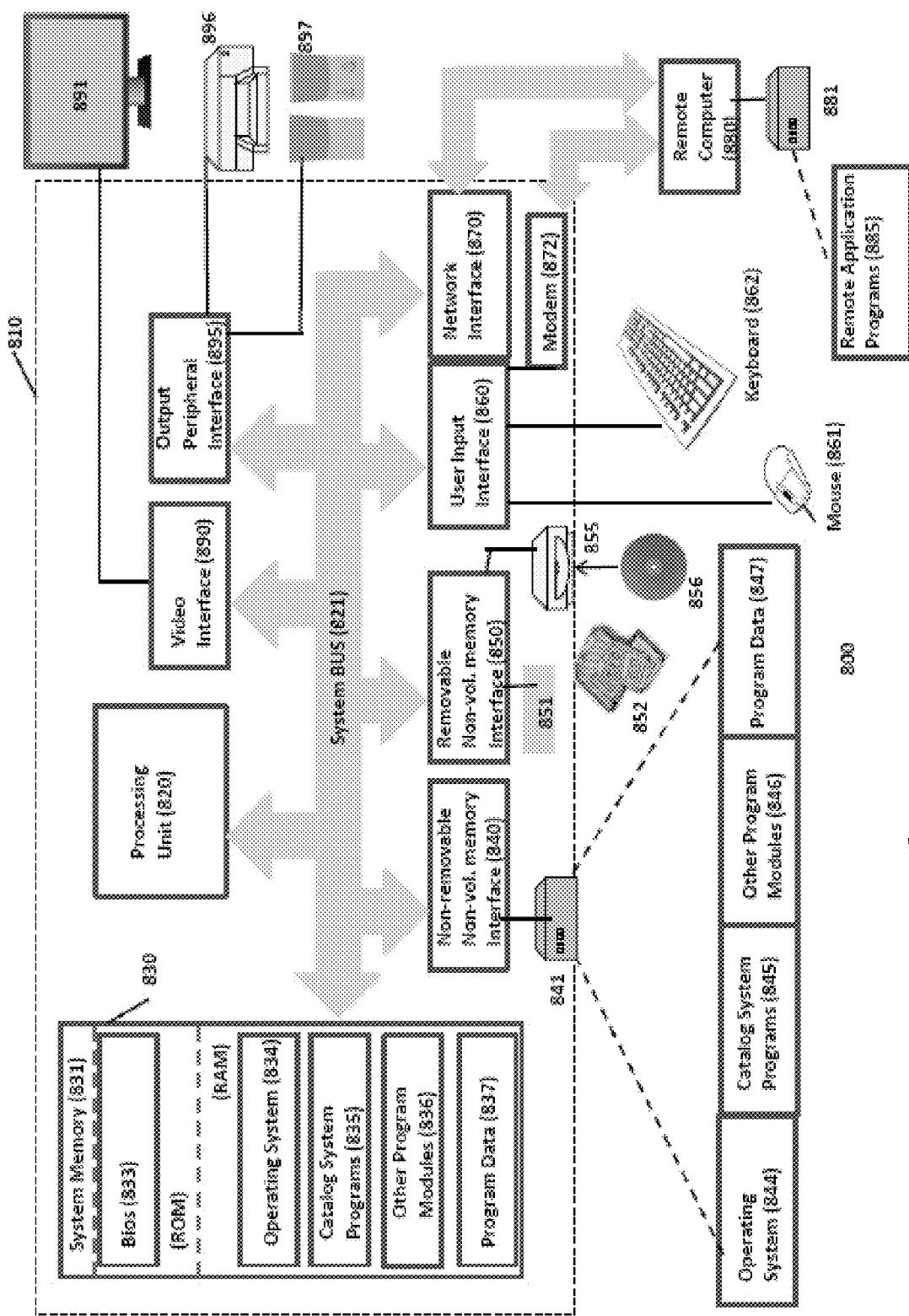
FIGS. 8-9 are graphical representations of the system and its subcomponents.

FIG. 8 shows an example of a suitable computing system environment (800) which may be used to implement various aspects of the invention. This computing system environment is only one example of a suitable computing environment, and is not intended to suggest any limitation as to the scope of use or functionality of the invention. Neither should the computing environment (800) be interpreted as having any dependency or requirement relating to any one or combination of components illustrated in the exemplary operating environment (800). The invention is operational with numerous other general-purpose or special-purpose computing system environments or configurations. Examples of well-known computing systems, environments, and/or configurations that may be suitable for use with the invention include, but are not limited to, personal computers, server computers, hand-held devices (e.g., "smartphones," tablet devices, etc.), laptop devices, multiprocessor systems, microprocessor-based systems, set top boxes, programmable consumer electronics, network PCs, minicomputers, mainframe computers, distributed computing environments that include any of the above systems or devices, or components thereof, and the like.

The computing environment may execute computer-executable instructions, such as one or more program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 8 shows an example system for implementing aspects of the invention, which includes computer (810). Components of computer (810) may include, but are not limited to, a processing unit (820), a system memory (830), and a system bus (821) that couples various system components including the system memory to the processing unit (820). The system bus (821) may comprise any suitable bus structure.

Computer (810) typically includes a variety of computer readable media. Computer readable media can be any available media that can be accessed by computer (810) and includes both volatile and nonvolatile, and removable and non-removable media. By way of example, and not limitation, computer readable media may comprise computer storage media and communication media. Computer storage media includes volatile and nonvolatile, removable and non-removable media implemented in any method or technology for storage of information. Information may include, for example, computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer (810). Communication media typically embodies computer readable instructions, data structures, program modules or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory (830) includes computer storage media in the form of volatile and/or nonvolatile memory such as read only memory (ROM) (831) and random access memory (RAM) (832). A basic input/output system (833) (BIOS), containing the basic routines that help to transfer information between elements within computer (810), such as during start-up, is typically stored in ROM (831). RAM (832) typically contains data and/or program modules that are immediately accessible to and/or presently being operated on by processing unit (820). By way of example, and not limitation, FIG. 8 shows operating system (834), application programs (835), other program modules (836), and program data (837).

The computer (810) may also include other removable/non-removable, volatile/nonvolatile computer storage media. For example, FIG. 8 depicts a hard disk drive (841) that reads from or writes to non-removable, nonvolatile magnetic media, a magnetic disk drive (851) that reads from or writes to a removable, nonvolatile magnetic disk (852), and an optical disk drive (855) that reads from or writes to a removable, nonvolatile optical disk (856) such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive (841) is typically connected to the system bus (821) through a non-removable memory interface such as interface (840), and magnetic disk drive (851) and optical disk drive (855) are typically connected to the system bus (821) by a removable memory interface, such as interface (850).

The drives and their associated computer storage media discussed above provide storage of computer readable instructions, data structures, program modules and other data for the computer (810). For example, hard disk drive (841) is shown as storing operating system (844), application programs (845), other program modules (846), and program data (847). These components may either be the same as or different from operating system (834), application programs (835), other program modules (836), and program data (837). Operating system (844), application programs (845), other program modules (846), and program data (847) are given different numbers here to illustrate that at a minimum they are different copies of the same set(s) of instructions.

A user may enter commands and information into the computer (810) through input devices such as a keyboard (862) and pointing device (861), which may include a touch screen, mouse, trackball, etc. Other input devices (not shown) may include a microphone, joystick, game pad, satellite dish, scanner, etc. These and other input devices are often connected to the processing unit (820) through a user input interface (860) that is often coupled to the system bus, but may alternatively be connected by other interface and bus structures, such as a parallel port, game port or a universal serial bus (USB). A monitor (891) or other type of display device is also connected to the system bus (821) via an interface, such as a video interface (890). In addition to the monitor, computers may also include other peripheral output devices such as speakers (897) and printer (896), which may be connected through a output peripheral interface (895).

The computer (810) may operate in a networked environment using logical connections to one or more remote computers, such as a remote computer (880) in the example configuration shown. The remote computer (880) may be a server, personal computer, router, network PC, peer device or other common network node, and typically includes many or all of the elements described above in relation to the computer (810), although only a memory storage device (881) is shown. The logical connections depicted include a local area network (LAN) (871) and a wide area network (WAN) (873), but may also include other networks. Such networking environments are commonplace in offices, enterprise-wide computer networks, intranets and the Internet.

When used in a LAN networking environment, the computer (810) is connected to the LAN (871) through a network interface or adapter (870). When used in a WAN networking environment, the computer (810) typically includes a modem (872) or other means for establishing communications over the WAN (873), such as the Internet. The modem (872), which may be internal or external, may be connected to the system bus (821) via the user input interface (860), or other appropriate mechanism. In a networked environment, program modules depicted relative to the computer (810), or portions thereof, may be stored in the remote memory storage device. By way of example, remote application programs (885) are shown residing on memory device (881). It will be appreciated that the network connections shown are merely examples and other means of establishing a communications link between computers may be used.

Figure 9:
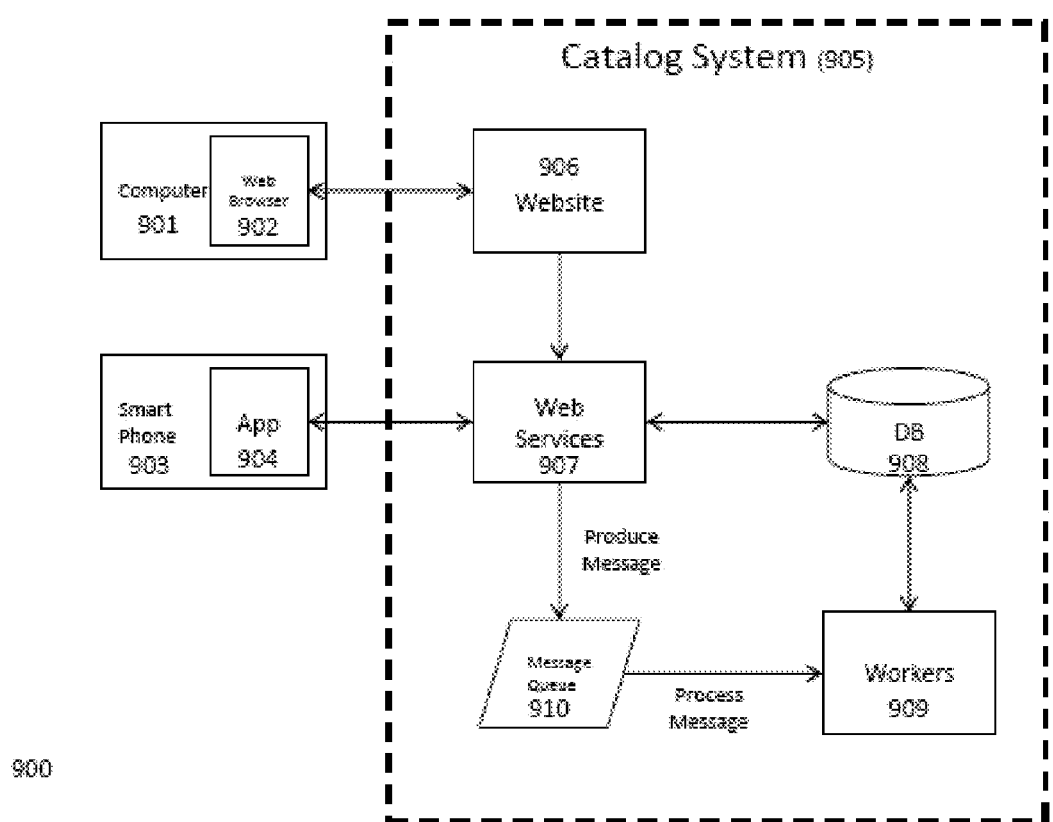

FIG. 9 illustrates one embodiment in which invention can also be practiced in a distributed computing environment (900) where tasks are performed by remote processing devices that are linked through a communications network. In the distributed environment depicted in FIG. 9, a user input interface is provided on a local computer (901) that includes a web browser (902) and/or a user input interface is provided on a smart phone (903) that includes an application (904) that can access the system (905). The system (905) comprises one or more remote processing devices that are linked through a communications network, where each remote processing device performs one or more tasks or routines by executing and/or interfacing with one or more programs, objects, components, data structures, etc. In the system depicted in FIG. 9, a website operated by module (906) interfaces with web browser (902) and that website interfaces with a web services device (907). Alternatively, application (904) can interface directly with the web services device (907). The web services device collects and/or sends interaction data from a database (908). In one embodiment, the system further includes one or more worker modules (909) configured to receive messages and process those messages in the message queue (910) to efficiently manage data traffic on the system. For example, if the system receives information from a consumer-user to modify a data object, the worker module can process that message, e.g., to create a derivative data object and display that derivative data object to a subset of consumer-users and/or brand-users in the system.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though some advantages of the present invention are indicated, it should be appreciated that not every embodiment of the invention will include every described advantage, and other advantages not described may be realized. Further, some embodiments may not implement features described as advantageous herein. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. Further, it should be appreciated that a computer may be embodied in any of a number of forms, some of which are described above.

As noted, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufactured (e.g., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

The present invention is not to be limited in scope by the specific embodiments described herein. Indeed, various modifications of the method in addition to those described herein will become apparent to those skilled in the art from the foregoing description and accompanying figures. Such modifications are intended to fall within the scope of the claims. Various publications are cited herein, the disclosures of which are incorporated by reference in their entireties.

The invention claimed is:

1. A method of exchanging brand information on a system, wherein the system has (i) a plurality of consumer-users including a first consumer-user and one or more additional consumer-users, and (ii) a plurality of brands including a first brand, the method comprising acts of:
   a. receiving first brand information comprising brand-specific information of a first brand;
   b. receiving first brand preference information indicating that the first consumer-user has expressed a preference for the first brand information;
   c. filtering the first brand information to create a subset of first brand information that is provided to the first consumer-user;
   d. displaying to the first consumer-user one or more data object representations relating to the subset of the first brand information, wherein each data object representation is integrated with at least one interactive field configured to receive interactive inputs from the first consumer-user;
   e. receiving, via the at least one interactive field, one or more first consumer-user interactions with the one or more data object representations relating to the subset of first brand information;
   f. displaying to the first brand:
      interaction data relating to the first brand and specific to one or more consumer-users;
      interaction data related to the first brand aggregated for a plurality of consumer-users on the system;
      comparative interaction data from a plurality of customer-users related to the first brand relative to a one or more other brands on the system; or
      combinations thereof;

g. based on the one or more first consumer-user interactions with the one or more data object representations relating to the subset of first brand information, automatically and periodically pushing a new item information associated with a new item to a user interface associated with the first consumer-user without the first consumer-user having to search for and access the new item, wherein the new item information is associated with at least one item not previously displayed to the first consumer-user;

h. aggregating the first brand information and one or more other brands information received from the one or more other brands and presenting the aggregated information on the user interface associated with the first consumer-user; and i. the user interface providing an option to connect to one or more social contacts of the first consumer-user and share the one or more first consumer-user interactions, allowing the one or more social contacts to be notified of the one or more first consumer-user interactions with the one or more data object representations relating to the subset of first brand information, allowing social contacts who are connected to the first consumer-user to enter interactive inputs into interactive fields integrated into the one or more object data representations to interact with the first consumer-user regarding the subset of first brand information, and the user interface providing a notification to the first consumer user of new brand information, selected from the group consisting of a new brand of items offered on the system and information related to the new brand of items; new information related to an existing brand of items offered on the system; a brand of items new to the first consumer user based on a consumer purchasing preference and information related to the brand items new to the first consumer user, and combinations thereof.

2. The method of claim 1 further comprising: receiving additional brand information from a plurality of brands; receiving additional brand preference information indicating that the first consumer-user has expressed a preference for an additional subset of the additional brand information; filtering the first brand information and the additional brand information to create one or more supplemental subsets of additional brand information that is provided to the first consumer-user; displaying to the first consumer-user one or more data object representations relating to the one or more supplemental subsets of additional brand information; receiving one or more first consumer-user interactions with the one or more data object representations relating to the one or more supplemental subsets of additional brand information; and displaying to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof.

3. The method of claim 2 further comprising displaying to the first consumer-user first brand information not previously displayed to the first consumer-user on the system.

4. The method of claim 1 wherein displaying step (d) further comprises displaying to one or more additional consumer-users one or more data object representations relating to the subset of the first brand information, wherein the one or more additional consumer-users have a relationship with the first consumer-user.

5. The method of claim 1 wherein the interaction data comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

6. The method of claim 5 wherein the demographic information comprises gender, ethnicity, age, income, education, home ownership, location, employment status, shopping history, personal interests and/or hobbies, or combinations thereof.

7. The method of claim 1 wherein the one or more first consumer-user interactions with the one or more data object representations related to the subset of first brand information includes: viewing one or more data object representations of the subset of the first brand information, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first brand-hosted information, participating in a survey regarding one or more data object representations of the subset, requesting further information from the first brand regarding one or more data object representations of the subset, buying a commercial item displayed in one or more data object representations of the subset from a third-party retailer/reseller, buying a commercial item displayed in one or more data object representations of the subset directly from the first brand, buying a commercial item displayed in one or more data object representations of the subset from an individual, participating in an auction regarding one or more data object representations of the subset, offering a commercial item displayed in one or more data object representations in the subset for free, loan, sale, lease, and/or rental, requesting to purchase a commercial item displayed in one or more data object representations in the subset, requesting that a discontinued commercial item displayed in one or more data object representations in the subset is re-introduced by the first brand and/or an authorized retailer/reseller thereof, suggesting to the first brand product ideas, improvements, and/or corrections regarding one or more data object representations in the subset, or combinations thereof.

8. The method of claim 1 wherein the interaction data includes first brand data object-consumer clicks, first brand data object consumer impressions, first brand derivative data object consumer clicks, first brand derivative data object-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

9. The method of claim 1 wherein the comparative interaction data comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

10. The method of claim 1 wherein the comparative interaction data comprises first brand data object-consumer clicks, first brand data object- consumer impressions, first brand derivative data object consumer clicks, first brand derivative data object- consumer impressions, total system-consumer clicks, system-consumer clicks per interest category, total system-consumer impressions, system-consumer impressions per interest category, average interest category click through rate, interest category seasonal trend data, average conversion rate, or combinations thereof.

11. The method of claim 1 wherein the comparative interaction data is collected over a defined time interval.

12. The method of claim 11 wherein the defined time interval is a time period in which the first brand and/or a first brand competitor has participated in the system.

13. The method of claim 1 wherein the comparative interaction data further comprises brand ranking data for the first brand in relation to the plurality of brands.

14. The method of claim 1 wherein the comparative interaction data further comprises brand ranking data for the first brand in relation to one or more competitor brands of the plurality of brands.

15. The method of claim 1 wherein the first brand information comprises general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof.

16. The method of claim 15 wherein the brand media includes a brand-specific video file, a brand-specific audio file, or print media.

17. The method of claim 15 wherein the brand information comprises brand-specific supporting documents and information comprising one or more literature references, reviews, blog link, press release, forum link, or combinations thereof.

18. The method of claim 1 wherein the first brand information comprises first brand commercial item information including information related to one or more commercial item trademarks, commercial item description information, commercial item media, commercial item purchasing information, commercial item retail information, commercial item promotional information, related first brand products, or combinations thereof.

19. The method of claim 18 wherein the commercial item description information comprises an item image, one or more item-specific supporting documents and information, one or more commercial item reviews, a commercial item rating, or combinations thereof.

20. The method of claim 18 wherein the commercial item media includes a commercial item -specific video file, a commercial item -specific audio file, or print media.

21. The method of claim 18 wherein the commercial item-specific supporting documents and information comprises one or more literature references, reviews, blog link, press release, forum link, or combinations thereof.

22. The method of claim 1 wherein the first brand preference information includes system tracking preference for the first brand information and the method further comprises filtering the first brand information to create a first supplemental subset of first brand information that is provided to the first consumer-user expressing a system tracking preference for the first brand information; and displaying to the first consumer user one or more derivative data object representations relating to the first supplemental subset of the first brand information, wherein the one or more derivative data object representations are associated in the system with the one or more data object representations.

23. The method of claim 22 wherein the system tracking preference is expressed by following and/or listing a data object and/or a derivative data object.

24. The method of claim 1 further comprising receiving first consumer-user preference information indicating that an additional consumer-user has a system tracking preference for the first consumer-user; filtering the first brand information to create a second supplemental subset of first brand information that is provided to the additional consumer-user expressing a system tracking preference for the first consumer-user; and displaying to the additional consumer-user one or more data object representations and/or derivative data object representations relating to the second supplemental subset of the first brand information.

25. The method of claim 1 further comprising receiving first consumer-user preference information indicating that a first brand-user has a system tracking preference for the first consumer-user; filtering the first brand information to create a third supplemental subset of first brand information that is provided to the first brand-user expressing a system tracking preference for the first consumer-user; and displaying to the first brand-user one or more data object representations and/or derivative data object representations relating to the third supplemental subset of the first brand information.

26. The method of claim 1 further comprising receiving additional brand preference information indicating that an additional brand of the plurality of brands has a preference for the first consumer-user; and displaying to the additional brand one or more data object representations relating to the subset of the first brand information.

27. The method of claim 1 wherein the preference is expressed as a following, listing, friending, and/or liking a data object and/or a derivative data object.

28. The method of claim 27 wherein the preference is a system tracking preference selected from following and/or listing a data object and/or a derivative data object.

29. The method of claim 27 wherein the expression of a system tracking preference for a data object by the first consumer-user generates a derivative data object based on the data object, wherein the derivative data object is associated in the system with the data object and the first consumer-user.

30. The method of claim 29 wherein the expression of a system tracking preference for a data object by a first brand-user generates a derivative data object based on the data object, wherein the derivative data object is associated in the system with the data object and the first brand-user.

31. The method of claim 29 wherein a modification to a data object generates a modification to all derivative data objects of the data object.

32. The method of claim 31 wherein the modification includes an edit to one or more data object elements, an addition to the data object, deletion of one or more data object elements, the addition of a comment regarding a data object, or combinations thereof.

33. The method of claim 1 wherein the system includes a first brand-user and the method further comprises displaying to the first brand-user interaction data related to the plurality of consumer-users expressing a preference for the first brand information; displaying to the first brand-user the one or more data object representations related to the subset of first brand information displayed to the first consumer-user; receiving a subset preference information indicating that the first brand-user has expressed a preference for one or more data object representations of the subset of first brand information; and displaying to the first brand user interactions with the subset of data object representations displayed to the first consumer-user and the first brand-user.

34. The method of claim 1 further comprising receiving additional first brand information responsive to the first brand interaction data and/or the first brand comparative interaction data.

35. The method of claim 34 wherein the additional first brand information comprises brand media, brand purchasing information, retail information, brand promotional information, one or more brand-specific supporting documents and information, one or more brand reviews, a brand rating, commercial item media, commercial item purchasing information, commercial item retail information, commercial item promotional information, one or more item-specific supporting documents and information, one or more commercial item reviews, a commercial item rating, or combinations thereof.

36. A system, comprising:
   at least one processor, programmed to:
   (i) receive first brand information comprising brand-specific information of a first brand;
   (ii) receive first brand preference information indicating that the first consumer-user has expressed a preference for the first brand information;
   (iii) filter the first brand information to create a subset of first brand information that is provided to the first consumer-user;
   (iv) display to the first consumer-user one or more data object representations relating to the subset of the first brand information, wherein each data object representation is integrated with at least one interactive field configured to receive interactive inputs from the first consumer-user;
   (v) receive, via the at least one interactive field, one or more first consumer-user interactions with the subset of data object representations displayed to the first consumer-user;
   (vi) display to the first brand:
   interaction data relating to the first brand and specific to one or more consumer-users;
   interaction data related to the first brand aggregated for a plurality of consumer-users on the system;
   comparative interaction data from a plurality of customer-users related to the first brand relative to a one or more other brands on the system; or
   combinations thereof,
   (vii) based on the one or more first consumer-user interactions with the one or more data object representations relating to the subset of first brand information, automatically and periodically pushing a new item information associated with a new item to a user interface associated with the first consumer-user without the first consumer-user having to search for and access the new item, wherein the new item information is associated with at least one item not previously displayed to the first consumer-user;
   (viii) aggregating the first brand information and one or more other brands information received from the one or more other brands and presenting the aggregated information on the user interface associated with the first consumer-user; and
   (ix) the user interface providing an option to connect to one or more social contacts of the first consumer-user and share the one or more first consumer-user interactions, allowing the one or more social contacts to be notified of the one or more first consumer-user interactions with the one or more data object representations relating to the subset of first brand information, allowing social contacts who are connected to the first consumer-user to enter interactive inputs into interactive fields integrated into the one or more object data representations to interact with the first consumer-user regarding the subset of first brand information, and the user interface providing a notification to the first consumer user of new brand information, selected from the group consisting of a new brand of items offered on the system and information related to the new brand of items; new information related to an existing brand of items offered on the system; a brand of items new to the first consumer user based on a consumer purchasing preference and information related to the brand items new to the first consumer user, and combinations thereof.

37. The system of claim 36 wherein the processor is further programmed to receive additional brand information from a plurality of brands; receive additional brand preference information indicating that the first consumer-user has expressed a preference for an additional subset of the additional brand information; filter the first brand information and the additional brand information to create one or more supplemental subsets of additional brand information that is provided to the first consumer-user; display to the first consumer-user one or more data object representations relating to the one or more supplemental subsets of additional brand information; receive one or more first consumer-user interactions with the one or more data object representations relating to the one or more supplemental subsets of additional brand information; and display to each of the additional brands: (i) interaction data relating to the one or more additional brands and specific to the one or more consumer-users expressing a preference for the one or more additional brand information; (ii) interaction data related to the one or more additional brands aggregated for a plurality of consumer-users on the system; (iii) comparative interaction data from a plurality of customer-users related to the one or more additional brands relative to a one or more other brands on the system; or (iv) combinations thereof.

38. The system of claim 37 wherein the processor is further programmed to display, to one or more additional consumer-users, the one or more data object representations relating to the subset of the first brand information, wherein the one or more additional consumer-users have a relationship with the first consumer-user.

39. The system of claim 36 wherein the processor is further programmed to display to the first consumer-user first brand information not previously displayed to the first consumer-user on the system.

40. The system of claim 36 wherein the interaction data comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

41. The system of claim 36 wherein the one or more first consumer-user interactions with the subset of data object representations relating to the subset of the first brand information includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first brand-hosted information, participating in a survey regarding one or more data object representations of the subset, requesting further information from the first brand regarding one or more data object representations of the subset, buying a commercial item displayed in one or more data object representations of the subset from a third-party retailer/reseller, buying a commercial item displayed in one or more data object representations of the subset directly from the first brand, buying a commercial item displayed in one or more data object representations of the subset from an individual, participating in an auction regarding one or more data object representations of the subset, offering a commercial item displayed in one or more data object representations in the subset for free, loan, sale, lease, and/or rental, requesting to purchase a commercial item displayed in one or more data object representations in the subset, requesting that a discontinued commercial item displayed in one or more data object representations in the subset is re-introduced by the first brand and/or an authorized retailer/reseller thereof, suggesting to the first brand product ideas, improvements, and/or corrections regarding one or more data object representations in the subset, or combinations thereof.

42. The system of claim 41 wherein the demographic information comprises gender, ethnicity, age, income, education, home ownership, location, employment status, shopping history, personal interests and/or hobbies, or combinations thereof.

43. The system of claim 36 wherein the interaction data includes first brand data object-consumer clicks, first brand data object consumer impressions, first brand derivative data object consumer clicks, first brand derivative data object-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

44. The system of claim 36 wherein the comparative interaction data for the first brand relative to the plurality of brands on the system and/or a subset of the plurality of brands on the system comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first brand, (iv) one or more consumer-users on the system expressing a preference for the first brand commercial item, (v) all consumer-users of the system, or (vi) combinations thereof.

45. The system of claim 44 wherein the comparative interaction data is collected over a defined time interval.

46. The system of claim 36 wherein the comparative interaction data comprises first brand data object-consumer clicks, first brand data object- consumer impressions, first brand derivative data object consumer clicks, first brand derivative data object- consumer impressions, total system-consumer clicks, system-consumer clicks per interest category, total system-consumer impressions, system-consumer impressions per interest category, average interest category click through rate, interest category seasonal trend data, average conversion rate, or combinations thereof.

47. The system of claim 46 wherein the demographic information comprises gender, ethnicity, age, income, education, home ownership, location, employment status, shopping history, personal interests and/or hobbies, or combinations thereof.

48. The system of claim 46 wherein the comparative interaction data further comprises brand ranking data for the first brand in relation to the plurality of brands.

49. The system of claim 46 wherein the comparative interaction data further comprises brand ranking data for the first brand in relation to one or more competitor brands of the plurality of brands.

50. The system of claim 36 wherein the first brand information comprises general brand information including information related to one or more brand trademarks, one or more brand logos, one or more commercial item logos, brand description, interest categories associated with brand, brand media, brand purchasing information, retail information, brand promotional information, information related brands within the brand portfolio, related brand description, related brand products, or combinations thereof.

51. The system of claim 50 wherein the brand media includes a brand-specific video file, a brand-specific audio file, or print media.

52. The system of claim 50 wherein the brand description comprises a brand image, one or more brand-specific supporting documents and information, one or more brand reviews, a brand rating, or combinations thereof.

53. The system of claim 52 wherein the brand-specific supporting documents and information comprises one or more literature references, reviews, blog link, press release, forum link, or combinations thereof.

54. The system of claim 36 wherein the first brand information comprises first brand commercial item information including information related to one or more commercial item trademarks, commercial item description information, commercial item media, commercial item purchasing information, commercial item retail information, commercial item promotional information, related first brand products, or combinations thereof.

55. The system of claim 54 wherein the commercial item description information comprises an item image, one or more item-specific supporting documents and information, one or more commercial item reviews, a commercial item rating, or combinations thereof.

56. The system of claim 55 wherein the item-specific supporting documents and information comprises one or more literature references, reviews, blog link, press release, forum link, or combinations thereof.

57. The system of claim 54 wherein the commercial item media includes a commercial item -specific video file, a commercial item -specific audio file, or print media.

58. The system of claim 36 wherein the first brand preference information includes system tracking preference for the first brand information and the processor is further programmed to filter the first brand information to create a first supplemental subset of first brand information that is provided to the first consumer-user expressing a system tracking preference for the first brand information; and display to the first consumer user one or more derivative data object representations relating to the first supplemental subset of the first brand information, wherein the one or more derivative data object representations are associated in the system with the one or more data object representations.

59. The system of claim 58 wherein the system tracking preference is expressed by following and/or listing a data object and/or a derivative data object.

60. The system of claim 36 wherein the processor is further programmed to receive first consumer-user preference information indicating that an additional consumer-user has a system tracking preference for the first consumer-user; filter the first brand information to create a second supplemental subset of first brand information that is provided to the additional consumer-user expressing a system tracking preference for the first consumer-user; and display to the additional consumer-user one or more data object representations and/or derivative data object representations relating to the second supplemental subset of the first brand information.

61. The system of claim 36 wherein the processor is further programmed to receive first consumer-user preference information indicating that a first brand-user has a system tracking preference for the first consumer-user; filter the first brand information to create a third supplemental subset of first brand information that is provided to the first brand-user expressing a system tracking preference for the first consumer-user; and display to the first brand-user one or more data object representations and/or derivative data object representations relating to the third supplemental subset of the first brand information.

62. The system of claim 36 wherein the processor is further programmed to receive additional brand preference information indicating that an additional brand of the plurality of brands has a preference for the first consumer-user; and display to the additional brand one or more data object representations relating to the subset of the first brand information.

63. The system of claim 36 wherein the preference is expressed as a following, listing friending, and/or liking a data object and/or a derivative data object.

64. The system of claim 63 wherein the preference is a system tracking preference selected from following and/or listing a data object and/or a derivative data object.

65. The system of claim 64 wherein the processor is further programmed to generate a derivative data object in response to the expression of a system tracking preference for a data object by the first consumer-user, and associate the derivative data object in the system with the data object and the first consumer-user.

66. The system of claim 64 wherein the processor is further programmed to generate a derivative data object in response to the expression of a system tracking preference for a data object by a first brand-user, and associate the derivative data object in the system with the data object and the first brand-user.

67. The system of claim 36 wherein the system includes a first brand-user and the processor is further programmed to display to the first brand-user interaction data related to the plurality of consumer-users expressing a preference for the first brand information; display to the first brand-user the subset of data object representations displayed to the first consumer-user; receive subset preference information indicating that the first brand-user has expressed a preference for one or more data object representations of the subset; and display to the first brand user interactions with the subset of data object representations displayed to the first consumer-user and the first brand-user.

68. The system of claim 36 wherein the processor is further programmed to receive additional first brand information responsive to the first brand interaction data and/or the first brand comparative interaction data.

69. The system of claim 68 wherein the additional first brand information comprises brand media, brand purchasing information, retail information, brand promotional information, one or more brand-specific supporting documents and information, one or more brand reviews, a brand rating, commercial item media, commercial item purchasing information, commercial item retail information, commercial item promotional information, one or more item-specific supporting documents and information, one or more commercial item reviews, a commercial item rating, or combinations thereof.

* * * * *